(12) United States Patent  
Nasrallah et al.

(10) Patent No.: US 12,244,814 B2  
(45) Date of Patent: Mar. 4, 2025

(54) METHOD FOR PROCESSING A VIDEO SEQUENCE AND APPARATUS FOR IMPLEMENTING THE SAME

(71) Applicant: ATEME, Velizy Villacoublay (FR)

(72) Inventors: Anthony Nasrallah, Puteaux (FR); Thomas Guionnet, Rennes (FR); Mohsen Abdoli, Thorigne Fouillard (FR)

(73) Assignee: ATEME, Velizy Villacoublay (FR)

( * ) Notice: Subject to any disclaimer, the term of this patent is extended or adjusted under 35 U.S.C. 154(b) by 69 days.

(21) Appl. No.: 17/975,842

(22) Filed: Oct. 28, 2022

(65) Prior Publication Data

US 2023/0136187 A1    May 4, 2023

(30) Foreign Application Priority Data

Oct. 28, 2021   (EP) .................................. 21306511

(51) Int. Cl.
  *H04N 19/136*   (2014.01)
  *H04N 19/154*   (2014.01)
  *H04N 19/189*   (2014.01)

(52) U.S. Cl.
  CPC ......... *H04N 19/136* (2014.11); *H04N 19/154* (2014.11); *H04N 19/189* (2014.11)

(58) Field of Classification Search
  CPC .. H04N 19/136; H04N 19/154; H04N 19/189; H04N 19/117; H04N 19/146; H04N 19/156; H04N 19/179; H04N 19/103
  See application file for complete search history.

(56) References Cited

U.S. PATENT DOCUMENTS

2023/0062752 A1*  3/2023  Lainema .............. H04N 19/117

FOREIGN PATENT DOCUMENTS

EP    3 734 972 A1    11/2020

OTHER PUBLICATIONS

Schwarz et al. "Coding Efficiency / Complexity Analysis of JEM 1.0 coding tools for the Random Access Configuration," 114. MPEG Meeting; 20160222-20160226; San Diego; Motion Picture Expert Group or ISO/IEC JTC1/SC29/W G11, No. m37898; Feb. 23, 2016; XP30268774 (Year: 2016).*

Aklouf et al., "Low complexity versatile video coding (VVC) for low bitrate applications," 8th European Workshop on Visual Information Processing (EUVIP 2019), Rome, Italy, Oct. 2019, 7 pages.

(Continued)

*Primary Examiner* — Sath V Perungavoor
*Assistant Examiner* — Tyler B Edwards
(74) *Attorney, Agent, or Firm* — Faegre Drinker Biddle & Reath LLP

(57) ABSTRACT

A method of processing a video sequence is proposed, which comprises, for a video encoding tool of a set of video encoding tools configured for encoding the video sequence comprised in a video encoder, determining an efficiency value based on an encoding performance value and an encoding computational complexity value of the video encoding tool for encoding the video sequence, and determining, based on the efficiency value of the video encoding tool, whether to configure the video encoder to use the video encoding tool for the encoding of the video sequence.

20 Claims, 24 Drawing Sheets

(56) References Cited

OTHER PUBLICATIONS

Boyce et al., "JVET common test conditions and software reference configurations," Document JVET-J1010, Ljubljana, Slovenia, Jul. 2018, 6 pages.
Brandenburg et al., "Towards fast and efficient VVC encoding," 2020 IEEE 22nd International Workshop on Multimedia Signal Processing (MMSP), 2020, pp. 1-6.
Chen et al., "The joint exploration model (JEM) for video compression with capability beyond HEVC," IEEE Transactions on Circuits and Systems for Video Technology, May 2020, vol. 30(5), pp. 1208-1225.
Chen et al., "Performance evaluation of JEM 1 tools by Qualcomm," 2 JVET Meeting, Feb. 20-26, 2016, San Diego, CA, US, Feb. 2016, retrieved from internet: http://phenix.int-evry.fr/jvet No. JVET-B0045-v3 (retrieved on Feb. 20, 2016), 7 pages.
Chen et al., "JVET AHG report: Tool procedure and testing (AHG13)," Document JVET-Q0013, 17th Meeting, Brussels, BE, Jan. 7-17, 2020, 13 pages.
Czyzak et al., "Pareto simulated annealing-A metaheuristic technique for multiple-objective combinatorial optimization," Journal of Multi-Criteria Decision Analysis, 1998, vol. 7, pp. 34-47.
Da Silva et al., "Fast HEVC intra prediction mode decision based on edge direction information," Proc. European Signal Processing Conference, IEEE, 2012, 5 pages.
Filippov et al., "Evaluation of some intra-coding tools of JEM1, " 2 JVET Meeting, Feb. 20-26, 2016, San Diego, CA, US, No. JVET-B0047, Feb. 21, 2016, retrieve from Internet: http://phenix.int-evry.fr/jvet/doc_end_user/documents/2_San%20Diego/wg11/JVET-B0057-v3.zip JVET-B0057_r2.docx (retrieved on Feb. 21, 2016), 7 pages.
Fu et al., "Fast CU partitioning algorithm for H.266/VVC Intra-frame coding," 2019 IEEE International Conference on Multimedia and Expo (ICME), 2019, pp. 55-60.
Howard et al., "MobileNets: Efficient convolutional neural networks for mobile vision applications," arXiv preprint arXiv: 1704.04861, 2017, 10 pages.
Li et al., "DeepQTMT: A deep learning approach for fast QTMT-based CU partition of intra-mode VVC," IEEE Transactions on Image Processing, 2021, vol. 30, pp. 5377-5390.
Sampaio et al., "Motion vectors merging: low complexity prediction unit decision heuristic for the inter-prediction of HEVC encoders," Proc. IEEE International Conference on Multimedia and Expo, IEEE, 2012, 6 pages.
Schwarz et al., "Coding Efficiency/Complexity Analysis of JEM 1.0 coding tools for the Random Access Configuration, "114 MPEG Meeting, Feb. 22-26, 2016, San Diego, CA, US, No. m37898, Feb. 23, 2016, retrieved from Internet: http://phenix.int-evry.fr/mpeg/doc_end_user/documents/114_San%20Diego/wg11/m37898-JVET-B0044-v4-JVET-B0044_r1.zip JVET-N0044_r1.doc (retrieved on Feb. 23, 2016), 12 pages.
Shen et al., "An effective CU size decision method for HEVC encoders," IEEE transactions on Multimedia, Feb. 2013, vol. 15(2), pp. 465-470.
Sullivan et al., "Overview of the High Efficiency Video Coding (HEVC) standard," IEEE Transactions on circuits and systems for video technology, Dec. 2012, vol. 22(12), pp. 1649-1668.
Tech et al., "NN-based parameter selection for fast VVC intra-picture encoding," 2021 IEEE International Conference on Image Processing (ICIP), 2021, pp. 2109-2113.
Tissier et al., "CNN Oriented Complexity Reduction of VVC Intra Encoder," IEEE International Conference on Image Processing (ICIP 2020), Abu Dhabi, United Arab Emirates, IEEE, Oct. 2020, 5 pages.
Zhao et al., "Fast mode decision algorithm for intra prediction in HEVC," 2011 Visual Communications and Image Processing (VCIP), IEEE, 2011, pp. 1-4.
Zhao et al., "Adaptive CU split decision based on deep learning and multifeature fusion for H.266/VVC," Scientific Programming, 2020, Article ID: 883214 , 2020, 11 pages.
Search Report issued in related application EP 21306511.3, Apr. 19, 2022, 13 pages.

* cited by examiner

| Test Sequences | Over HEVC |||||| 
| | VVC All tools On || VVC All tools Off || Trade-off cfg ||
| | BDR | ET | BDR | ET | BDR | ET |
| Tango | -41,96% | 850% | -9,77% | 188% | -32,00% | 338% |
| FoodMarket | -38,29% | 758% | -16,08% | 159% | -32,74% | 413% |
| Campfire | -38,76% | 1470% | -14,10% | 351% | -34,56% | 659% |
| CatRobot | -46,58% | 991% | -10,15% | 180% | -38,04% | 479% |

| Tool name | Sequences | | | |
|---|---|---|---|---|
| | Tango | FoodMarket | Campfire | CatRobot |
| CCLM | ✓ | ✓ | ✓ | ✓ |
| MRL | X | ✓ | ✓ | ✓ |
| ISP | X | X | X | X |
| MIP | X | ✓ | ✓ | X |
| SbTMVP | ✓ | ✓ | ✓ | ✓ |
| AMVR | ✓ | X | X | X |
| BCW | X | X | X | X |
| AFFINE | X | ✓ | X | ✓ |
| TPM | X | X | X | ✓ |
| BDOF | ✓ | ✓ | ✓ | ✓ |
| CIIP | ✓ | ✓ | ✓ | ✓ |
| MMVD | X | X | X | X |
| SMVD | X | X | X | X |
| DMVR | ✓ | ✓ | X | ✓ |
| PROF | X | X | ✓ | ✓ |
| DQ | ✓ | ✓ | ✓ | ✓ |
| MTS | X | X | X | X |
| SBT | X | X | X | X |
| LFNST | ✓ | X | X | X |
| JCCR | ✓ | ✓ | ✓ | ✓ |
| ALF | ✓ | ✓ | ✓ | ✓ |
| LMCS | X | X | ✓ | X |
| CST | X | ✓ | ✓ | ✓ |
| SAO | X | ✓ | ✓ | ✓ |
| IBC | X | X | X | X |

FIG. 9

METHOD FOR PROCESSING A VIDEO SEQUENCE AND APPARATUS FOR IMPLEMENTING THE SAME

CROSS-REFERENCE TO RELATED APPLICATIONS

This application claims priority benefit under 35 U.S.C. § 119 (d) from European Patent Application No. 21 306 511.3, filed Oct. 28, 2021, the disclosure of which is incorporated by reference herein in its entirety.

FIELD

The present disclosure relates to the field of video coding, in particular for video stream compression.

BACKGROUND

The last two decades have witnessed exciting developments in consumer electronics applications. An impressive consumption of multimedia content in consumer electronics products (e.g. mobile phones, smart TVs, video consoles) is caused by a significant increase in the amount of data transmitted and processed by such products. This has created a need to develop more efficient video coding algorithms which are even more effective than existing ones in order to limit the increase of data transmission rate required by these algorithms and ensure a better quality of service.

Multimedia applications, especially those in charge of video encoding, transmission, storage and decoding, occupy nowadays around 82 percent of global Internet traffic. This significant percentage is due to the revolution of the video contents in the last years with the emergence of Video-On-Demand (VOD) services, web-TV, video-sharing sites, social networks, or live video streaming service for individuals. These services are rapidly increasing the Internet video traffic, storage requirements, and most importantly, its ecological aspect.

Nowadays, the market is demanding videos with higher resolutions and higher frame rates. For this reason, the Joint Video Experts Team (JVET), a collaborative committee formed by the standardization bodies Moving Picture Experts Group (MPEG) and Video Coding Experts Group (VCEG), has been created with an aim to develop a new video coding standard, today known as Versatile Video Coding-VVC/H.266. Compared to its predecessor, the High Efficiency Video Coding (HEVC) standard, VVC aims at supporting a wider range of video formats as well as reaching a 50% bandwidth saving at the same subjective quality.

Some of the recently proposed video coding schemes, such as the H.266/VVC and MPEG-5 Part 1 (Essential Video Coding, EVC) video coding standards, differ from their predecessors in that they provide a variety of newly proposed algorithms and video encoding tools which can be activated or deactivated, thereby offering more flexibility to adapt to the computational resources of a given product. In addition, all of these features must be integrated in devices (e.g. handheld devices or portable equipment), some of which having low computational resources and/or limited batteries.

SUMMARY

Based on the issues described in the Background, it is desirable, in particular in the development of new consumer electronics devices, to find a balance between complexity cost of implementation of available video coding algorithms and tools, and increased performances provided by these algorithms and tools.

There is therefore a need for an improved video encoding scheme and video encoder implementing the same that address at least some of the above-described drawbacks and shortcomings of the conventional technology in the art.

It is an object of the present subject disclosure to provide an improved video processing scheme and apparatus implementing the same.

Another object of the present subject disclosure is to provide an improved video encoding or compression scheme and apparatuses implementing the same.

Another object of the present subject disclosure is to provide an improved video encoding scheme and apparatuses implementing the same for alleviating the above-described drawbacks and shortcomings of conventional video encoding schemes.

To achieve these objects and other advantages and in accordance with the purpose of the present subject disclosure, as embodied and broadly described herein, in one aspect of the present subject disclosure, a method of processing a video sequence or more generally digital video data comprising a plurality of images or digital video frames, is proposed. The proposed method comprises: for a video encoding tool of a set of video encoding tools configured for encoding the video sequence comprised in a video encoder, determining an efficiency value based on an encoding performance value and an encoding computational complexity value of the video encoding tool for encoding the video sequence; and determining, based on the efficiency value of the video encoding tool, whether to configure the video encoder to use the video encoding tool for the encoding of the video sequence. In some embodiments, the determination, based on the efficiency value of the video encoding tool, whether to configure the video encoder to use the video encoding tool for the encoding of the video sequence may comprise determining, based on the efficiency value of the video encoding tool, whether the video encoder is to be configured to use the video encoding tool for the encoding of the video sequence or not to use the video encoding tool for the encoding of the video sequence.

In another aspect of the present subject disclosure, a method of processing a video sequence or more generally digital video data comprising a plurality of images or digital video frames, is also proposed. The proposed method comprises, for a video encoding tool of a set of video encoding tools configured for encoding the video sequence, determining an efficiency value that represents an encoding efficiency and an encoding complexity of the video encoding tool for encoding the video sequence; and determining, based on the efficiency value of the video encoding tool, whether to activate the video encoding tool for the encoding of the video sequence.

In yet another aspect of the present subject disclosure, a method of processing a video sequence or more generally digital video data comprising a plurality of images or digital video frames, is also proposed. The proposed method comprises: for a video encoding tool of a set of video encoding tools configured for encoding the video sequence, determining an encoding performance value of the video encoding tool for encoding the video sequence; determining an encoding computational complexity value of the video encoding tool for encoding the video sequence; determining an efficiency value of the video encoding tool based on the encoding performance value and on the encoding complexity value; and determining, based on the efficiency value of the video encoding tool, whether to activate the video encoding tool for the encoding of the video sequence.

The proposed schemes advantageously allow determining whether it is worth using, that is, in the case of an encoder which comprises a encoding core and one or more optional video encoding tools that can be activated or deactivated, activating, a given video processing (e.g. encoding) tool for the encoding of an input video sequence in view of a complexity and/or performance constraint chosen by a user or an implementer, for instance in view of capabilities and resources of a target device, or absent any of the above-mentioned constraints, for determining an optimum configuration of a video encoder for encoding the video sequence. For instance, the proposed schemes advantageously allow selecting only video encoding tools for a video encoder configuration which achieve an optimal trade-off between complexity and compression efficiency, making it possible to find a good compromise between additional compression gain provided by the selected video encoding tools and the additional computational complexity imposed by the selected tools. In some embodiments, the determination to include or not a video encoding tool in a configuration of a video encoder to be used to encode an input video sequence can be made in consideration of a constraint related to the encoding computational complexity (e.g. a maximum encoding computational complexity, for example expressed in comparison with another video encoder or type of video encoder), and/or a constraint related to encoding performances (e.g. a minimum compression gain, for example expressed in comparison with another video encoder or type of video encoder).

In one or more embodiments, the proposed video processing method may further comprise: determining, based on the efficiency value of the video encoding tool, whether to activate the video encoding tool in a configuration of the video encoder for the encoding of the video sequence; in a case where it has been determined to activate the video encoding tool, encoding, by the video encoder configured with the video encoding tool, the video sequence; and in a case where it has been determined not to activate the video encoding tool, encoding, by the video encoder configured without the video encoding tool, the video sequence.

In one or more embodiments, the proposed video processing method may further comprise: determining the encoding performance value of the video encoding tool for encoding the video sequence; determining the encoding computational complexity value of the video encoding tool for encoding the video sequence. In some embodiments, the efficiency value may be determined based on a ratio of the encoding performance value over the encoding computational complexity value, so as to advantageously provide a metric in the form of a ratio which is well suited for addressing a bi-objective optimization problem according to which encoding performances are to be maximized while encoding computational complexity is to be kept at a low level, if not minimized.

In one or more embodiments, the proposed video processing method may further comprise: determining a plurality of efficiency values respectively corresponding to a plurality of video encoding tools of the set of video encoding tools; determining an ordered sequence of efficiency values based on the plurality of efficiency values, and the determining whether to configure the video encoder to use the video encoding tool for the encoding of the video sequence may be based on a position of the efficiency value determined for the video encoding tool in the ordered sequence.

In one or more embodiments, the proposed video processing method may further comprise: determining a plurality of efficiency values respectively corresponding to a plurality of video encoding tools of the set of video encoding tools, determining an ordered sequence of efficiency values based on the plurality of efficiency values, and determining, based on the ordered sequence of efficiency values, a configuration of the video encoder to use a subset of the set of video encoding tools for encoding the video sequence.

In one or more embodiments, the proposed video processing method may further comprise: determining a plurality of global performance efficiency values of the video encoder respectively corresponding to configurations of the video encoder in which a respective set of video encoding tools is used for the encoding of the video sequence, and the determining whether to configure the video encoder to use the video encoding tool for the encoding of the video sequence may be based on a position, in an ordered sequence of the video encoding tools corresponding to the ordered sequence of efficiency values, of the video encoding tool with respect to a video encoding tool corresponding to a maximum value of the plurality of global performance efficiency values.

In one or more embodiments, the proposed video processing method may further comprise: determining a plurality of global performance efficiency values of the video encoder respectively corresponding to configurations of the video encoder in which a respective set of video encoding tools is used for the encoding of the video sequence, determining an optimum video encoding tool in the set of video encoding tools corresponding to an optimum global performance efficiency value in the plurality of global performance efficiency values of the video encoder, wherein the determining whether to configure the video encoder to use the video encoding tool for the encoding of the video sequence may be based on a comparison of the efficiency value with an efficiency value determined for the optimum video encoding tool In one or more embodiments, the proposed video processing method may further comprise: determining a plurality of global performance efficiency values of the video encoder respectively corresponding to configurations of the video encoder in which a respective set of video encoding tools is used for the encoding of the video sequence, wherein the determining whether to configure the video encoder to use the video encoding tool for the encoding of the video sequence may be based on a position, in an ordered sequence of the video encoding tools corresponding to the ordered sequence of efficiency values, of the video encoding tool with respect to a video encoding tool corresponding to a maximum value of the plurality of global performance efficiency values In such embodiments, each of the respective efficiency values of a corresponding video encoding tool may be based on a respective encoding performance value of the corresponding video encoding tool, and a respective encoding computational complexity value of the corresponding video encoding tool, and wherein the subset of video encoding tools to be used in the video encoder configuration is determined based on respective encoding performance values and respective encoding computational complexity values for corresponding video encoding tools.

In one or more embodiments of the proposed video processing method, the video sequence may be divided into a plurality of subsequences, and the set of video encoding tools may comprise one or more video encoding tools that can be determined to be used for encoding each subsequence of the video sequence. In such embodiments, the proposed video processing method may further comprise: for each of the subsequences and for each of the video encoding tool, determining whether to use the video encoding tool for the encoding the subsequence based on an efficiency value for encoding the subsequence determined for the video encoding tool.

In one or more embodiments of the proposed video processing method, one or more video encoding tools of the set of video encoding tools may be, depending on the embodiment, defined by the Alliance for Open Media, AOM, AOMedia Video 1, AV1, the Versatile Video Coding, VVC/H.266, or the Moving Picture Experts Group, MPEG,-5 Part 1 Essential Video Coding, EVC, video encoding specification. In such embodiments, the efficiency value may be defined to characterize the video encoding tool as compared with an High Efficiency Video Coding, HEVC, corresponding tool.

In one or more embodiments, a training method is proposed, which comprises: training, using embodiments of the proposed method of processing a video sequence of the present subject disclosure performed on training input data comprising one or more training input video sequences (preferably a large number and variety of training input video sequences), a neural network to generate a prediction as to whether the video encoder is to use the video encoding tool for the encoding of the training input video sequence.

In one or more embodiments, a method of encoding a video sequence by a video encoder which can be configured with a video encoding tool for encoding the video sequence, is proposed, which comprises: determining, by the neural network trained according to embodiments of the proposed training method, based on input data comprising the video sequence, a prediction as to whether the video encoder is to be configured to use the video encoding tool for encoding the video sequence.

In one or more embodiments, a method of encoding a video sequence by a video encoder which can be configured with a video encoding tool for encoding the video sequence, is proposed, which comprises: determining, by the neural network trained according to embodiments of the proposed training method, based on input data comprising a video sequence, a prediction of an efficiency value of the video encoding tool for encoding the video sequence.

In another aspect of the present subject disclosure, an apparatus is proposed, which comprises a processor, and a memory operatively coupled to the processor, wherein the apparatus is configured to perform a method as proposed in the present subject disclosure.

In yet another aspect of the present subject disclosure, a video encoder is proposed, which is configured to encode video content comprising a plurality of images, an comprises an apparatus as proposed configured to perform a method as proposed in the present subject disclosure.

In yet another aspect of the present subject disclosure, a non-transitory computer-readable medium encoded with executable instructions which, when executed, causes an apparatus comprising a processor operatively coupled with a memory, to perform a method as proposed in the present subject disclosure, is proposed.

For example, in some embodiments, the present subject disclosure provides a non-transitory computer-readable medium encoded with executable instructions which, when executed, causes an apparatus comprising a processor operatively coupled with a memory, to process a video sequence, or more generally digital video data, by performing a method for processing a video sequence, the method comprising, for a video encoding tool of a set of video encoding tools configured for encoding the video sequence comprised in a video encoder, determining, by the processor, an efficiency value based on an encoding performance value and an encoding computational complexity value of the video encoding tool for encoding the video sequence; and determining, by the processor, based on the efficiency value of the video encoding tool, whether to configure the video encoder to use the video encoding tool for the encoding of the video sequence.

As another example, in other embodiments, the present subject disclosure provides a non-transitory computer-readable medium encoded with executable instructions which, when executed, causes an apparatus comprising a processor operatively coupled with a memory, to process a video sequence, or more generally digital video data, by performing a method for processing a video sequence comprising a plurality of images, the method comprising, for a subsequence of the video sequence: for a video encoding tool of a set of video encoding tools configured for encoding the video sequence, determining, by the processor, an efficiency value that represents an encoding efficiency and an encoding complexity of the video encoding tool for encoding the subsequence; and determining, by the processor, based on the efficiency value of the video encoding tool, whether to activate the video encoding tool for the encoding of the video sequence.

As yet another example, in yet other embodiments, the present subject disclosure provides a non-transitory computer-readable medium encoded with executable instructions which, when executed, causes an apparatus comprising a processor operatively coupled with a memory, to process a video sequence, or more generally digital video data, by performing a method for processing a video sequence comprising a plurality of images, the method comprising: for a video encoding tool of a set of video encoding tools configured for encoding the video sequence, determining, by the processor, an encoding performance value of the video encoding tool for encoding the video sequence; determining, by the processor, an encoding computational complexity value of the video encoding tool for encoding the video sequence; determining, by the processor, an efficiency value of the video encoding tool based on the encoding performance value and on the encoding complexity value; and determining, by the processor, based on the efficiency value of the video encoding tool, whether to activate the video encoding tool for the encoding of the video sequence.

In yet another aspect of the present subject disclosure, a computer program product comprising computer program code tangibly embodied in a computer readable medium, said computer program code comprising instructions to, when provided to a computer system and executed, cause said computer to perform a method as proposed in the present subject disclosure, is proposed.

In another aspect of the present subject disclosure, a data set representing, for example through compression or encoding, a computer program as proposed herein, is proposed.

It should be appreciated that the present subject disclosure can be implemented and utilized in numerous ways, including without limitation as a process, an apparatus, a system, a device, and as a method for applications now known and later developed. These and other unique features of the system disclosed herein will become more readily apparent from the following description and the accompanying drawings.

BRIEF DESCRIPTION OF THE DRAWINGS

The present subject disclosure will be better understood and its numerous objects and advantages will become more apparent to those skilled in the art by reference to the following drawings, in conjunction with the accompanying specification, in which:

FIG. 9 shows a table of encoding performance results of exemplary video sequences;

DETAILED DESCRIPTION

Figure 1:
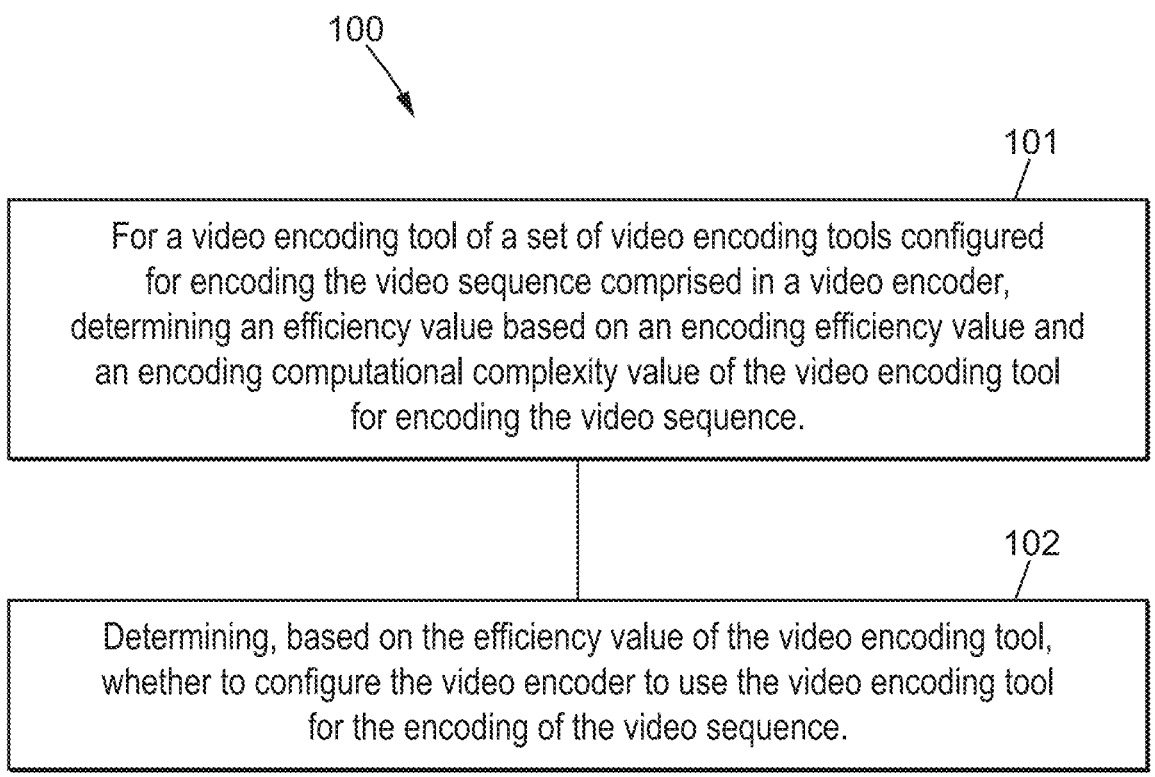
FIG. 1 illustrates an exemplary video processing method according to one or more embodiments of the present subject disclosure.

For simplicity and clarity of illustration, the drawing figures illustrate the general manner of construction, and descriptions and details of well-known features and techniques may be omitted to avoid unnecessarily obscuring the discussion of the described embodiments of the subject disclosure. Additionally, elements in the drawing figures are not necessarily drawn to scale. For example, the dimensions of some of the elements in the figures may be exaggerated relative to other elements to help improve understanding of embodiments of the present subject disclosure. Certain figures may be shown in an idealized fashion in order to aid understanding, such as when structures are shown having straight lines, sharp angles, and/or parallel planes or the like that under real-world conditions would likely be significantly less symmetric and orderly. The same reference numerals in different figures denote the same elements, while similar reference numerals may, but do not necessarily, denote similar elements.

In addition, it should be apparent that the teaching herein can be embodied in a wide variety of forms and that any specific structure and/or function disclosed herein is merely representative. In particular, one skilled in the art will appreciate that an aspect disclosed herein can be implemented independently of any other aspects and that several aspects can be combined in various ways.

The present disclosure is described below with reference to functions, engines, block diagrams and flowchart illustrations of the methods, systems, and computer program according to one or more exemplary embodiments. Each described function, engine, block of the block diagrams and flowchart illustrations can be implemented in hardware, software, firmware, middleware, microcode, or any suitable combination thereof. If implemented in software, the functions, engines, blocks of the block diagrams and/or flowchart illustrations can be implemented by computer program instructions or software code, which may be stored or transmitted over a computer-readable medium, or loaded onto a general purpose computer, special purpose computer or other programmable data processing apparatus to produce a machine, such that the computer program instructions or software code which execute on the computer or other programmable data processing apparatus, create the means for implementing the functions described herein.

Embodiments of computer-readable media includes, but are not limited to, both computer storage media and communication media including any medium that facilitates transfer of a computer program from one place to another. As used herein, a "computer storage media" may be any physical media that can be accessed by a computer or a processor. In addition, the terms "memory" and "computer storage media" include any type of data storage device, such as, without limitation, a hard drive, a flash drive or other flash memory devices (e.g. memory keys, memory sticks, key drive), CD-ROMs or other optical data storage devices, DVDs, magnetic disk data storage devices or other magnetic data storage devices, data memory components, RAM, ROM and EEPROM memories, memory cards (smart cards), solid state drive (SSD) memories, and any other form of medium able to be used to transport or store or memorize data or data structures able to be read by a computer processor, or a combination thereof. Furthermore, various forms of computer-readable media may transmit or carry instructions to a computer, such as a router, a gateway, a server, or any data transmission equipment, whether this involves wired transmission (via coaxial cable, optical fiber, telephone wires, DSL cable or Ethernet cable), wireless transmission (via infrared, radio, cellular, microwaves) or virtualized transmission equipment (virtual router, virtual gateway, virtual tunnel end, virtual firewall). According to the embodiments, the instructions may comprise code in any computer programming language or computer program element, such as, without limitation, the languages of assembler, C, C++, Visual Basic, HyperText Markup Language (HTML), Extensible Markup Language (XML), HyperText Transfer Protocol (HTTP), Hypertext Preprocessor (PHP), SQL, MySQL, Java, JavaScript, JavaScript Object Notation (JSON), Python, and bash scripting.

Unless specifically stated otherwise, it will be appreciated that throughout the following description discussions utilizing terms such as processing, computing, calculating, determining, or the like, refer to the action or processes of a computer or computing system, or similar electronic computing device, that manipulate or transform data represented as physical, such as electronic, quantities within the registers or memories of the computing system into other data similarly represented as physical quantities within the memories, registers or other such information storage, transmission or display devices of the computing system.

The terms "comprise," "include," "have," and any variations thereof, are intended to cover a non-exclusive inclusion, such that a process, method, article, or apparatus that comprises a list of elements is not necessarily limited to those elements, but may include other elements not expressly listed or inherent to such process, method, article, or apparatus.

Additionally, the word "exemplary" is used herein to mean "serving as an example, instance, or illustration". Any embodiment or design described herein as "exemplary" is not necessarily to be construed as preferred or advantageous over other embodiments or designs. The terms "in particular", "for example", "example", "typically" are used in the present description to denote examples or illustrations of non-limiting embodiments that do not necessarily correspond to preferred or advantageous embodiments with respect to other possible aspects or embodiments.

The terms "operationally coupled", "coupled", "mounted", "connected" and their various variants and forms used in the present description refer to couplings, connections and mountings that may be direct or indirect, and comprise in particular connections between electronic equipment or between portions of such equipment that allow operations and modes of operation as described in the present description. In addition, the terms "connected" and "coupled" are not limited to physical or mechanical connections or couplings. For example, an operational coupling may include one or more wired connection(s) and/or one or more wireless connection(s) between two or more items of equipment that allow simplex and/or duplex communication links between the equipment or portions of the equipment. According to another example, an operational coupling or a connection may include a wired-link and/or wireless coupling for allowing data communications between a server of the proposed system and another item of equipment of the system.

"Server" or "platform" in the present subject disclosure means any (virtualized or non-virtualized) point of service or computer device or system performing data processing operations, one or more databases, and/or data communication functions. For example, and without limitation, the term "server" or the term "platform" may refer to a physical processor operationally coupled to associated communication, database and data storage functions, or refer to a network, a group, a set or a complex of processors and associated data storage and networking equipment, and to an operating system and one or more database system(s) and application software supporting the services and functions provided by the server. A server or platform may be configured to operate in or as part of a cloud computing environment. A computer device or system may be configured so as to send and receive signals, via wireless and/or wired transmission networks(s), or be configured so as to process and/or store data or signals, and may therefore operate as a server. Equipment configured so as to operate as a server may thus include, by way of non-limiting example, dedicated servers mounted on a rack, cloud-based servers, desktop computers, laptop computers, service gateways (sometimes called "box" or "home gateway"), multimedia decoders (sometimes called "set-top boxes"), integrated equipment combining various functionalities, such as two or more of the abovementioned functionalities. The servers may vary greatly in terms of their configuration or their capabilities, but a server will generally include one or more central processing unit(s) and a memory. A server may also include one or more item(s) of mass memory equipment, one or more electric power supply/supplies, one or more wireless and/or wired network interface(s), one or more input/output interface(s), one or more operating system(s), such as Windows Server, Mac OS X, Unix, Linux, FreeBSD, or an equivalent.

In the present description, the terms "terminal", "user equipment", "reader", "reading device", "reading terminal" and "video reader" are used interchangeably to denote any type of device, implemented by one or more items of software, one or more items of hardware, or a combination or one or more items of software and one or more items of hardware, configured so as to use multimedia content distributed in accordance with a distribution protocol, for example a multi-screen distribution protocol, in particular by loading and by reading the content. The terms "client" and "video-reading client" are also used interchangeably to denote any type of device, software and/or hardware, or any function or set of functions, implemented by software and/or hardware within a device and configured so as to use multimedia content distributed in accordance with a distribution protocol, for example a multi-screen distribution protocol, in particular by loading the content from a server and by reading the content.

The terms "network" and "communication network" as used in the present description refer to one or more data links that may couple or connect possibly virtualized equipment so as to allow electronic data to be transported between computer systems and/or modules and/or other devices or electronic equipment, such as between a server and a client device or other types of devices, including between wireless devices that are coupled or connected via a wireless network, for example. A network may also include a mass memory for storing data, such as a NAS (network attached storage), a SAN (storage area network) or any other form of computer-readable or machine-readable medium, for example. A network may comprise, in full or in part, the Internet, one or more local area networks (LAN), one or more wide area networks (WAN), wired connections, wireless connections, cellular connections or any combination of these various networks. Similarly, subnetworks may use various architectures or conform with or be compatible with various protocols, and interoperate with larger networks. Various types of equipment may be used to make various architectures or various protocols interoperable. For example, a router may be used to provide a communication link or a data link between two LANs that would otherwise be separate and independent.

As used herein, the term "pixel" means a picture element or an elementary component of an image, which may be represented by a numeric value, e.g. a natural integer value. A pixel of a digital image may be coded digitally, and its value may be coded into a bitstream. Further, a pixel of an image may represent image data according to color spaces, such as the Y, Cb and Cr color spaces, wherein Y is a luma component of the pixel (also called a luma pixel or a luma sample), and $C_b$ and $C_r$ are the blue-difference and red-difference chroma components of the pixel. Two channel types may also be distinguished for a pixel: a luma channel type, corresponding to the luma component of the pixel, and a chroma channel type, jointly designating the chroma components of the pixel. The chroma channel type pixel may itself be divided into the blue-difference (Cb) chroma component and the red-difference (Cr) chroma component. In the following, the term "plane" may be used to refer to, depending on the implementation, a color space, a channel type, or a component of the pixel to which all or part of the proposed method may be applied. For example, processing a pixel in the luma plane may correspond to processing a luma component of the pixel (typically associated with a so-called "luminance plane", referred to as the "Y" plane), while processing the pixel in a chroma plane may correspond to processing a chroma component of the pixel (two chrominance planes being generally used and referred to as the "U" and "V" planes, or "Cb" and "Cr" planes). In the following, unless stated otherwise, an operation described as applicable to a pixel may be applied to any pixel component, whether chroma or luma, that is, regardless of whether the pixel represents a luma component or a chroma component of a three-color component pixel. In the following, some embodiments of the proposed methods, apparatuses and computer programs are described for the exemplary processing of pixels of an image in the Y, Cb, and/or Cr planes. However, it will be appreciated by those having ordinary skill in the relevant art that other color spaces, such as, for example, the YUV, Y'CbCr, or RGB color spaces, may be used in place of or in addition to the set of YCbCr color spaces, which is given by way of example only according to embodiments of the present subject disclosure.

The methods proposed in the present subject disclosure may be implemented by any video encoder or video codec configured for encoding video sequences of input video data configured according to embodiments of the proposed method, such as, for example a video encoder or codec compliant with any of the H.261, MPEG-1 Part 2, H.262, MPEG-2 Part 2, H.264/AVC, H.265/HEVC, MPEG-4 Part 2, and SHVC (Scalable HEVC) specifications or standards, whether in their existing versions and/or their evolutions, as the case may be adapted for implementing one or more embodiments of the proposed methods. In addition, the methods proposed in the present subject disclosure are particularly well suited for implementation by any video encoder or video codec configured for encoding and/or decoding images (or frames) of input video data which provide the option of activating/deactivating video coding features, algorithms, and/or tools, such as, for example a video encoder and/or decoder compliant with any of the Alliance for Open Media (AOM) AOMedia Video 1, AV1, H.266/VVC and MPEG-5 EVC specifications or standards, whether in their existing versions and/or their evolutions, as the case may be adapted for implementing one or more embodiments of the proposed methods.

In the following, embodiments of the proposed methods, apparatuses and computer programs are described for the exemplary encoding of a video sequence comprising a plurality of images in an encoder compliant with the H.266/VVC standard. However, it will be appreciated by those having ordinary skill in the relevant art that embodiments of the proposed methods, apparatuses and computer programs may be performed by any video encoder or video codec configured for encoding video sequences in place of the video encoding of a sequence according to the VVC standard which is given by way of example only.

In some conventional encoding/decoding schemes, such as for example specified for the H.266/VVC video codec specified by the Joint Video Experts Team (JVET), several video encoding tools are provided, in addition to a video coding core encoder, as optional features that can be activated or deactivated for use or not when encoding a video sequence (or a video stream), for example depending on the capabilities and resources of the device, system or platform on which the encoding is performed. These tools which are designed for, individually and/or in combination, optimizing the encoding performances, however come at the cost of an increase in computational complexity specific to each of the activated video encoding tools and to the video sequence on which they are used.

In one or more embodiments, an encoding framework is considered in which a video encoder is provided with one or more video encoding tools with which the video encoder can be configured for encoding a video sequence. In some embodiments, some or all of the video encoding tools may be integrated in the video encoder and activated or deactivated as part of a configuration of the video encoder. In other embodiments, some or all of the video encoding tools may be provided as optional features on top of a core video encoder and may be activated or deactivated for encoding a video sequence with the activated video encoding tools and the core video encoder.

In one or more embodiments, configuring the video encoder for encoding the video sequence may comprise activating, or configuring to use one or more of the one or more video encoding tools, so that the video sequence may be encoded using the one or more activated video encoding tools, while the other video encoding tools which are deactivated or not configured to be used are not used for the encoding of the video sequence. Correspondingly, a configuration of the video encoder may comprise a set of one or more activated video encoding tools selected among the one or more video encoding tools that are comprised in the encoding framework, in some embodiments on top of a core video encoder in the video encoder.

The development of the VVC video coding standard began in late 2015 with a target bandwidth saving objective and was released in July 2020. Likewise the development work that had been completed for specifying the HEVC standard, this target bandwidth saving was deemed achieved by accumulating small amounts of improvements through the adoption of hundreds of proposals for video encoding tools. However, these tools may not necessarily achieve an optimal trade-off between complexity and compression efficiency, as they for example have shown variable performances across different contents.

This situation created a need for the proposed method, which can be implemented in an automated classifier configured for determining video encoding tools or features that are to be activated for the encoding of a given input video content (for example at a fine level, e.g., the Group of Pictures (GOP) level). In some embodiments, the determination may be based on a constraint related to encoding performances and/or to encoding computational complexity.

Experiments have shown that the proposed schemes advantageously take into account characteristics of the input video content (such as, for example, a noise level of the content, a blurriness level of the content, etc.), as they result in a different determination depending on characteristics of the input video content, thereby advantageously recognizing the different performances and complexity of a same video encoding tool depending on characteristics of the encoded video sequence.

In other words, the present subject disclosure addresses the need for a scheme that is able to adapt the activation of one or more video encoding tools (such as, for example, video encoding tools specified in the VVC standard framework) or, depending on the embodiment, a scheme for adaptively configuring a video encoder with one or more video encoding tools or features depending on an input video sequence to be encoded.

In some embodiments, the activation of a video encoding tool or the configuration of a video encoder for use of the video encoding tool may be determined using a criterion based on an efficiency value calculated for the video encoding tool. Advantageously, the efficiency value determined for the video encoding tool will typically depend on characteristics of the video sequence to be encoded, such as a level of blurriness and/or a level of noise, so that the efficiency value provides an efficient criterion for deciding to use or not a corresponding video encoding tool or feature for encoding the video sequence.

Further, depending on the embodiment, different use cases may be considered for implementation of the proposed schemes: for example, in a first use case, a constraint related to encoding performances may be considered, in a second use case, a constraint related to computation complexity, in a third use case, the constraints of the first and second use cases may be considered in combination, and in a fourth use case, the proposed scheme may be implemented to determine an configuration of a video encoder providing a trade-off deemed optimal between encoding performances and encoding computational complexity.

A problem addressed by the present subject disclosure may be stated around the need to decide whether or not a video encoding tool is to be used in a configuration of a video encoder that maximizes the encoding performances while minimizing the encoding computational complexity. The Pareto set concept can advantageously be used to approximate a convex hull curve of a video encoder configuration space. In this context, the type of efficiency value may be chosen so that the efficiency value can serve as a metric that is used to define a Pareto set curve. For example, in some embodiments, the efficiency value can comprise a ratio, where the numerator comprise an encoding performance value and the denominator comprises a computational complexity value. Therefore an efficiency value in the form of an efficiency ratio may advantageously be used in one or more embodiments.

The proposed schemes that provide for the determination of an efficiency value (or ratio), and for the determination to use or not a video encoding tool for the encoding of an input video sequence can advantageously be implemented as proposed, or generalized through use of an artificial intelligence algorithm for automating these schemes through predictions, depending on the embodiments, of the efficiency value (or ratio) or of the determination to use or not the video encoding tool.

In one or more embodiments, the proposed scheme for determining an efficiency value of a video encoding tool may be implemented as part of a training phase of a neural network implementing a supervised learning algorithm for a plurality of input video sequences. Once trained, the neural network may advantageously be used for providing a prediction of an efficiency value corresponding to an input video sequence and an input video encoding tool.

In one or more embodiments, the proposed scheme for determining whether or not to activate or to use a video encoding tool for the encoding of a video sequence may also be implemented as part of a training phase of a neural network implementing a supervised learning algorithm for a plurality of input video sequences. Once trained, the neural network may advantageously be used for providing a prediction of a determination as to whether a video encoding tool should be activated or used based on an input video sequence and an input video encoding tool.

In the conventional art, the problem of encoder optimization has been extensively addressed from various angles, such as streamlining the HEVC encoder's Rate Distortion Optimization (RDO) process, quickly determine the Coding Unit (CU) size and depth for both Intra and Inter modes, focusing on the CU size and depth decision, reducing the number of Intra mode candidates, designing a decision algorithm that uses local samples to compute the dominant edge of the Prediction Unit (PU), determining the PU partition by examining all CUs across surrounding N×N partitions, focusing on the Motion Vectors (MVs) search in Inter prediction. However, all of these methods which increase the encoding performances in terms of compression efficiency also come at the cost of an increased complexity, leading to a cumulative complexity that is incompatible with the resources of some devices.

FIG. 1 illustrates an exemplary video processing method 100 according to one or more embodiments of the present subject disclosure.

A video sequence which is to be processed, for example for purposes of video encoding, is considered as input of the proposed method, and may be indifferently referred to in the following as the video sequence, the "original" video sequence, or the "input" video sequence.

In one or more embodiments, a subsequence of the input video sequence is considered for processing, so that depending on the embodiment, the proposed method may be subsequently applied to one or more portions of the input video sequence. Considering subsequences of an input video sequence advantageously allows processing the input sequence with a predefined granularity that may be finer than the input video sequence. For example, the input video sequence may first be divided into so-called "Group of Pictures (GOP)" subsequences, so that the proposed method may be applied to each of the GOP subsequences in order to obtain results that are tailored to the content of each GOP. Each GOP may typically contain 16 images of the input sequence, so that the input sequence may in some embodiments be divided into successive GOP subsequences of 16 images (except maybe for the last subsequence of the sequence).

In the following description of the proposed schemes for processing a video sequence, the video sequence described as being processed may therefore correspond to an input video sequence or, depending on the embodiment, to a subsequence of an input video sequence.

As discussed above, a set of video encoding tools may have been defined for video encoding as part of a video encoding framework (e.g. the VVC video encoding tools defined on top of the VVC core video encoder, or the video coding features that may or not be used as part of the configuration of a video encoder), and may be available for purposes of encoding the video sequence. In one or more embodiments, the proposed method may be applied to the video sequence to be processed for a given video encoding tool of the set of video encoding tools.

In some embodiments, an efficiency value that represents an encoding efficiency and an encoding complexity of the video encoding tool for encoding the subsequence may be determined. As shown in FIG. 1, in some embodiments, an efficiency value of the video encoding tool may be determined based on an encoding performance value and an encoding computational complexity value (101).

In one or more embodiments, the efficiency value of a video encoding tool may be determined for the input video sequence based on an encoding performance value that measures an encoding performance (e.g. a compression efficiency) of the video encoding tool for encoding the video sequence, and based on an encoding computational complexity value that measures the computational complexity incurred by using the video encoding tool for performing the encoding of the video sequence.

For example, in embodiments, the encoding computational complexity value may comprise a CPU runtime value for encoding the video sequence, and the encoding performance value may comprise a compression efficiency value, for example expressed as a decrease in bitrate for a constant quality or as an increase in quality for a constant bitrate, or more generally as a bitrate vs. distortion relationship.

Correspondingly, in some embodiments, an encoding performance value that measures an encoding performance (e.g. a compression efficiency) of the video encoding tool for encoding the video sequence may be determined, for example by performing the video encoding of the sequence using the video encoding tool. As a result, the encoding performance value will vary depending on characteristics of the video sequence, such as, for example, the amount of noise present in the video sequence, and/or the level of blurriness in the video sequence, and therefore advantageously reflect such characteristics.

In addition, in some embodiments, a processing computational complexity value that measures the computational complexity incurred by using the video encoding tool when performing the encoding of the video sequence may be determined, for example by performing the video encoding of the video sequence using the video encoding tool. For example, a CPU processing time or CPU runtime may be determined for the video encoding of the video sequence using the video encoding tool. Similarly to the encoding performance value, the processing computational complexity value will vary depending on characteristics of the video sequence, such as, for example, the amount of noise present in the video sequence, and/or the level of blurriness in the video sequence, and therefore advantageously reflect such characteristics.

In this regard, in some embodiments an input video sequence may advantageously be divided into subsequences, the size of which may be chosen so that each subsequence has characteristics which are specific to the subsequence, so that it may lead to respective encoding performance value and encoding computational complexity value that accurately reflect specificities of each subsequence. As a result, the input sequence may be processed according to the proposed scheme with the finer granularity of the subsequence, which may advantageously allow distinguishing between subsequences for which different efficiency values are determined for a same video encoding tool. Therefore, for an input video sequence, subsequences may be determined, and an efficiency value may be determined for each subsequence for a given video encoding tool, leading to respective efficiency values of the video encoding tool for the subsequences of the input video sequence. Characteristics of the video content such as the amount of noise or the level of blurriness may differ from one subsequence to the other, so that applying the proposed scheme at the granularity level of the subsequence may advantageously allow determining efficiency values that more precisely reflect such characteristics of subsequences for a given video encoding tool. For example, the GOP granularity may advantageously be fine enough so that the performances of the video encoding tool may differ from one GOP of the input sequence to another, which is reflected in the corresponding encoding performance values and/or encoding computational complexity values determined for each GOP and, as a result, in the corresponding efficiency value of the video encoding tool determined for each GOP.

In some embodiments, the efficiency value of the video encoding tool for encoding the video sequence may be determined based on the encoding performance value and the processing computational complexity value determined for the video encoding tool with respect to the video sequence.

Referring back to FIG. 1, in some embodiments, it may be determined (102), based on the efficiency value determined for the video encoding tool, whether or not to configure the video encoder to use the video encoding tool for the encoding of the video sequence. In embodiments where the video encoding tool is part of a video encoding framework comprising a core video encoder and can be activated to be used on top of the core video encoder, it may be determined whether or not to activate the video encoding tool for the encoding of the video sequence based on the efficiency value of the video encoding tool.

Therefore, advantageously, a determination to use or not (e.g. through activation or deactivation of) the video encoding tool for the encoding of the video sequence can be made based on a metric which reflects characteristics of the video sequence, both from an encoding performances of the video encoding tool standpoint and from a computation complexity of the video encoding tool standpoint, as determined for the video encoding tool on the video sequence.

The decision to use or not a video encoding tool can advantageously be made adaptively to the content of the video sequence in a manner that takes into account the complexity and the compression gain associated with using the video encoding tool for encoding the video sequence. For example, in some embodiments, an input video sequence can be divided into GOPs of a predefined size, and a determination as to whether a video coding tool or feature should be used for the encoding can be made for each GOP, based on a corresponding efficiency value which will have been determined for the GOP. The determination as to whether to use the video encoding tool or feature will vary adaptively depending on the GOP for which the determination is made.

In one or more embodiments, in a case where it has been determined to use the video encoding tool (or feature), the video sequence may be encoded using the video encoding tool (or feature). That is, in some embodiments, the video encoding tool can be activated so that it is used for encoding the video sequence, and in other embodiments the video encoder can be configured with the video encoding tool/feature so that it is used for encoding the video sequence. Otherwise (in a case where it has been determined not to activate the tool) the video sequence may be encoded without using the video encoding tool. That is, in some embodiments, the video encoding tool can be deactivated (or not activated) so that it is not used for encoding the video sequence (in which case only the video encoding core, possibly with other video encoding tools may be used for encoding the video sequence), and in other embodiments the video encoder can be configured without the video encoding tool/feature so that it is not used for encoding the video sequence.

In one or more embodiments, the efficiency value may be determined based on a ratio of the encoding performance value over the encoding computational complexity value. In such embodiments, the efficiency value which is an efficiency ratio can advantageously represent a trade-off between the encoding performances (e.g. a compression gain) provided by the video encoding tool, and the complexity imposed by using the video encoding tool for encoding the video sequence.

In one or more embodiments, the metric used for determining whether or not to use the video encoding tool may be in the form of a ratio, where the numerator includes a value that represents encoding performances of the encoding of the video sequence using the video encoding tool, such as for example the compression efficiency which is attributable to the use of the video encoding tool when encoding the video sequence (e.g. a bit-rate reduction), and the denominator includes a value that represents the additional complexity which is attributable to the use of the video encoding tool when encoding the video sequence, such as for example a CPU runtime for encoding the video sequence using the video encoding tool.

Using an efficiency ratio is advantageous in that a maximum ratio is obtained for video encoding tools that, considered alone or in combination with other video encoding tools depending on the embodiment, maximize measured coding performances (for example the bit-rate reduction) while providing a minimal complexity (minimizing the CPU runtime).

Another advantage of an efficiency ratio is that a Pareto set curve can be defined with a plurality of video encoder configurations for which respective global performance efficiency ratio are measured, based on which an optimum configuration can be determined, possibly with respect to a predefined constraint.

The efficiency ratio can also advantageously be used to compare efficiencies of two different video encoding tools that are available and can be activated for encoding the video sequence. In some embodiments, a video encoding tool with an efficiency ratio that is higher than another video encoding tool may be considered more efficient than this other video encoding tool, for example for purposes of determining which of the two video encoding tool may be used (e.g. activated) if only one of the two video encoding tools can be used (e.g. activated).

For example, if two video encoding tools, tool A and tool B, are to be compared, if tool A and tool B provide the same value of BD-rate gain (representing their compression efficiency as measured by a Bjøntegaard-delta-rate (BD-rate) value), and tool A is less computationally complex than tool B, tool A will have a higher efficiency ratio than tool B, and therefore will be considered more efficient than tool B.

As another example, if two video encoding tools, tool C and tool D, are to be compared, if tool C and tool D require the same run-time for execution (representing their complexity), and tool C provides a higher compression gain than tool D, tool C will have a higher efficiency ratio than tool D, and therefore will be considered more efficient than tool D.

In one or more embodiments, the efficiency ratio of a video encoding tool used for measuring the efficiency of the video encoding tool for encoding a given input video sequence can be expressed by a ratio R/C, where R and C represent the two entities of the optimization problem considered in the present subject disclosure. For example, R may be a value measuring an encoding performance provided by the video encoding tool for encoding the input video sequence, such as the encoding gain, or the encoding efficiency, for example a BD-rate gain, and C may be a value measuring the computational complexity associated with using the video encoding tool, such as a CPU runtime, when encoding the input video sequence.

For example, in some embodiments, the efficiency ratio of a video encoding tool used for measuring the efficiency of the video encoding tool may be expressed as follows:

$$Eff \cdot \text{ratio1} = \frac{R_{ts}}{C_{ts}},$$

where $R_{ts}$ is a value measuring the encoding gain, for example the BD-rate gain, provided by the video encoding tool t on the considered video sequence s (t being a tool index, and s being a video sequence index), and $C_{ts}$ is a value measuring the complexity imposed by the tool t when used for encoding the video sequence s. That is, in some embodiments, R may be equal to $R_{ts}$, and C may be equal to $C_{ts}$.

In other embodiments, part or all of the available video encoding tools that are available as part of the video encoding framework for encoding an input video sequence may be taken into account in the efficiency ratio in order to measure the efficiency of a given video encoding tool with respect to a set of available video encoding tools comprising a portion or, depending on the embodiment, all of the available video encoding tools. In these embodiments, the efficiency ratio of a video encoding tool used for measuring the efficiency of the video encoding tool may be expressed as follows:

$$Eff \cdot \text{ratio2} = \frac{\frac{R_{ts}}{R_s}}{\frac{C_{ts}}{C_s}},$$

where $R_{ts}$ is a value measuring the encoding gain, for example the BD-rate gain, provided by the video encoding tool t on the considered video sequence s (t being a tool index, and s being a video sequence index), $C_{ts}$ is a value measuring the complexity imposed by the tool t when used for processing the video sequence s, $R_s$ is a value that measures the cumulative encoding gain provided by a plurality of video encoding tools (in some embodiments all of the video encoding tools) for encoding the video sequence s, and $C_s$ is a value that measures the overall complexity incurred by using the plurality of video encoding tools (or, in some embodiments, all of the video encoding tools) for encoding the video sequence s. That is, in some embodiments, R may be equal to $$\frac{R_{ts}}{R_s},$$

and C may be equal to $$\frac{C_{ts}}{C_s}.$$

Advantageously, in Eff·ratio2, the numerator measures (represents) the proportion of gains provided by the video encoding tool t being evaluated with respect to the gains provided by a plurality of other video encoding tools. Further, the denominator represents the complexity proportion among all the other tools. For example, in embodiments where the video encoding tool is a VVC video encoding tool, the numerator may measure the proportion of compression gain provided by the VVC video encoding tool given the cumulative compression gain provided by a "full VVC", that is a VVC encoder using all of the available VVC video encoding tools for the VVC encoder, and the denominator may measure the proportion of computational complexity incurred by the VVC video encoding tool given the cumulative computational complexity incurred by a full VVC. As another example, still in embodiments where the video encoding tool is a VVC video encoding tool, the numerator may measure the proportion of compression gain provided by the VVC video encoding tool given the cumulative compression gain provided by a "full VVC" as compared to a compression gain obtained with a different encoder serving as a reference, such as for example HEVC, and the denominator may measure the proportion of computational complexity incurred by the VVC video encoding tool given the cumulative computational complexity incurred by a full VVC, also as compared to a compression gain obtained with a different encoder serving as a reference, such as for example HEVC. For example, the compression gains provided by a full VVC as compared to HEVC may be expressed as a percentage in the amount of 40%, indicating that a full VVC provides an increase in compression gain of 40% as compared to HEVC. Likewise, the computational complexity incurred by a full VVC as compared to HEVC may be expressed as a percentage in the amount of 1000%, indicating that a full VVC is 10 times more computationally complex than HEVC.

In yet other embodiments, the efficiency ratio which is used for implementing the proposed method may be a weighted ratio in which the numerator and the denominator may be weighted.

In these embodiments, the efficiency ratio of a video encoding tool used for measuring the efficiency of the video encoding tool may be expressed as follows:

$$Eff \cdot \text{ratio3} = \frac{R + \alpha}{C + \beta},$$

where R is a value measuring the encoding gain, for example the BD-rate gain, provided by the video encoding tool t on the considered video video sequence, C is a value measuring the complexity imposed by the video encoding tool t when used for processing the video sequence s, $\alpha$ is a weight associated with the value R, and $\beta$ is a weight associated with the value C. Therefore, the higher a, the more weight is attributed to the compression gain for evaluating the video encoding tool. Likewise, the higher $\beta$, the more weight is attributed to the complexity for evaluating the video encoding tool. As discussed above, depending on the embodiment, R may be equal to $R_{ts}$, and C may be equal to $C_{ts}$, or R may be equal to $$\frac{R_{ts}}{R_s},$$

and C may be equal to $$\frac{C_{ts}}{C_s}.$$

Further, the parameters $\alpha$ and $\beta$ used in the determination of efficiency ratios as described above, can play an important role in the considered use-cases: Depending on the scenario and its constraints (encoding performance related constraint or computational complexity related constraint), these parameters may advantageously be chosen to give more or less importance to the corresponding type of constraint (encoding performance or computational complexity) in the considered use case.

As discussed above, depending on the embodiment, an efficiency ratio may be computed for a video encoding tool for encoding a video sequence using only the video encoding framework comprising the video encoding tool, or by comparison to a reference provided for instance by another video encoding scheme used for encoding the same video sequence. For example, depending on the embodiment, an efficiency ratio may be computed for a VVC video encoding tool for encoding a video sequence using only the VVC video encoding framework comprising the video encoding tool (e.g. the VVenC video encoding framework), or by comparison to a reference provided for instance by another video encoding scheme used for encoding the same video sequence (e.g. a HEVC video encoding scheme).

Therefore, in one or more embodiments, the efficiency ratio of a video encoding tool used for measuring the efficiency of the video encoding tool can be expressed by:

$$Eff \cdot \text{ratio4} = \frac{\frac{R_{ts}}{R_s} + \alpha}{\frac{C_{ts}}{C_s} + \beta},$$

with the parameters described above.

FIGS. 2a-2e illustrate an exemplary method 200 according to one or more embodiments of the present subject disclosure.

For a video encoder specified with a set of video encoding tools, each of which can be used or not used (e.g. activated or deactivated) as defined by a corresponding configuration of the video encoder, the global performance of the video encoder for encoding a given video sequence may be determined for a configuration of the video encoder in which a set of multiple tools are activated together. When a plurality of video encoding tools is activated, the interaction between the activated tools is advantageously revealed when encoding a video sequence with an encoder which uses the activated video encoding tools.

Therefore, advantageously, in some embodiments, the determination of whether or not to use a given video encoding tool/feature may be made based on global performances measured for the video encoder configured for using respective pluralities of video encoding tools which may or not comprise the video encoding tool/feature under consideration. The proposed schemes may therefore involve in some embodiments measuring global performances of the video encoder with different configurations defined by respective sets of video encoding tools that are used for encoding an input video sequence.

Figure 2A:
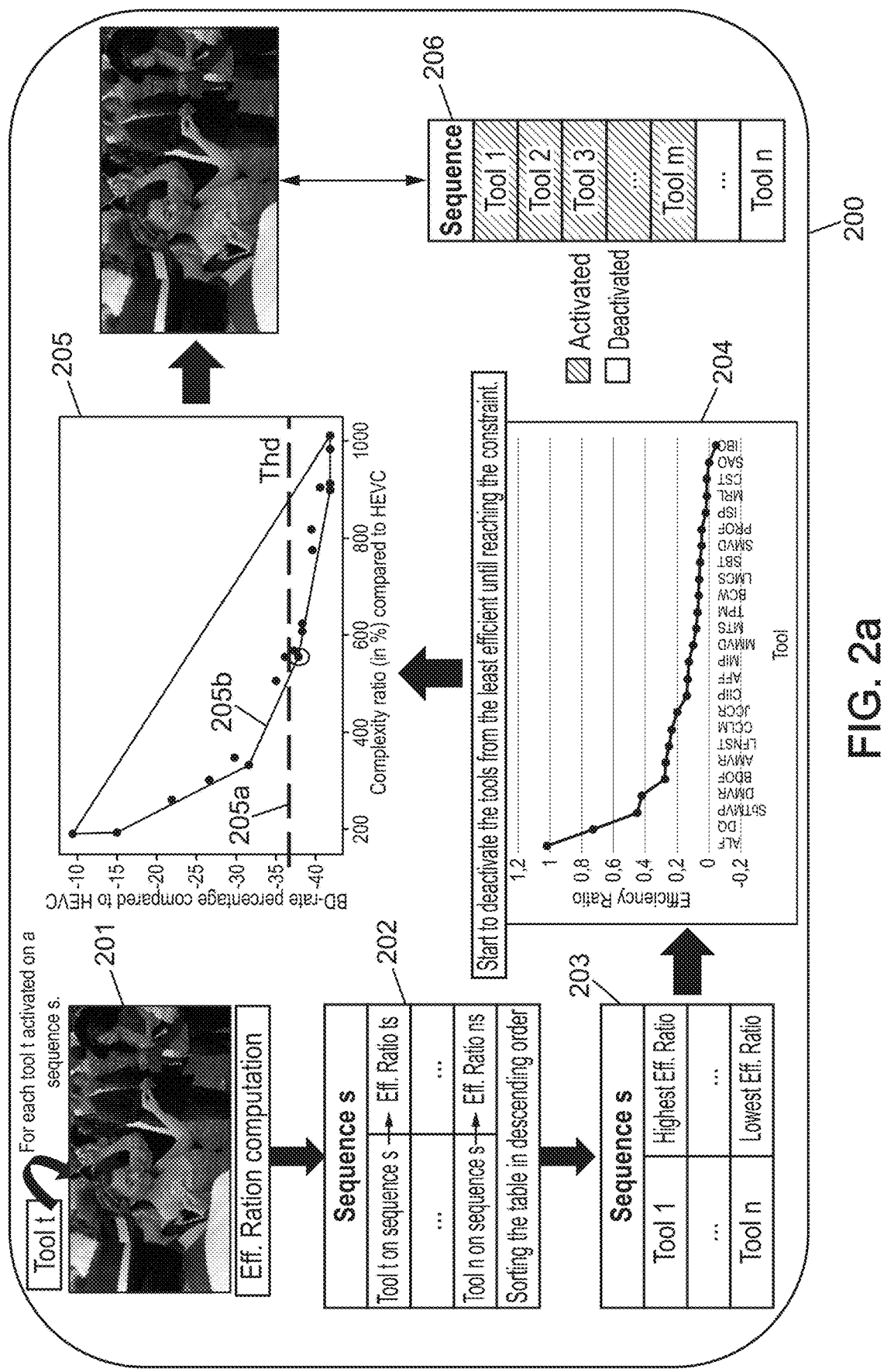
FIGS. 2a-2e illustrate an exemplary video processing method according to one or more embodiments of the present subject disclosure.

FIG. 2a illustrates an exemplary method 200 of processing a video sequence s with respect to a plurality of video encoding tools $(t_i)_{i=1, \ldots, N}$.

In some embodiments, the video sequence s described in the following for implementing the proposed method may be a subsequence of an input video sequence, in order to implement the proposed method with a finer granularity than that provided by the input video sequence.

In one or more embodiments, a plurality of video encoding tools $(t_i)_{i=1, \ldots, N}$, e.g. that are part of a video encoding framework, may be considered and evaluated in order to determine which video encoding tools should be used (e.g. activated) for encoding an input video sequence, so as to obtain (206) an optimum configuration of a video encoder, depending on the embodiment with respect to a maximized efficiency of the video encoder or with respect to one or more predefined constraints.

Referring to FIG. 2a, in the case of a VVC encoder used for encoding a video sequence s, the proposed method aims at determining a configuration of the VVC encoder considered optimum for encoding the video sequence s, in the exemplary case illustrated by FIG. 2a given a predefined constraint related to encoding performances. The optimum configuration of the VVC encoder may be defined by a set of activated VVC video encoding tools which comprises VVC video encoding tools which are selected to be activated for the encoding of the video sequence s. The definition of the VVC encoder optimum configuration therefore distinguishes, among video encoding tools specified for VVC and available in the VVC encoder implementation used for implementing the proposed method, those tools that are to be activated when encoding the video sequence s from those that are not to be activated when encoding the video sequence s in order to reach an optimum configuration with respect to encoding performances vs. computational complexity given the considered constraint.

In one or more embodiments, as illustrated on FIG. 2a, an efficiency ratio of each of the video encoding tools $(t_i)_{i=1,\ldots,N}$ may be measured (201) on an input video sequence s. The video encoding tools may then be sorted (202, 203) by descending or ascending order of efficiency ratios.

The determined ordered sequence of video encoding tools may be used to determine (204) an order of activating or deactivating the video encoding tools (in the example illustrated on FIG. 2a, an order of deactivating the video encoding tools) for the considered sequence s, by ascending order of efficiency ratio (from the least efficient to the most efficient).

In some embodiments, measurements may be performed 205 (illustrated by the convex hull curve (205b)) which include measuring a global encoding performance (in the illustrated example a global compression gain) versus a computational encoding complexity when encoding the video sequence s with the video encoder configured with one video encoding tool being deactivated after another in the predetermined order of deactivation, and starting from an initial configuration in which all the video encoding tools are activated. In other embodiments, the measurements may also be performed (and a corresponding convex hull curve may also be obtained) by measuring a global encoding performance versus a computational encoding complexity when encoding the video sequence s with the video encoder configured with one video encoding tool activated after another in a predetermined order of activation, and starting from an initial configuration in which none of the video encoding tools are activated.

In some embodiments, a constraint, which may be defined by a threshold value (205a), may be taken into account to determine an optimized point as the last point on the curve before reaching the limit of the constraint (illustrated by the circled point on FIG. 2a).

In one or more embodiments, based on measurements of a global encoding performance versus a global encoding complexity for different video encoder configurations (defined, depending on the embodiment, by progressively activating or deactivating video encoding tools in a predetermined order based on their respective efficiency values, and starting from an initial video encoder configuration), an optimum point (that is, an optimum global encoding performance value and an optimum global encoding complexity value) may be identified, in some embodiments with respect to a predefined constraint.

In some embodiments, this optimized point may correspond to an optimum configuration, and may be used to identify the last video encoding tool to be deactivated in the optimum configuration.

As illustrated on FIG. 2a, the considered constraint may in some embodiments be expressed as a compression efficiency threshold. Consequently, for any given video sequence s to be encoded under a defined constraint, a set of VVC video encoding tools that are to be deactivated (and therefore a set of VVC video encoding tools that are to be activated) in order to obtain an optimized performance of the considered VVC video encoder implementation when encoding the video sequence s is determined (206).

For a given video encoding tool t, it may therefore be determined whether the video encoding tool is to be activated or not in the determined optimum configuration of the video encoder.

In some embodiments, the proposed method as illustrated on FIG. 2a may be repeated on a plurality of video sequences, for example on a plurality or each subsequences of an input video sequence.

Different approaches may be adopted for determining an optimum encoder configuration defining a set of one or more video encoding tools/features to be used (e.g. activated) for encoding an input video sequence.

In some embodiments corresponding to a first approach, an initial video encoder configuration in which all the available video encoding tools/features are used (e.g. activated) is considered. The available video encoding tools may then be deactivated, one after the other or, depending on the embodiments by groups (for example two by two), until a video encoder configuration considered optimum is reached.

In other embodiments corresponding to another approach, an initial video encoder configuration in which none of the available video encoding tools/features are used (e.g. activated) is considered. The video encoding tools may be then activated, one after the other or, depending on the embodiments by groups (for example two by two), until a video encoder configuration considered optimum is reached.

Therefore, depending on the embodiments, measurements may be performed when encoding an input video sequence with the video encoder configured with a plurality of configurations in which video encoding tools are progressively activated or deactivated starting with a predetermined initial configuration.

Given these two approaches, different embodiments may be considered for evaluating the performances (e.g. determining an efficiency value) of a video encoding tool under consideration for use in a video encoder configuration:

In a first exemplary embodiment for evaluating the impact of a video encoding tool, described using the VVC framework as an example, the evaluation of the video encoding tool under consideration may use an initial complete configuration of VVC (so-called "full VVC" configuration) (that is, a VVC configuration in which all of the video encoding tools available in the VVC implementation are activated for use with the VVC core video encoder). For evaluating a video encoding tool, the tool under consideration may be deactivated individually to measure an impact of the tool deactivated individually on the VVC encoder. For this individual deactivation impact measurement, an efficiency value (e.g. an efficiency ratio) of the tool under consideration may be determined, for example based on encoding efficiency (e.g. BD-rate) and encoding computational complexity values measured for the VVC video encoder with only the tool under consideration deactivated.

In a second exemplary embodiment for evaluating the impact of a video encoding tool, also described using the VVC framework as an example, the evaluation of the video encoding tool under consideration may use an initial empty configuration of VVC (that is, a VVC configuration in which none of the video encoding tools available in the VVC implementation are activated for use with the VVC core video encoder). For evaluating a video encoding tool, the tool under consideration is activated individually to measure an impact of the tool activated individually on the VVC encoder. For this individual activation impact measurement, an efficiency value (e.g. an efficiency ratio) of the tool under consideration may be determined, for example based on encoding efficiency (e.g. BD-rate) and encoding computational complexity values measured for the VVC video encoder with only the tool under consideration activated.

In a third exemplary embodiment for evaluating the impact of a video encoding tool, also described using the VVC framework as an example, the evaluation of the video encoding tool under consideration may also use an initial empty configuration of VVC (that is, a VVC configuration in which none of the video encoding tools available in the VVC implementation are activated for use with the VVC core video encoder). The video encoding tools may be activated one by one, for example in descending order of previously computed efficiency values (starting from the most efficient one). Progressively activating the tools by decreasing efficiency values means that the most efficient tools are firstly activated one after the other, followed by less efficient tools. For evaluating a video encoding tool, the tool under consideration is therefore activated in combination with the previously activated tools to measure an impact of the tool activated collectively on the VVC encoder. Based on this collective activation impact measurement, an efficiency value (e.g. an efficiency ratio) of the tool under consideration may be determined, for example based on encoding efficiency (e.g. BD-rate) and encoding computational complexity values measured for the VVC video encoder with the tool activated along with the previously activated tools.

In a fourth exemplary embodiment for evaluating the impact of a video encoding tool, also described using the VVC framework as an example, the evaluation of the video encoding tool under consideration may also use an initial full VVC configuration. The video encoding tools may be deactivated one after the other, for example in ascending order of previously computed efficiency values (starting from the least efficient one). Progressively deactivating the tools by increasing efficiency values means that the least efficient tools are firstly deactivated one after the other, followed by more efficient tools, that is, tools are deactivated from the least efficient tool to the most efficient tool. For evaluating a video encoding tool, the tool under consideration is therefore deactivated in combination with the previously deactivated tools to measure an impact of the tool deactivated collectively on the VVC encoder. Based on this collective deactivation impact measurement, an efficiency value (e.g. an efficiency ratio) of the tool under consideration may be determined, for example based on encoding efficiency (e.g. BD-rate) and encoding computational complexity values measured for the VVC video encoder with the tool deactivated along with the previously deactivated tools.

In some embodiments, in addition or alternatively to measuring the effects of the activation or the deactivation of each tool individually, measurements may be performed which consider subsets of tools in combination. Doing so, positive and negative interactions between tools can advantageously be captured, and the best combination can be derived for any coding performance target.

The above-described four exemplary embodiments for evaluating the impact of a video encoding tool can advantageously be considered as allowing two different types of determinations: a first determination addressing the problematic of activating the tools or deactivating them, and a second determination addressing the above-described problematic of evaluating performances of a given video encoding tool in isolation or in interaction with other video encoding tools of the considered video encoding framework.

In order to select a preferred video encoding tool evaluation scheme among the above-described embodiments, a measurement of correlation between the four embodiments may be performed.

Exemplary results of such measurements are provided in the below table (Table 1):

TABLE 1

| Correlation (Complexity (C) and Performances (R)) | Emb 1(C) | Emb 1(R) | Emb 2(C) | Emb 2(R) | Emb 3(C) | Emb 3(R) | Emb 4(C) | Emb 4(R) |
|---|---|---|---|---|---|---|---|---|
| Deactivating tools individually (Emb 1) | 1 | 1 | 0.8 | −0.78 | 0.53 | −0.85 | 0.87 | 0.8 |
| Activating tools individually (Emb 2) | 0.8 | 0.78 | 1 | 1 | 0.8 | 0.95 | 0.83 | −0.95 |
| Activating tools cumulatively (Emb 3) | 0.53 | −0.85 | 0.8 | 0.95 | 1 | 1 | 0.68 | −0.95 |
| Deactivating tools cumulatively (Emb 4) | 0.87 | 0.8 | 0.83 | −0.95 | 0.68 | −0.95 | 1 | 1 |

In one or more embodiments corresponding to constraint-based use cases, one or several constraints may be considered for purpose of determining whether or not to use a given video encoding tool or, depending on the embodiment, determining a set of video encoding tools that are to be used in a configuration of the video encoder to encode an input video sequence.

In some embodiments, a constraint to be considered may be related to video encoding performances (e.g. to a compression efficiency). The video encoding performance based constraint may further be defined by a threshold value. For example, a use case in which the constraint is related to compression efficiency and defined by a high level value of compression efficiency (e.g. 35%) may be considered. In such embodiments, it may be determined to start with an initial full video encoder configuration, and to start deactivating tools, individually or in small groups. This scheme corresponds to the above-described fourth exemplary embodiment for evaluating the impact of a video encoding tool. Therefore, based on the constraint being related to video encoding performances, a determination may be made to start with a full video encoder configuration and to modify this initial configuration by progressively deactivating video encoding tools until a video encoder configuration deemed optimum in view of the constraint is achieved (e.g. until an optimum set of video encoding tools to be used or, depending on the embodiment, an optimum set of video encoding tools not to be used, is determined). Starting with a full configuration and progressively deactivating video encoding tools advantageously allows preserving the performances of the video coding tools provided with the video encoding framework (and in particular to keep the benefits of their performance gains) to achieve a target level of encoding performances (e.g. a target compression efficiency), and promptly determine a video encoder configuration deemed optimum in view of the encoding performance related constraint.

In other embodiments, a constraint to be considered may be related to video encoding computational complexity (e.g. to a CPU runtime). The video encoding computational complexity based constraint may further be defined by a threshold value. For example, a use case in which the constraint is related to video encoding computational complexity and defined by a low level value of computational complexity (e.g. only 4 times more computationally complex than HEVC (given that a full VVC is 10 times more computationally complex than HEVC))) may be considered. In such embodiments, it may be determined to start with an initial empty video encoder configuration (that is, a configuration in which none of the available video encoding tools is used on top of a core video encoder), as such configuration corresponds to the lowest achievable video encoding computational complexity, and to start activating tools, individually or in small groups. This scheme corresponds to the above-described third exemplary embodiment for evaluating the impact of a video encoding tool. Therefore, based on the constraint being related to video encoding computational complexity, a determination may be made to start with an empty video encoder configuration (that is, a video encoder configuration limited to its minimum for video encoding, for example limited to the sole core video encoder), and to modify this initial configuration by progressively activating video encoding tools until a video encoder configuration deemed optimum in view of the constraint is achieved (e.g. until an optimum set of video encoding tools to be used or, depending on the embodiment, an optimum set of video encoding tools not to be used, is determined). This advantageously allows to maintain the computational complexity of the video encoder below a target level of computational complexity of the configured video encoder), and promptly determine a video encoder configuration deemed optimum in view of the computational complexity related constraint.

Therefore, in one or more embodiments in which a constraint is considered, based on the type of considered constraint, a determination of an initial video encoder configuration is made, as well as a corresponding determination as to whether progressively activate or deactivate video encoding tools until a video encoder configuration deemed optimum in view of the constraint is achieved (e.g. until an optimum set of video encoding tools to be used or, depending on the embodiment, an optimum set of video encoding tools not to be used, is determined).

For example, in embodiments in which an encoding performance-based constraint is considered, it may be determined to start with a full video encoder configuration and to progressively deactivate those tools that are not considered efficient enough in order to advantageously preserve to the fullest possible extent the performances achieved, e.g. in terms of compression efficiency, by the most efficient tools.

In contrast, in embodiments in which a complexity-based constraint is considered, it may be determined to start with an empty video encoder configuration and to progressively activate only those tools that maintain a certain level of complexity in order to maintain a predefined level of complexity defined as part of the constraint.

In one or more embodiments, once a determination has been made as to whether to start with a full video encoder configuration and to progressively deactivate video coding tools, or to start with an empty video encoder configuration and to progressively activate video coding tools, an efficiency value is computed with respect to a given input video sequence for each of the video coding tools that are to be evaluated, that is, that are to be tested in order to determine whether or not they are to be used for the encoding of the input video sequence.

As shown in the above correlation Table 1, the above-mentioned third and fourth embodiments for evaluating the impact of a video encoding tool are both best correlated (in absolute value) with the above-mentioned second embodiment for evaluating the impact of a video encoding tool.

Therefore, in one or more embodiments, irrespective of the determination as to whether to start with a full video encoder configuration and to progressively deactivate video coding tools, or to start with an empty video encoder configuration and to progressively activate video coding tools, an efficiency value is computed with respect to a given input video sequence for each of the video coding tools that are to be evaluated using the above-mentioned second embodiment for evaluating the impact of a video encoding tool.

In some embodiments, the determination of an efficiency value for each video coding tool may then be performed before the determination as to whether to start with a full video encoder configuration and to progressively deactivate video coding tools, or to start with an empty video encoder configuration and to progressively activate video coding tools.

Preferably, the determination of an efficiency value for each video coding tool may be performed according to the above-mentioned second embodiment for evaluating the impact of a video encoding tool.

Therefore, in one or more embodiments, it may be determined to activate or deactivate video encoding tools specified for an encoding scheme based on a constraint considered for encoding a video sequence or subsequence. In embodiments in which the constraint considered for encoding the video sequence is performance-based, a subset of video encoding tools to be activated for encoding the sequence may be determined based on computed efficiency values (e.g. efficiency ratios) by determining video encoding tools to be deactivated from an initial configuration in which all the video encoding tools are activated. In embodiments in which the constraint considered for encoding the video sequence is complexity-based, a subset of video encoding tools to be activated for encoding the sequence may be determined based on computed efficiency values (e.g. efficiency ratios) by determining video encoding tools to be activated from an initial configuration in which none of the video encoding tools are activated.

In one or more embodiments, a plurality of efficiency values (e.g. a plurality of efficiency ratios) respectively corresponding to a plurality of video encoding tools in a set of video encoding tools specified for the encoder may be determined, and the computed efficiency values may be ordered in order to generate an corresponding ordered sequence of efficiency values.

Figure 2B:
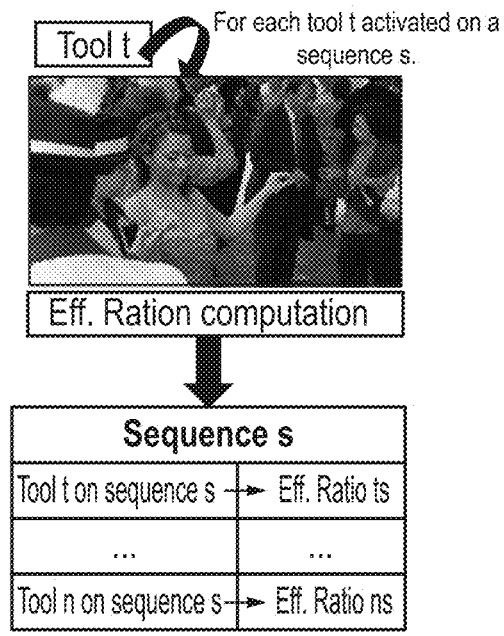

For example, as illustrated on FIG. 2b, for each video encoding tool t activated for encoding a video sequence s (based on the selected initial configuration of the video encoder), an efficiency value (e.g. an efficiency ratio) may be computed (201). Further, a table may be built (202) that associates each tool t with a corresponding efficiency value computed for the tool t when activated for encoding the video sequence s.

Further, in some embodiments, for a given video sequence, the video encoding tools may be sorted based on the determined ordered sequence of efficiency values. For example, the video encoding tools may be sorted in descending order of their corresponding efficiency values (e.g. their efficiency ratios), that is, from the most efficient tool to the least efficient one. For example, as illustrated on FIG. 2c, for the video sequence s, the table may be sorted in descending order of efficiency values, so that the respectively corresponding video encoding tools may be ordered (203) to generate an ordered sequence of video encoding tools.

Therefore, in one or more embodiments, a plurality of video encoding tools may be sorted according to an ordered sequence of corresponding efficiency values.

Figure 2C:
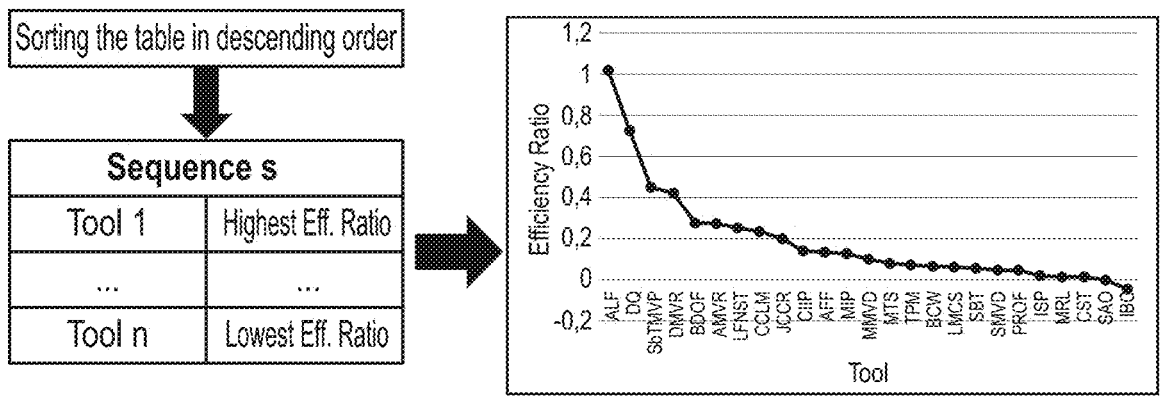

Provided for purposes of illustration, FIG. 2c illustrates an exemplary curve of global performances of a VVC encoder, starting with a cumulative efficiency ratio of all the VVC video encoding tools (of a set of VVC video encoding tools comprising the following VVC video encoding tools: ALF, DQ, SbTMVP, DMVR, BDOF, AMVR, LFNST, CCLM, JCCR, CIIP, AFF, MIP, MMVD, MTS, TPM, BCW, LMCS, SBT, SMVD, PROF, ISP, MRL, CST, SAO, and IBC) and showing the decrease of the cumulative efficiency ratio as the VVC video encoding tools are progressively deactivated.

In one or more embodiment, a constraint (e.g. an encoding performance-based constraint or a complexity-based constraint) may be defined to be used for performing a scheme for determining an optimized configuration of the video encoder, for example according to one of the above-described approaches. In some embodiments, the ordered sequence of video encoding tools may be used to, depending on the embodiment, activate or deactivate, in groups or one after the other, the video encoding tools until the defined constraint is fulfilled when encoding the video sequence s. In some embodiments, the ordered sequence of efficiency ratios may be used to, depending on the embodiment, activate or deactivate, in groups or one after the other, the video encoding tools until the defined constraint is fulfilled when encoding the video sequence s.

In one or more embodiment, the constraint may be defined to comprise a threshold. For example, an encoding performance-based constraint may be defined to comprise an encoding performance threshold, for example a threshold expressed as a BD-rate percentage (e.g. in case of a VVC encoder a percentage as compared to HEVC), and a complexity-based constraint may be defined to comprise a complexity threshold.

Figure 2D:
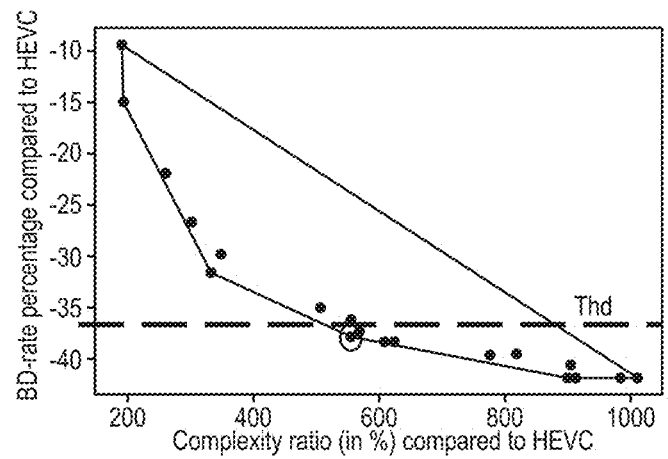

For example, in some embodiments, as illustrated on FIGS. 2a, 2c and 2d, the table 203 and/or the graph 204 of FIG. 2c may be used to provide an order of deactivation of the video encoding tools, starting from the least efficient (that is, the one associated with the lowest efficiency ratio) until reaching the constraint (threshold value 205a), which is illustrated on FIG. 2d as a threshold expressed as a specific level of BD-rate percentage compared to HEVC.

In one or more embodiments, the determination of an optimized configuration of the encoder, for example according to one of the above-described approaches, by, depending on the embodiment, activating or deactivating, in groups or one after the other, the video encoding tools (in some embodiments until a defined constraint is fulfilled) when encoding the video sequence s may comprise measuring global performances of the video encoder for encoding the video sequence as configured with configurations defined by the set of video encoding tools that are activated. Such measurements may be used to build a global performance curve (such as, as illustrated on FIG. 2d, a BD-rate/complexity curve) which may be seen as a Pareto set curve based on which an optimum point corresponding to an optimum configuration can be determined.

FIG. 2d shows a curve of an encoding performance (in the illustrated example expressed as a BD-rate percentage compared to HEVC) versus a computational complexity (in the illustrated example expressed as a complexity ratio (in %) compared to HEVC) of a VVC encoder. The points of the curve respectively correspond to configurations of the VVC encoder in which video encoding tools are progressively deactivated in the order defined by the previously determined sequence of ordered video encoding tools. Each point of the curve is defined by an encoding performance value and a computational complexity value of the VVC encoder with the corresponding configuration.

As illustrated on FIG. 2d, the BD-rate/complexity curve 205b of global performances of the video encoder with different configurations, obtained from the progressive deactivation (or activation) of video encoding tools, e.g. one after the other in the predefined order (e.g. based on the respective efficiency value measured for the video encoding tools), is a convex curve.

The constraint may be applied as a threshold Thd 205a, as illustrated on FIG. 2d. The target of the proposed scheme in some embodiments is to reach an optimal performance represented by the point where the trade-off between the BD-rate and the complexity is at its maximum given the considered threshold 205a. This can be expressed by the point (circled on FIG. 2d) that at the same time, corresponds to the highest compression level and to the lowest complexity level while satisfying the compression efficiency threshold Thd 205a. This point of the Pareto set convex curve may be referred to as the "optimal point".

In one or more embodiments, it may be determined that all the video encoding tools that are activated in the configuration corresponding to this optimum point contribute to reach the performance of the encoder deemed optimum given the considered constraint, while the tools that are beyond this point may be considered as uselessly draining the performances, for example because they incur an additional complexity considered too high given the performance benefits they contribute to the video encoder global performances. This optimal point is exactly the point at which the efficiency ratio of the global performance reaches its maximum before decreasing.

Figure 2E:
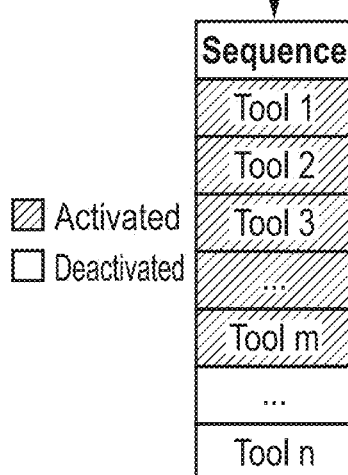
Figure 2E:
Figure 3A:
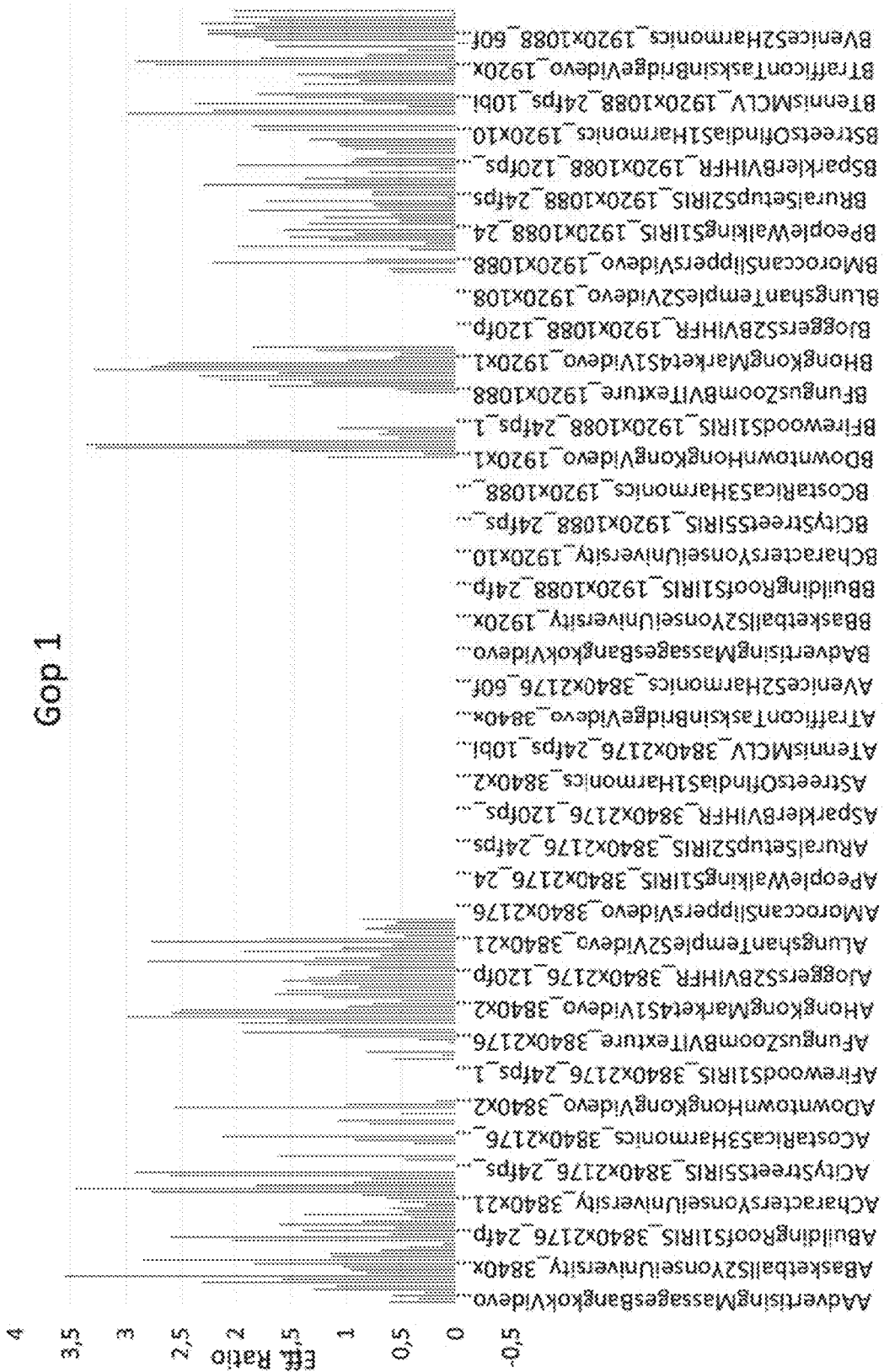
FIGS. 3a-3d illustrates the performances of the exemplary SMVD tool for encoding four GOPs across various video sequences.
Figure 3B:
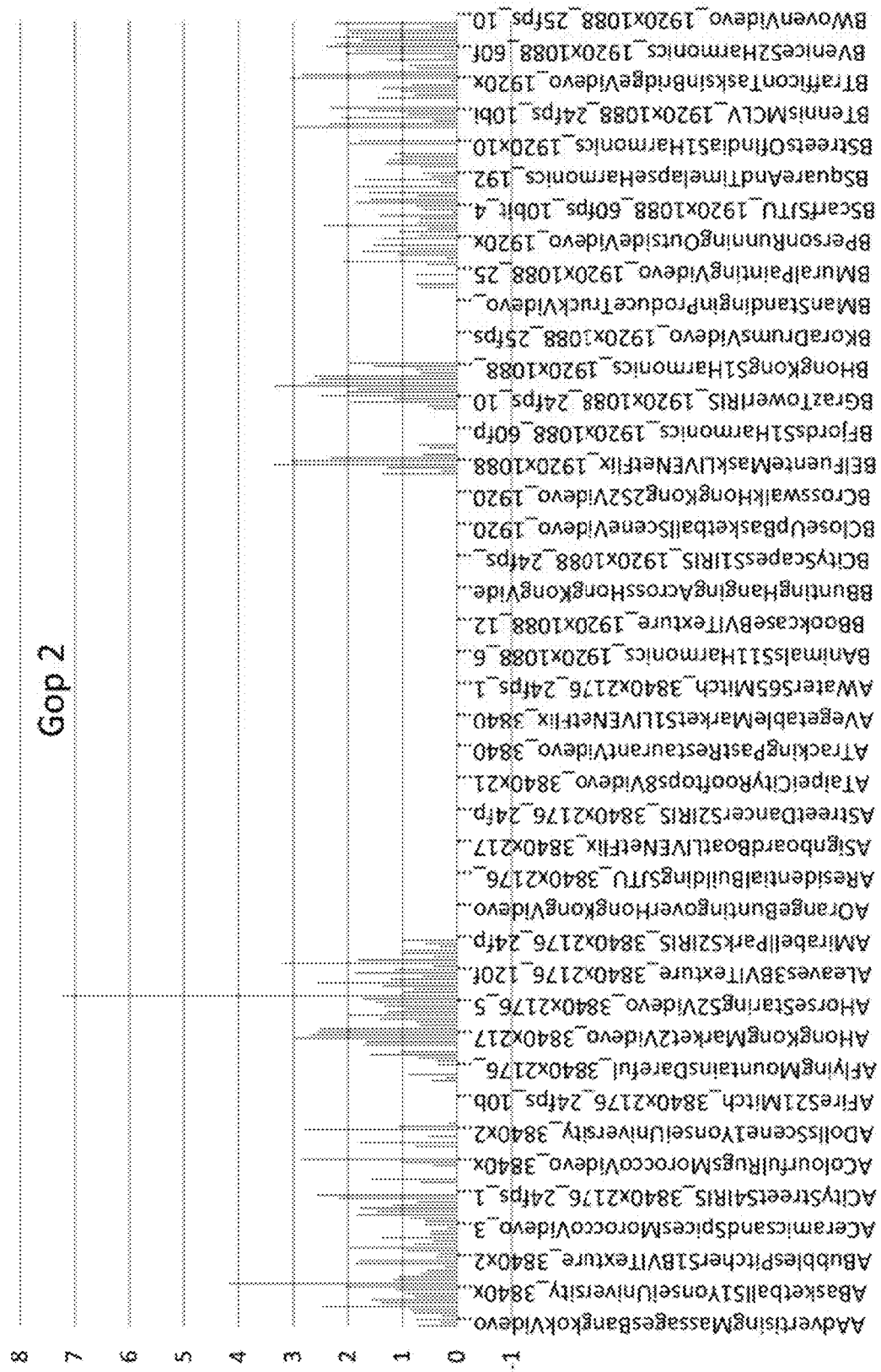
Figure 3C:
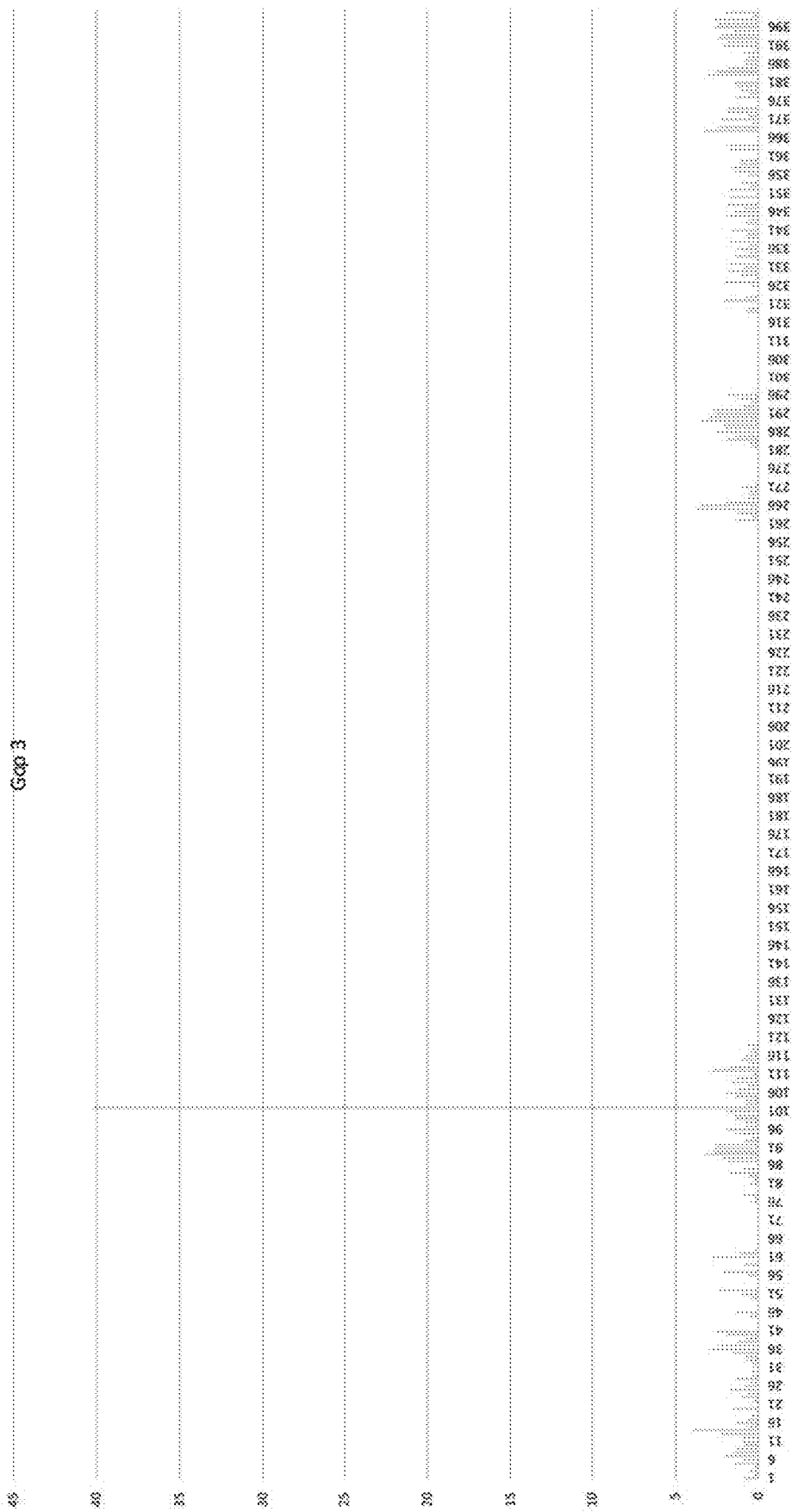
Figure 3D:
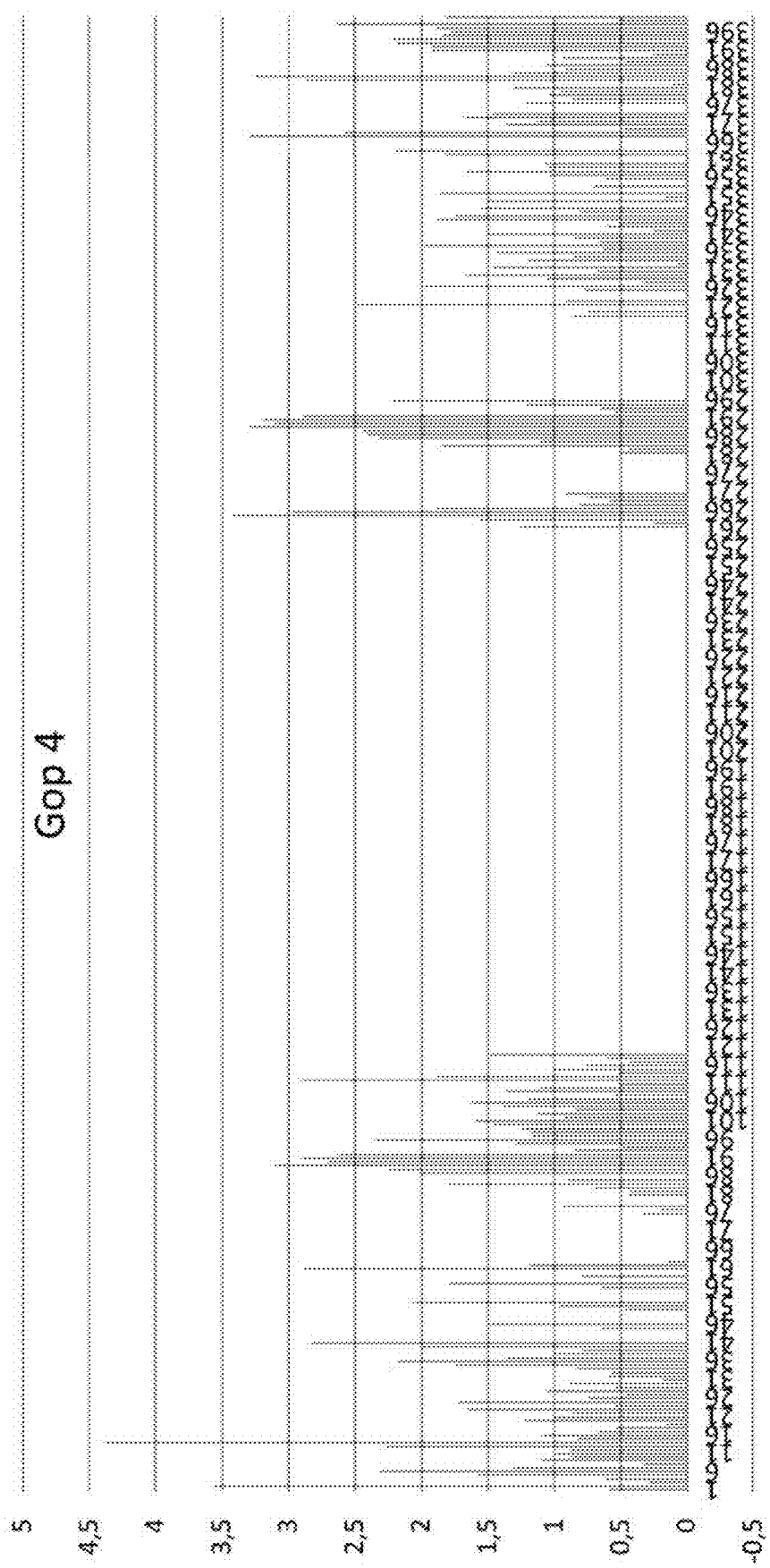

As illustrated on FIG. 2e, a subset of video encoding tools to be activated for encoding the video sequence s may be determined (206) based on this optimum point defining a boundary between video encoding tools that are to be activated for encoding the video sequence s for reaching the optimum, and video encoding tools that are to remain deactivated or, depending on the embodiment, that are to be deactivated.

Therefore the proposed method advantageously allows in some embodiments, for a given video sequence s, to determine a set of video encoding tools to be activated in order to optimize a video encoder for encoding the video sequence s, in some embodiments under a predefined constraint. For a given video encoding tool, it may therefore be determined, based on an efficiency value determined for the video encoding tool for encoding the video sequence s, whether or not it belongs to the set of video encoding tools to be activated in order to optimize the video encoder for encoding the video sequence s determined according to embodiments of the proposed method.

As discussed above, the problem of determining whether or not to activate a given video encoding tool, and more generally the problem of determining an encoder configuration deemed optimum through determining which of a set of video encoding tools should be activated, for encoding a given input video sequence, possibly given one or more optimization constraints, can be viewed in some embodiments as a bi-objective optimization problem where the objective is to maximize an entity on the one hand while minimizing another entity on the other hand. This bi-objective optimization problem can be addressed through different embodiments that take into account a type of considered constraint, if any:

In embodiments where an encoding performance related constraint (e.g. a compression efficiency constraint) is considered, for any given (minimal threshold) compression efficiency, the proposed method of the present subject disclosure can be implemented in order to obtain one or more tools that are to be activated for fulfilling a compression efficiency constraint, or in some embodiments an optimum selection of tools that are to be activated for achieving a minimized complexity.

In embodiments where an computational complexity related constraint (e.g. a compression efficiency constraint) is considered, for any fixed (maximum) complexity for encoding a video sequence, the proposed method of the present subject disclosure can be implemented in order to obtain one or more tools that are to be activated for fulfilling a complexity constraint, or in some embodiments an optimum selection of tools that are to be activated for achieving a maximized compression efficiency.

In exemplary embodiments where the constraint is defined as a minimum compression efficiency, such as, for example a minimum compression efficiency for VVC of 30% better than HEVC, the proposed scheme may in some embodiments aim at determining the largest possible set of most efficient video encoding tools to be activated for encoding a given video sequence, while the other video encoding tools that are available are or remain deactivated.

In such embodiments (where the objective is to determine an optimum encoder configuration defined by the largest possible set of most efficient video encoding tools to be activated for encoding a given video sequence), an initial encoder configuration corresponding to a full configuration (that is, with all the video encoding tools specified for the encoder activated) may preferably be first considered, and the least efficient tools may be progressively deactivated, in units (one by one) or in groups.

In other exemplary embodiments where the constraint is defined as a limited level of complexity, such as, for example a limited level of additional complexity as compared to HEVC (e.g. 4 times more complex than HEVC), the proposed scheme may in some embodiments aim at determining the largest possible set of most efficient video encoding tools to be activated for encoding a given video sequence, with the other video encoding tools that are available being or remaining deactivated while maintaining a certain level of added complexity.

In such embodiments (where the objective is to determine an optimum encoder configuration defined by the largest possible set of most efficient video encoding tools to be activated for encoding a given video sequence while maintaining a certain level of added complexity), an initial encoder configuration corresponding to an empty configuration (that is, with all of the video encoding tools specified for the encoder deactivated) may be first considered, as this configuration provides the lowest complexity, and the most efficient tools may be progressively activated, in units (one by one) or in groups, for example as described above with respect to the third exemplary study.

Therefore, in one or more embodiments, an initial encoder configuration and iterations of a configuration optimization loop may be determined based on a type of constraint to be considered in priority.

In embodiments where a constraint to be considered in priority is related to encoding performances (e.g. compression efficiency), the initial encoder configuration selected may be a full configuration in which all the available video encoding tools are activated. A configuration optimization loop may be initialized with this initial encoder configuration, and iterations of the loop may be performed in each of which one or more video encoding tools are deactivated in an increasing order of measured efficiency for encoding an input video sequence.

In embodiments where a constraint to be considered in priority is related to an encoding complexity (computational complexity), the initial encoder configuration selected may be an empty configuration in which none of the available video encoding tools are activated. A configuration optimization loop may be initialized with this initial encoder configuration, and iterations of the loop may be performed in each of which one or more video encoding tools are activated in an decreasing order of measured efficiency for encoding an input video sequence.

In some embodiments, further to determining whether to progressively activate or deactivate video encoding tools, an efficiency value (e.g. an efficiency ratio) may be determined for each video encoding tool that is to take part in the progressive activation or deactivation. The video encoding tools may then be sorted based on their respective efficiency values. In some embodiments, once the video encoding tools are sorted based on their respective efficiency values (e.g. efficiency ratios), a set of video encoding tools to be activated or deactivated, and an order of activation or deactivation, as the case may be, may be determined for each input video sequence with respect to the considered constraint, based on the sorted sequence of video encoding tools.

FIGS. 3a-3d respectively show performances of the exemplary SMVD tool (expressed as values of an efficiency ratio) for encoding four GOPs of several video sequences. Each video sequence shown on FIGS. 3a-3d comprises four GOPs, and the four charts shown on FIGS. 3a-3d respectively correspond to the performances, expressed in terms of a computed efficiency ratio, obtained when encoding the first, second, third or fourth GOP of video sequences using the SMVD VVC tool.

As illustrated by FIGS. 3a-3d, SMVD provides variable performances for different video sequences as well as for different GOPs of the same sequence. This illustrates how the performances of one video encoding tool may vary across different video sequences, but also across different GOPs (that is, subsequences) of the same video sequence. For example, SMVD shows highly variable efficiency ratio values across the four GOPs of the video sequence referenced 'AKartingIRIS3840x217624fps10bit420': For this sequence, SMVD yields a somewhat consistent performance level in GOPs 1, 2 and 4, while SMVD yields much higher performances on the third GOP of the sequence.

As a consequence, advantageously, in one or more embodiments, an input video sequence is processed using the proposed scheme by considering subsequences thereof of a predefined maximum size. The maximum size of the subsequences may be chosen as the maximum size for which the available video encoding tools that participate to an encoder configuration, and which may be activated or deactivated, show a somewhat constant level of performances within the subsequences.

In some embodiments, an efficiency value may therefore be determined for a given video encoding tool at the granularity level of a subsequence (preferably of a predefined size) of a given input video sequence. Therefore, in some embodiments, the input video sequence may first be divided into subsequences, for example GOPs of a predefined size (except maybe for one GOP of the sequence), and an efficiency value may be determined for the video encoding tool for each of the subsequences, thereby advantageously obtaining efficiency values that more accurately represent the efficiency of the tool within the corresponding subsequence. As the determination to activate or not the video encoding tool may be made in some embodiments based on the determined efficiency value, processing the input video sequence at the level of subsequences (e.g. GOPs) also advantageously improves the determination made on the subsequence as such determination is based on an efficiency value of an increased accuracy.

Therefore, in one or more embodiments, the determining of whether to activate the video encoding tool for the encoding may be made for the encoding of each subsequence of an input video sequence, and be based on the efficiency value determined for the video encoding tool on the subsequence.

For example, in some embodiments, test input video sequences on which the proposed scheme may be applied may be divided into 4 GOPs, each of which comprising 16 frames, and an efficiency ratio may be calculated for each GOP of each test input video sequence.

Figure 4:
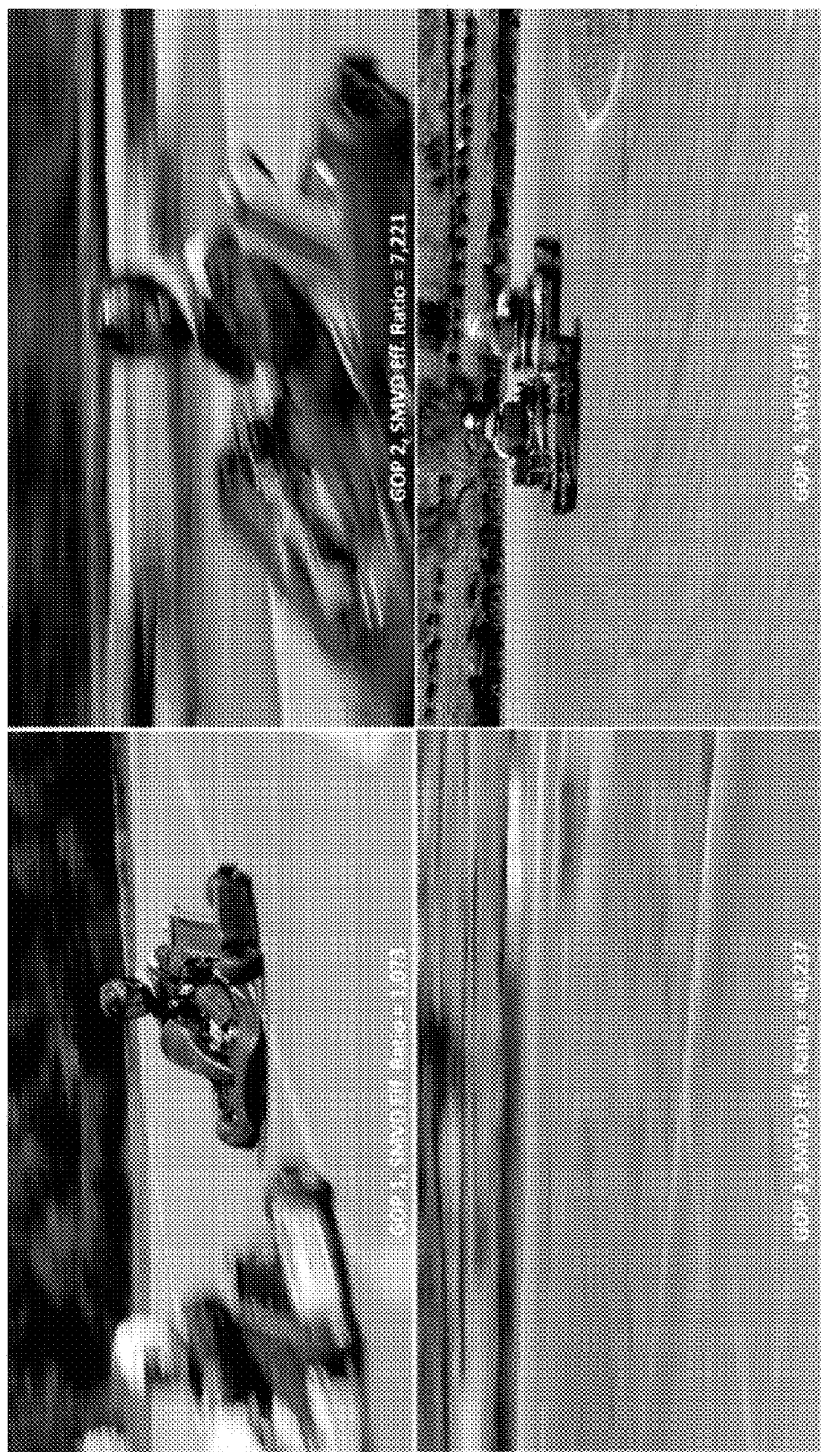
FIG. 4 illustrates the performances of the exemplary SMVD tool for encoding the four GOPs of an exemplary video sequence.

FIG. 4 illustrates shows the performances of the exemplary SMVD tool for encoding the four GOPs of an exemplary video sequence, referred to as 'AKartingIRIS3840x217624fps10bit420' in the BVI-DVC dataset.

FIG. 4 shows 4 frames respectively comprised in 4 GOPs of the 'AKartingIRIS3840x217624fps10bit420' video sequence of the BVI-DVC data set. The efficiency ratio measured for the VVC SMVD video encoding tool is indicated for each of the GOPs: For the first GOP (GOP 1), the efficiency ratio value of the SMVD tool is 1,073, for the second GOP (GOP 2), the efficiency ratio value of the SMVD tool is 7,221, for the third GOP (GOP 2), the efficiency ratio value of the SMVD tool is 40,237, and for the fourth GOP (GOP 4), the efficiency ratio value of the SMVD tool is 0,926.

This example illustrates the impact that the content of an input video sequence may have on the performances of a given video encoding tool as measured by an efficiency ratio. In the following, further exemplary embodiments of the proposed method are described.

In one or more embodiments, the proposed method may be used for determining a set of one or more video encoding tools to be activated in an optimum performance vs. complexity configuration (without any encoding performance related constraint or encoding computational complexity related constraint), given an encoding performance constraint (e.g. a compression efficiency constraint), and/or given an encoding computational complexity constraint.

As described above, the type of constraint (encoding performance related constraint or encoding computational complexity related constraint) may in some embodiments lead to determine whether to activate or deactivate a set of video encoding tools starting from a corresponding initial video encoder configuration, for performing measurements of performances of the video encoder with corresponding configurations in which video encoding tools are progressively activated or deactivated.

Once an efficiency value (e.g. an efficiency ratio as described above) has been determined for each of the video encoding tools, the tools may be sorted by ascending or descending order of their corresponding efficiency value.

The following table (Table 2) shows an exemplary set of video encoding tools specified for the VVC codec standard with their corresponding efficiency ratio determined on the exemplary sequence 'Tango' of the BVI-DVC dataset:

TABLE 2

| Video encoding tool | Efficiency Ratio |
|---|---|
| ALF | 1.019 |
| DQ | 0.723 |
| SbTMVP | 0.448 |
| DMVR | 0.416 |
| BDOF | 0.271 |
| AMVR | 0.27 |
| LFNST | 0.251 |
| CCLM | 0.23 |
| JCCR | 0.2 |
| CIIP | 0.141 |
| AFF | 0.13 |
| MIP | 0.128 |
| MMVD | 0.098 |
| MTS | 0.079 |
| TPM | 0.071 |
| BCW | 0.061 |
| LMCS | 0.06 |
| SBT | 0.052 |
| SMVD | 0.045 |
| PROF | 0.042 |
| ISP | 0.016 |
| MRL | 0.012 |
| CST | 0.01 |
| SAO | −0.006 |
| IBC | −0.049 |

In Table 2, the lowest efficiency ratios indicate the poorest performing tools. Hence, in embodiments in which tools are progressively deactivated, these video encoding tools should be deactivated first.

Figure 5:
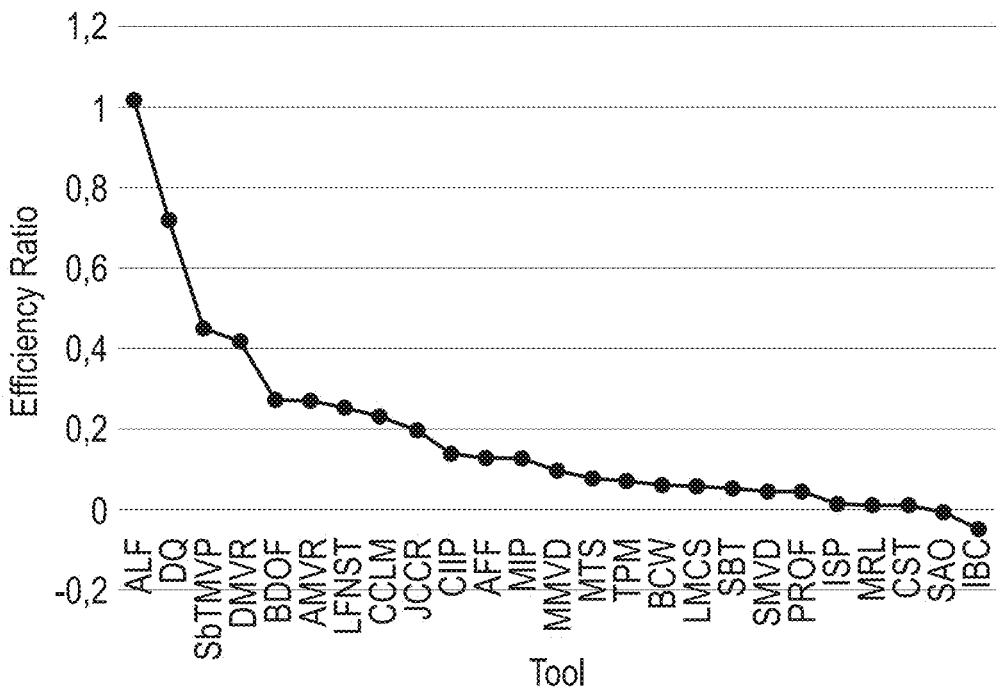
FIG. 5 illustrates efficiency ratios measured for various VVC tools used for encoding an exemplary video sequence.

FIG. 5 shows the data in Table 1 forming a curve of efficiency ratio per video encoding tools which illustrates efficiency ratios measured for various VVC tools used for encoding the exemplary 'Tango' sequence of the BVI-DVC dataset. Negative efficiency ratios correspond to video encoding tools which generate a loss in encoding efficiency.

Figure 6:
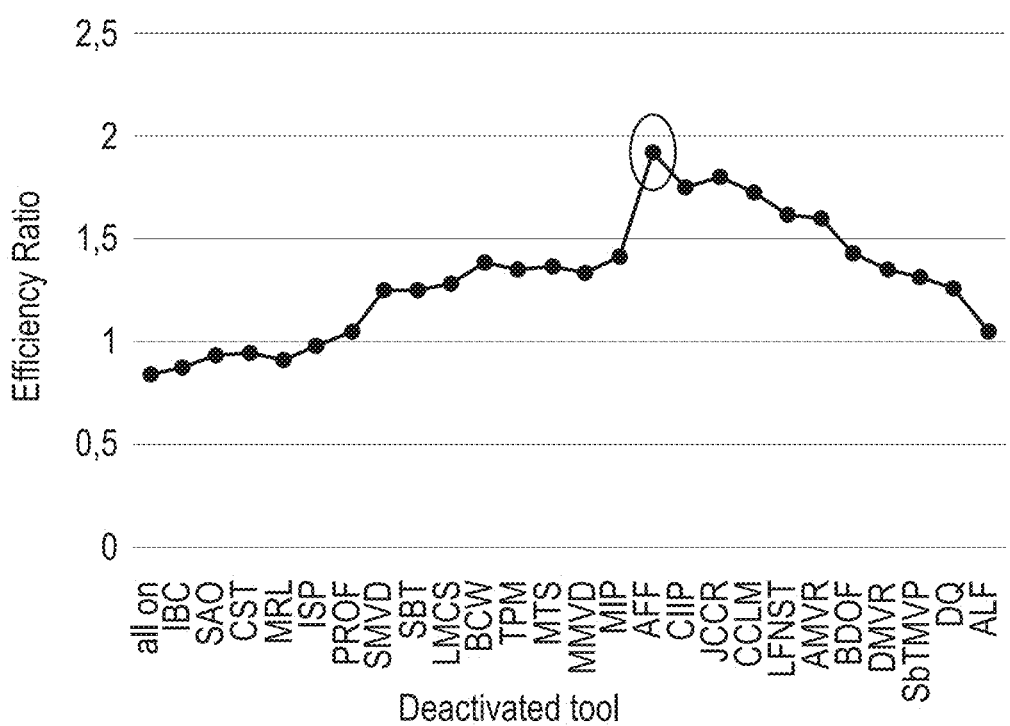
FIGS. 6 and 7 illustrate the global performance of a video encoder as measured according to one or more embodiments.
Figures 7, 8:
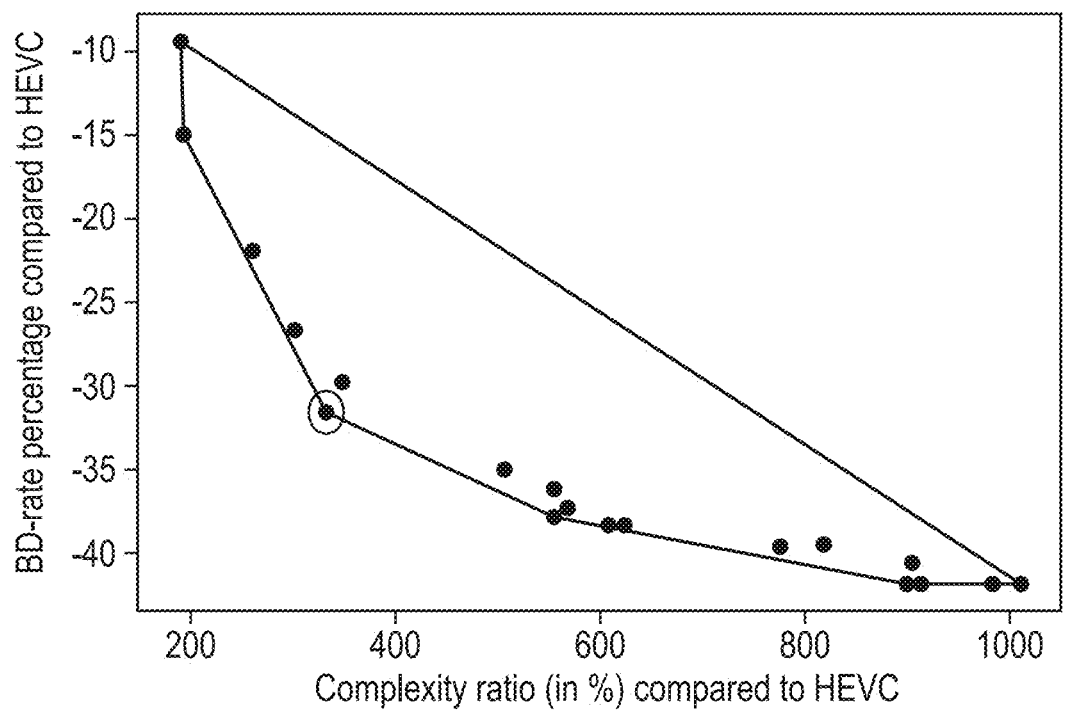
FIG. 8 shows a table of activation/deactivation results of VVC tools for the encoding of different sequences according to one or more embodiments.

FIGS. 6 and 7 illustrate the global performance of a video encoder as measured according to one or more embodiments.

In one or more embodiments, global performances of the video encoder with different configurations may be measured, for example by measuring a global efficiency ratio, that is an efficiency ratio of the video encoder configured with a set of activated video encoding tools. In some embodiments, a global efficiency ratio of the video encoder having a certain configuration may be measured by encoding the input video sequence with the video encoder as configured, and measuring an encoding performance (e.g. a compression efficiency) and an encoding complexity (e.g. a CPU runtime, that is, a CPU execution time for performing the encoding). The global efficiency ratio of the video encoder may be determined based on a ratio of the encoding performance over the encoding complexity measured for the video encoder having the certain configuration for video encoding the input video sequence.

FIG. 6 illustrates a curve of global efficiency ratios measured for a VVC video encoder having different configurations in which VVC video encoding tools are progressively deactivated according to an embodiment of the present subject disclosure.

As discussed above, in some embodiments, it may be determined to use an initial full VVC video encoder configuration ("all on") in which all considered VVC video encoding tools (on the x-axis on FIG. 6) are activated. Successive VVC video encoder configurations may be defined by deactivating one by one the VVC video encoding tools included in the full VVC video encoder configuration.

For example, as illustrated on FIG. 6, the IBC VVC tool may first be deactivated, and an efficiency ratio may be measured for the encoding of the input video sequence by the video encoder having a configuration in which all of the VVC tools on the x-axis are activated, except for the IBC VVC tool. Further, the SAO VVC tool may be deactivated on top of the IBC VVC tool, and an efficiency ratio may be measured for the encoding of the input video sequence by the video encoder having a configuration in which all of the VVC tools on the x-axis are activated, except for the IBC and SAO VVC tool, etc. All of the VVC tools on the x-axis may therefore be deactivated one by one, defining each time a VVC tool is deactivated a new configuration of the video encoder, and an efficiency ratio may be measured for the encoding of the input video sequence by the video encoder having the new configuration.

Therefore, in one or more embodiments, a plurality of performance measurements of the video encoder for encoding the input video sequence may be performed, for corresponding configurations of the video encoder in which video encoding tools are progressively activated or deactivated according to a predefined order based on their respective efficiency values (e.g. efficiency ratios). In some embodiments, each of the performance measurements may comprise a measurement of a global efficiency ratio of the video encoder for encoding the input video sequence, based on a ratio of an encoding performance over an encoding complexity measured for the video encoder having the corresponding configuration for video encoding the input video sequence.

As shown by FIG. 6, the curve of global efficiency ratios for different configurations of the video encoder increases until a maximal performance indicated by a peak of the curve is reached. Beyond this point, the curve decreases, which indicates a deflection of the performance.

Therefore FIG. 6 illustrates the evolution of performances of a VVC video encoder depending on the set of VVC video encoding tools being activated or deactivated (as VVC video encoding tools are progressively deactivated in the order shown on the x-axis: IBC, then SAO, then CST, etc.). In the curve of FIG. 6, the x-axis indicates the video encoding tools being deactivated from the left to the right, and the y-axis indicates the global efficiency ratio of the VVC encoder with the corresponding configuration (defined by the corresponding set of video encoding tools that have not been deactivated). This curve therefore represents variations in the efficiency of the video encoder for encoding an input video sequence as video encoding tools are deactivated, with a deactivation of the tools which is progressive and cumulative (each time another tool is deactivated, it is deactivated on top of previously deactivated tools). The point at which the curve reaches a maximum (circled point on FIG. 5) represents an optimal efficiency of the video encoder. In some embodiments, this point—which may be referred to as 'the optimum efficiency point'—may be used to determine a corresponding optimized configuration of the video encoder. Further, in some embodiments, the optimum efficiency point may be used to stop the deactivation of the tools (in some embodiments to stop a configuration optimization loop).

In one or more embodiments, the video encoder configuration corresponding to the optimum efficiency point corresponds to an optimum set of activated video encoding tools, and a corresponding optimum set of deactivated video encoding tools. For a given video encoding tool, a determination as to whether such video encoding tool is to be used for the encoding of the input video sequence may be made by determining whether the given video encoding tool belongs or not to the optimum set of activated video encoding tools or by determining whether the given video encoding tool belongs or not to the optimum set of deactivated video encoding tools.

In some embodiments, the determining whether to configure the video encoder to use the video encoding tool for the encoding of the video sequence may therefore be based on the position, in the ordered sequence of the video encoding tools corresponding to the ordered sequence of efficiency values (for example as shown on the x-axis of FIG. 6), of the video encoding tool with respect to a video encoding tool corresponding to a maximum value of the plurality of global performance efficiency values.

For example, as illustrated on FIG. 6, the optimum point at which the maximum global efficiency ratio is reached may correspond to a video encoding tool which may be referred to as the optimum video encoding tool (in the example of the figure the "AFF" VVC video encoding tool). For computing global efficiency ratios, the VVC video encoding tools were deactivated one after the other, starting from a full VVC video encoder configuration, according to an ordered sequence of video encoding tools determined based on an ordered sequence of respective efficiency ratios determined for the input video sequence for each of the tools comprised in the full VVC video encoder configuration (e.g. as illustrated by Table 2): in the example illustrated on FIG. 6 the video encoding tools were deactivated in the following order: IBC, then SAO, then CST, then MRL, then ISP, etc. (in the order from the last tool of Table 2 (lowest efficiency ratio obtained for the input video sequence) to the first tool of Table 2 highest efficiency ratio obtained for the input video sequence)).

In one or more embodiments, the proposed method may comprise the determining a plurality of efficiency values respectively corresponding to a plurality of video encoding tools of the set of video encoding tools, and the determining an ordered sequence of efficiency values based on the plurality of efficiency values. Then, in some embodiments, an ordered sequence of video encoding tools may be determined, based on the respective efficiency values determined for the video encoding tools.

As illustrated by FIG. 6 and FIG. 7, an optimum video encoding tool may be determined in the set of video encoding tools, depending on the embodiment by measuring global performances (global efficiency ratios as illustrated on FIG. 6 or, depending on the embodiment, global encoding performance vs. global computational complexity as illustrated on FIG. 7) of the video encoder with a plurality of configurations in which the video encoding tools are progressively activated or deactivated, based on the efficiency values (e.g. based on the ordered sequence of efficiency values), and, in some embodiments illustrated by FIG. 6, determining a maximum in the measured global performances.

The determination whether to configure the video encoder to use a given video encoding tool for the encoding of an input video sequence may in one or more embodiments be made based on the efficiency value determined for the given video encoding tool as compared to the efficiency value determined for the determined optimum video encoding tool.

Therefore, in some embodiments, for a given video encoding tool, the optimum video encoding tool (AFF) may be determined, and the position of the given video encoding tool with respect to the optimum video encoding tool in the ordered sequence of video encoding tool may be used to determine whether the given video encoding tool is to be used (activated) or not. For example, in the example illustrated by FIG. 6, if the given video encoding tool is positioned on the right of the AFF video encoding tool on the x-axis (e.g. the CCLM video encoding tool), it may be determined that the given video encoding tool is to be used (in the example activated in the VVC video encoder) in the video encoder configuration for encoding the input video sequence. As another example, if the given video encoding tool is positioned on the left of the AFF video encoding tool on the x-axis (e.g. the CST video encoding tool), it may be determined that the given video encoding tool is not to be used (in the example deactivated in the VVC video encoder) in the video encoder configuration for encoding the input video sequence.

In some embodiments, for a given video encoding tool, the optimum video encoding tool (in the example of FIG. 6, AFF) may be determined, and the efficiency value determined for the given video encoding tool may be used to determine whether the given video encoding tool is to be used (activated) or not. For example, in the example illustrated by FIG. 6, the optimum video encoding tool (in the example of FIG. 6, AFF) may be determined. Then, based on a comparison of the efficiency value determined for the given video encoding tool with the efficiency value determined for the optimum video encoding tool (in the example of FIG. 6, AFF), it may be determined whether the given video encoding tool is to be used (activated) or not. In other embodiments, the position of the efficiency value of the given video encoding tool in the ordered sequence of efficiency values (such as illustrated by the example of Table 2) with respect to the position of the efficiency value of the optimum video encoding tool in said ordered sequence of efficiency values may be used to determine whether the given video encoding tool is to be used (activated) or not. The determination as to whether to configure the video encoder to use the given video encoding tool for the encoding of the video sequence may therefore in one or more embodiments be based on the position of the efficiency value determined for the given video encoding tool in the ordered sequence of efficiency values (such as illustrated by Table 2 for efficiency ratios). For example, if the given video encoding tool has an efficiency value which is higher than that of the optimum video encoding tool (e.g. the efficiency value of the CCLM video encoding tool which is higher than the efficiency value of the AFF video encoding tool in Table 2), it may be determined that the given video encoding tool is to be used (in the example activated in the VVC video encoder) in the video encoder configuration for encoding the input video sequence. As another example, if the given video encoding tool has an efficiency value which is lower than that of the optimum video encoding tool (e.g. the efficiency value of the CST video encoding tool which is higher than the efficiency value of the AFF video encoding tool in Table 2), it may be determined that the given video encoding tool is not to be used (in the example deactivated in the VVC video encoder) in the video encoder configuration for encoding the input video sequence.

In one or more embodiments, the proposed method may comprise the determining of a plurality of efficiency values respectively corresponding to a plurality of video encoding tools of the set of video encoding tools, and the determining of an ordered sequence of efficiency values based on the plurality of efficiency values.

As illustrated by FIG. 6 and FIG. 7, an optimum video encoding tool may be determined in the set of video encoding tools, depending on the embodiment by measuring global performances (global efficiency ratios as illustrated on FIG. 6 or, depending on the embodiment, global encoding performance vs. global computational complexity as illustrated on FIG. 7) of the video encoder with a plurality of configurations in which the video encoding tools are progressively activated or deactivated based on the efficiency values (e.g. based on the ordered sequence of efficiency values), and, in some embodiments illustrated by FIG. 6, determining a maximum in the measured global performances.

The determination whether to configure the video encoder to use a subset of the set of video encoding tools for encoding of an input video sequence may in one or more embodiments be made based on the respective efficiency values determined for the given video encoding tools as compared to the efficiency value determined for the determined optimum video encoding tool, for example based on the ordered sequence of efficiency values.

Therefore, in some embodiments, the optimum video encoding tool (in the example of FIG. 6, AFF) may be determined, and the position respective video encoding tools with respect to the optimum video encoding tool in the ordered sequence of video encoding tool may be used to determine a subset of video encoding tool that are to be used (activated) and/or a subset of video encoding tool that are not to be used (deactivated). For example, in the example illustrated by FIG. 6, any video encoding tool which is positioned on the right of the AFF video encoding tool on the x-axis (the subset comprising the ALF, DQ, SbTMVP, DMVR, BDOF, AMVR, LFNST, CCLM, JCCR, CIIP and AFF video encoding tools), may be determined to be used (in the example activated in the VVC video encoder) in the video encoder configuration for encoding the input video sequence. As another example, any video encoding tool which is positioned on the left of the AFF video encoding tool on the x-axis (the subset comprising the IBC, SAO, CST, MRL, ISP, PROF, SMVD, SBT, LMCS, BCW, TPM, MTS, MMVD, and MIP video encoding tools), may be determined not to be used (in the example deactivated in the VVC video encoder) in the video encoder configuration for encoding the input video sequence.

In some embodiments, for a given video encoding tool, the optimum video encoding tool (in the example of FIG. 6, AFF) may be determined, and the efficiency value determined for the given video encoding tool may be used to determine whether the given video encoding tool is to be used (activated) or not. For example, in the example illustrated by FIG. 6, the optimum video encoding tool (in the example of FIG. 6, AFF) may be determined. Then, based on a comparison of a respective efficiency value determined for any video encoding tool with the efficiency value determined for the optimum video encoding tool (in the example of FIG. 6, AFF), a subset of video encoding tool(s) that are to be used (activated) and/or a subset of video encoding tool(s) that are not to be used (deactivated) may be determined. In other embodiments, the position of a respective efficiency value of any video encoding tool in the ordered sequence of efficiency values (such as illustrated by the example of Table 2) with respect to the position of the efficiency value of the optimum video encoding tool in said ordered sequence of efficiency values may be used to determine a subset of video encoding tool(s) that are to be used (activated) and/or a subset of video encoding tool(s) that are not to be used (deactivated). For example, any video encoding tool which has an efficiency value which is higher than that of the optimum video encoding tool (e.g. the efficiency value of the CCLM video encoding tool which is higher than the efficiency value of the AFF video encoding tool in Table 2), will be determined as belonging to the subset of video encoding tool(s) that are to be used (activated) in the video encoder configuration for encoding the input video sequence. As another example, any video encoding tool has an efficiency value which is lower than that of the optimum video encoding tool (e.g. the efficiency value of the CST video encoding tool which is higher than the efficiency value of the AFF video encoding tool in Table 2), will be determined as belonging to the subset of video encoding tool(s) that are not to be used (deactivated) in the video encoder configuration for encoding the input video sequence.

The global performance of the video encoder is illustrated on FIG. 6, and could also be illustrated by an encoding performance/complexity curve, such as the curve shown on FIG. 7, showing, for each video encoder configuration (defined by a corresponding set of video encoding tools being activated or deactivated) represented by a dot of the curve, the coding performances of the video encoder (illustrated on the figure by a BD-rate percentage as compared to HEVC performance) versus the complexity (illustrated on the figure by a complexity ratio (in %) as compared to HEVC) of the video encoder.

For each new deactivation, the VVC video encoder changes its behavior as it includes a new set of remaining activated tools. A BD-rate/complexity curve, such as the one illustrated on FIG. 7, can be built with points representing the encoder behavior (as illustrated on FIG. 7 the BD-rate/complexity values obtained with the encoder for encoding the input video sequence) each time a tool is deactivated, for example in an increasing efficiency order (the lowest efficient tool being deactivated first, followed by the second lowest efficient tool, the third lowest efficient tool, etc.).

A convex BD-rate/complexity curve, such as the one illustrated on FIG. 7 can therefore be obtained. In the exemplary curve of FIG. 7, the x-axis represents the complexity ratio of the considered VVC encoder compared to HEVC, where a full VVC (all tools activated) is around 10 times (1000%) more complex than HEVC. The y-axis shows the provided BD-rate gains compared to HEVC. This curve shows that deactivating the ISP, MRL, CST and SAO video encoding tools remarkably reduces the complexity level without causing noticeable losses in the compression efficiency.

The highlighted point on the convex hull of the curve shown on FIG. 7 corresponds to the above-described optimum efficiency point shown on FIG. 6, and represents the best compromise in terms of global performance determined based on embodiments of the proposed method.

Therefore, in some embodiments, the optimum video encoding tool may be determined based on global performance measurements of the video encoder in the form as illustrated by FIG. 7. The above-described embodiments for a determination as to whether a given video encoding tool is to be used or not for the encoding of an input video sequence, or a determination of a subset of video encoding tools that are to be used (or not) for the encoding of an input video sequence, based on the determined optimum video encoding tools may in some embodiments be used with an optimum video encoding tool determined based on global performance measurements of the video encoder in the form as illustrated by FIG. 7.

All the points located on the curve of FIG. 7 (on the envelop of the curve of FIG. 7 as opposed to points located inside such envelop) correspond to an optimal trade-off between the complexity and the compression efficiency. The difference between these points may therefore be seen in embodiments a matter of priority: depending on the embodiment, the more we go to the right, the more we give priority to the compression, while going to the left means giving more importance to the complexity.

Applying the same methodology to a variety of input video sequences leads to determining different sets of video encoding tools to be activated for the encoding of each of the tested video sequences. This shows that the performances of each tools varies depending on the video sequence on which it is applied.

FIG. 8 shows a table of varying results of VVC tools for the encoding of different sequences, namely the "Tango", "FoodMarket", "Campfire", and "CatRobot" video sequences of the BVI-DVC dataset. The VVC video encoding tools listed in the table of FIG. 8 are CCLM, MRL, ISP, MIP, SbTMVP, AMVR, BCW, AFFINE, TPM, BDOF, CIIP, MMVD, SMVD, DMVR, PROF, DQ, MTS, SBT, LFNST, JCCR, ALF, LMCS, CST, SAO, and IBC.

The table indicates, for each video encoding tool and each video sequence, whether the video encoding tool was determined to be activated or deactivated using embodiments of the proposed method. As shown in the table of FIG. 8, some tools (including DQ, ALF, CCLM, SbTMVP, BDOF, and CIIP) are determined to be activated for all the tested sequences, while some other tools (MTS, SBT, ISP, MMVD, SMVD, and IBC) are determined to be deactivated for all the tested sequences. As a consequence, the remaining tools among the tools listed in the table may be determined to be activated or deactivated depending on the tested video sequence. Therefore, the table of FIG. 8 illustrates that some video encoding tools may be determined according to the proposed method to be activated for the encoding of some of the tested video sequences, while the same video encoding tools may also be determined according to the proposed method to be deactivated for the encoding of other of the tested video sequences.

FIG. 9 shows other experimental results obtained with test sequences. Specifically, FIG. 9 a table with three columns representing each an experiment launched with the VVC Test Model 8 (VTM8.0) on Class A1/A2 sequences (UHD). As a first experiment (first column), the VVC coding performance is measured with all coding tools switched on. The second column shows results of a second experiment in which all the switchable coding tools were turned off except for the tools related to partitioning. This experiment provides the lowest possible complexity, at the price of a much lower bitrate saving. A third experiment, presented in the third column, aims at finding the best complexity/bitrate trade-off. In other words, the objective of the third experiment is to conserve the highest possible proportion of the maximum bitrate gains provided by full VVC (all tools turned on), while keeping the complexity level as low as possible.

Figure 10A:
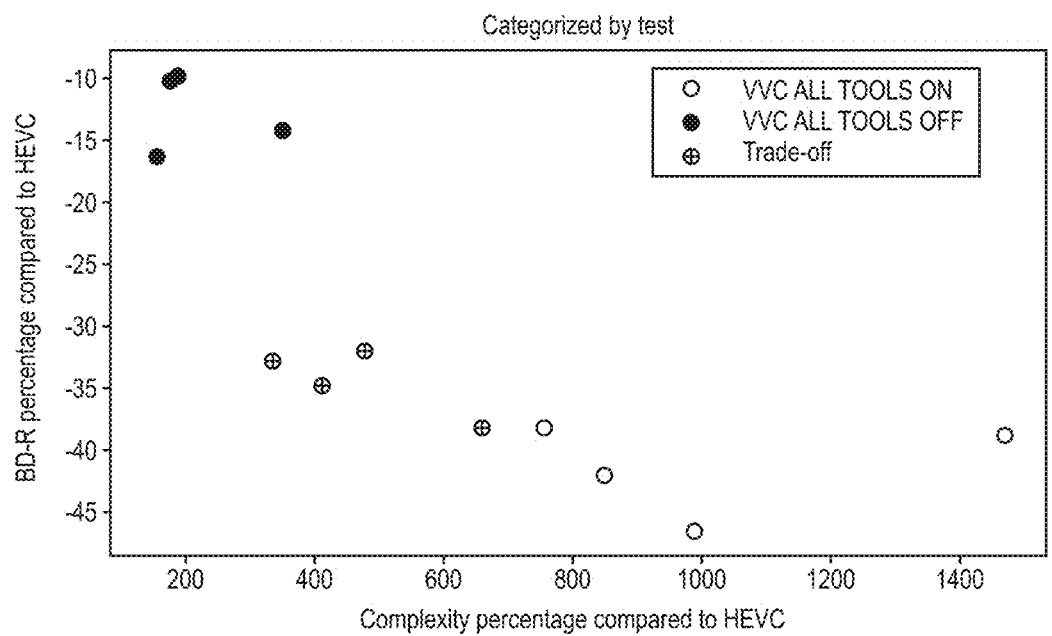
FIGS. 10a and 10b show graphs of encoding performance results of exemplary video sequences.
Figure 10B:
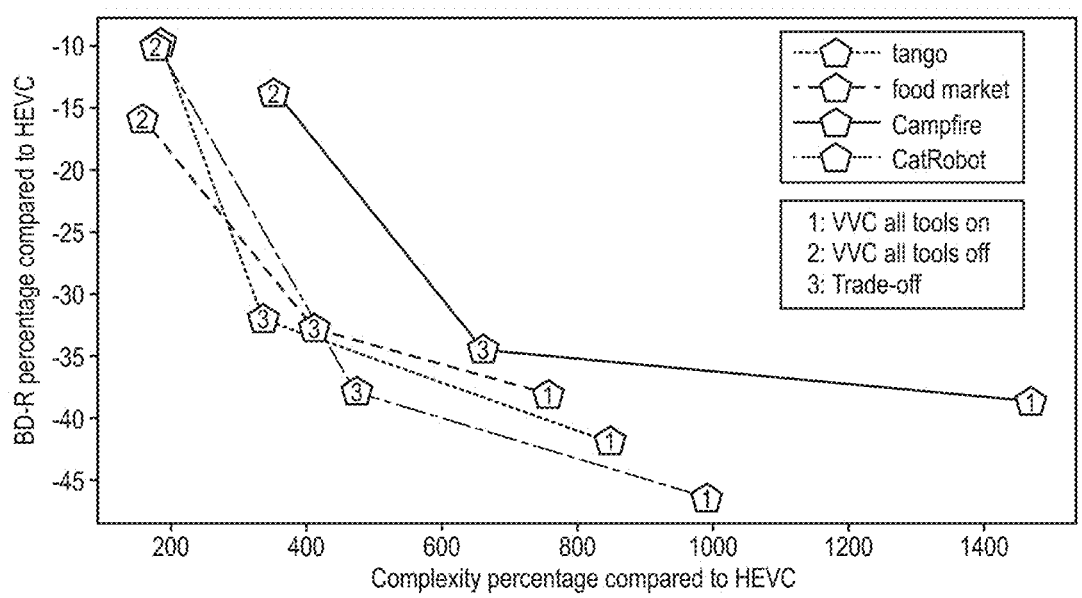

The results of the performance tests illustrated by the table of FIG. 9 are further illustrated in FIG. 10a and FIG. 10b in two different manners. In FIG. 10a, the performances points are grouped by tests as listed in the Table of FIG. 9. For example, the trade-off category corresponds to the third column of the Table of FIG. 9. As illustrated by FIG. 10a, the trade-off test advantageously provides a compromise between, on the one hand a compression efficiency not far from the maximum one achieved by full VVC, and on the other hand a reasonable complexity not far from the one achieved by the least complex VVC encoder, with all tools being deactivated. FIG. 10b illustrates a tradeoff determined for each video sequence (among the "Tango", "Food Market", "Campfire", and "CatRobot").

These results illustrate that encoding frameworks such as VVC can provide, through an optimum subset of video encoding tools that can advantageously be determined using embodiments of the present subject disclosure, sufficient gains with less added computational complexity. Advantageously, the proposed method can determine an encoder configuration which is twice as less complex than full VVC, for a bitrate saving only 1.2 times lower. The trade-off encoder configuration determined using the proposed scheme deactivates some video encoding tools (typically those bringing minor gains compared to the added complexity). Since both VVC and Enhanced Video Coding (EVC) benefit from similar partitioning scheme and tools, embodiments of the proposed method can be applied on EVC or other future standard in the near future.

Figure 11A:
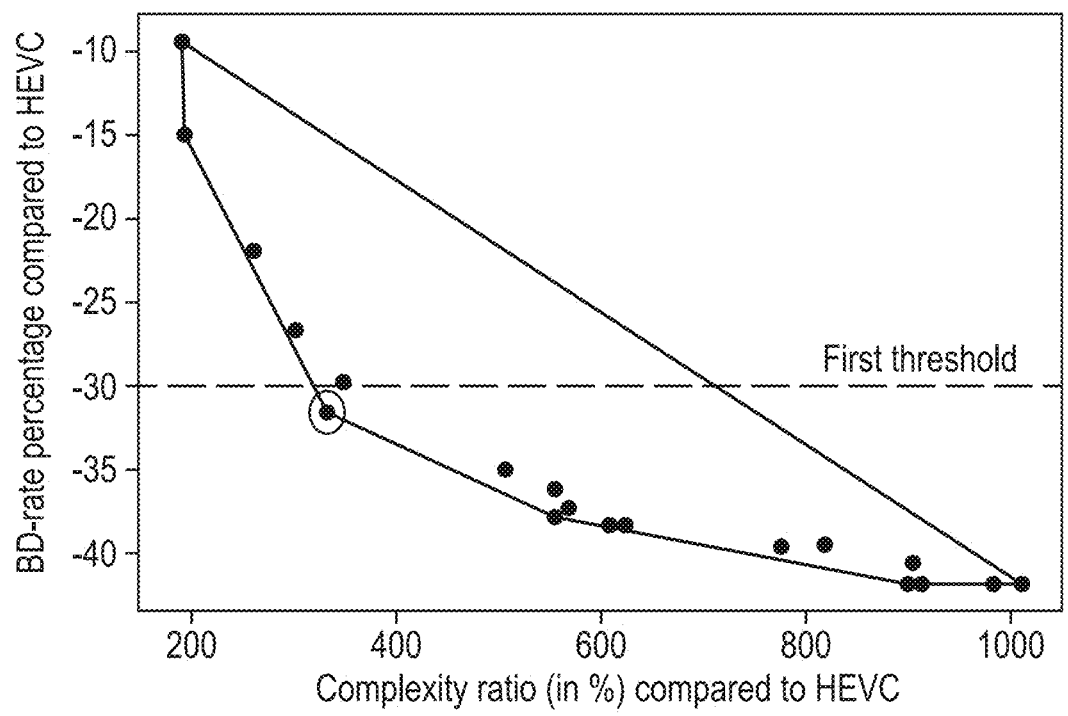
FIGS. 11a-11c illustrate graphs of global performances of a video encoder as measured according to one or more embodiments.
Figure 11B:
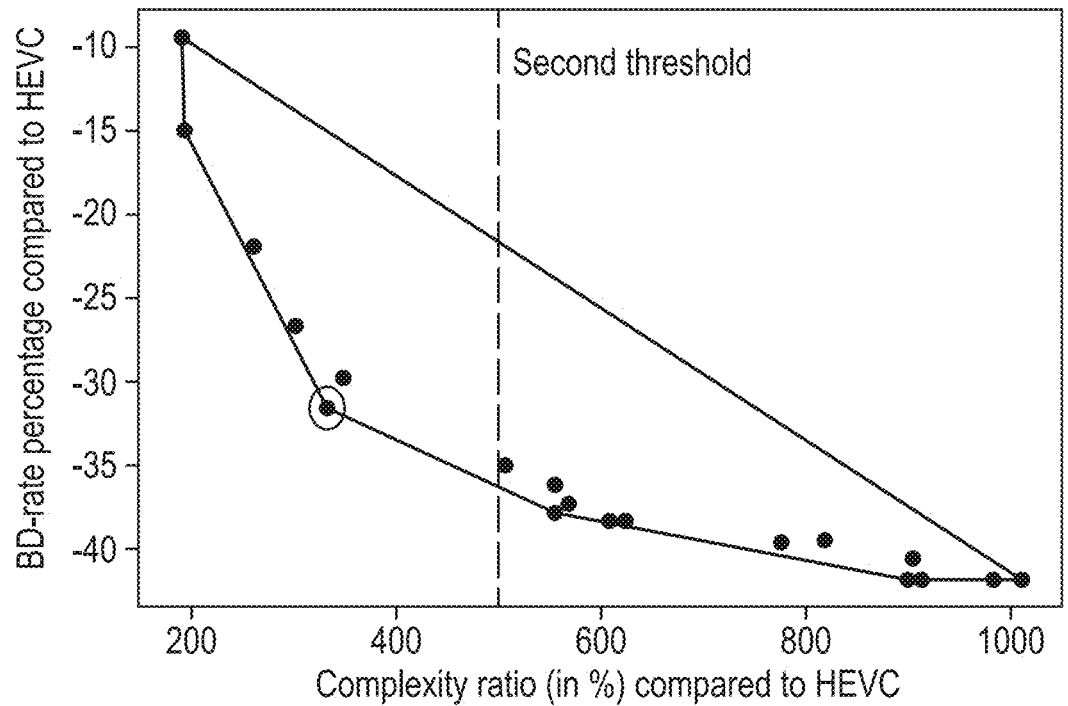
Figure 11C:
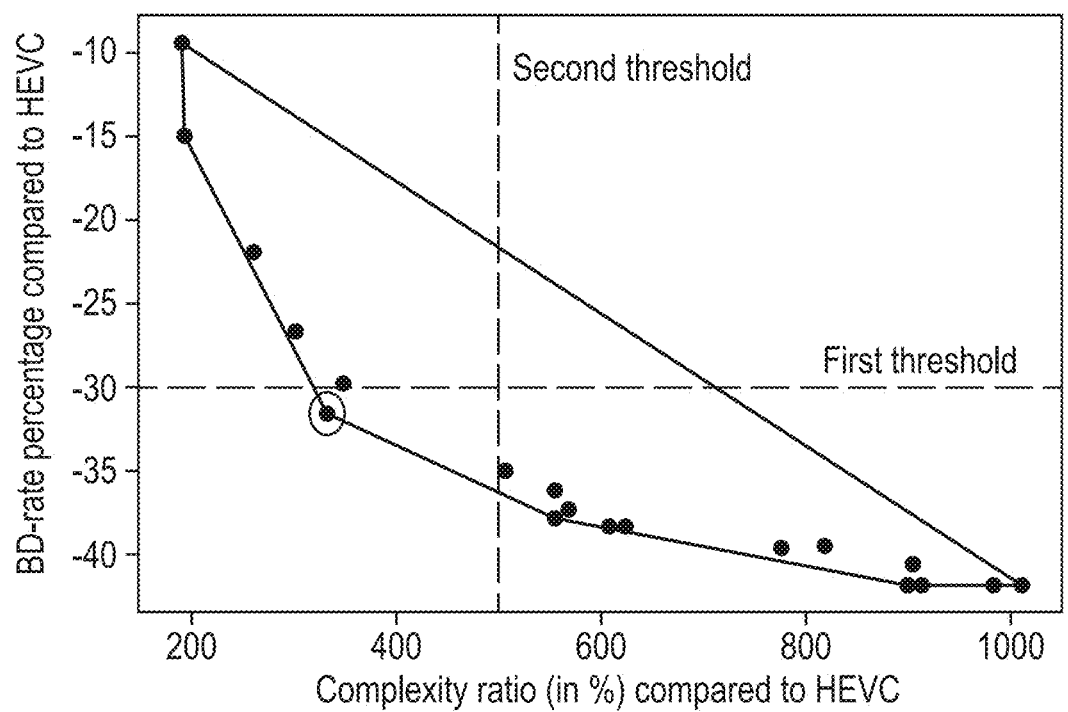
Figure 12A:
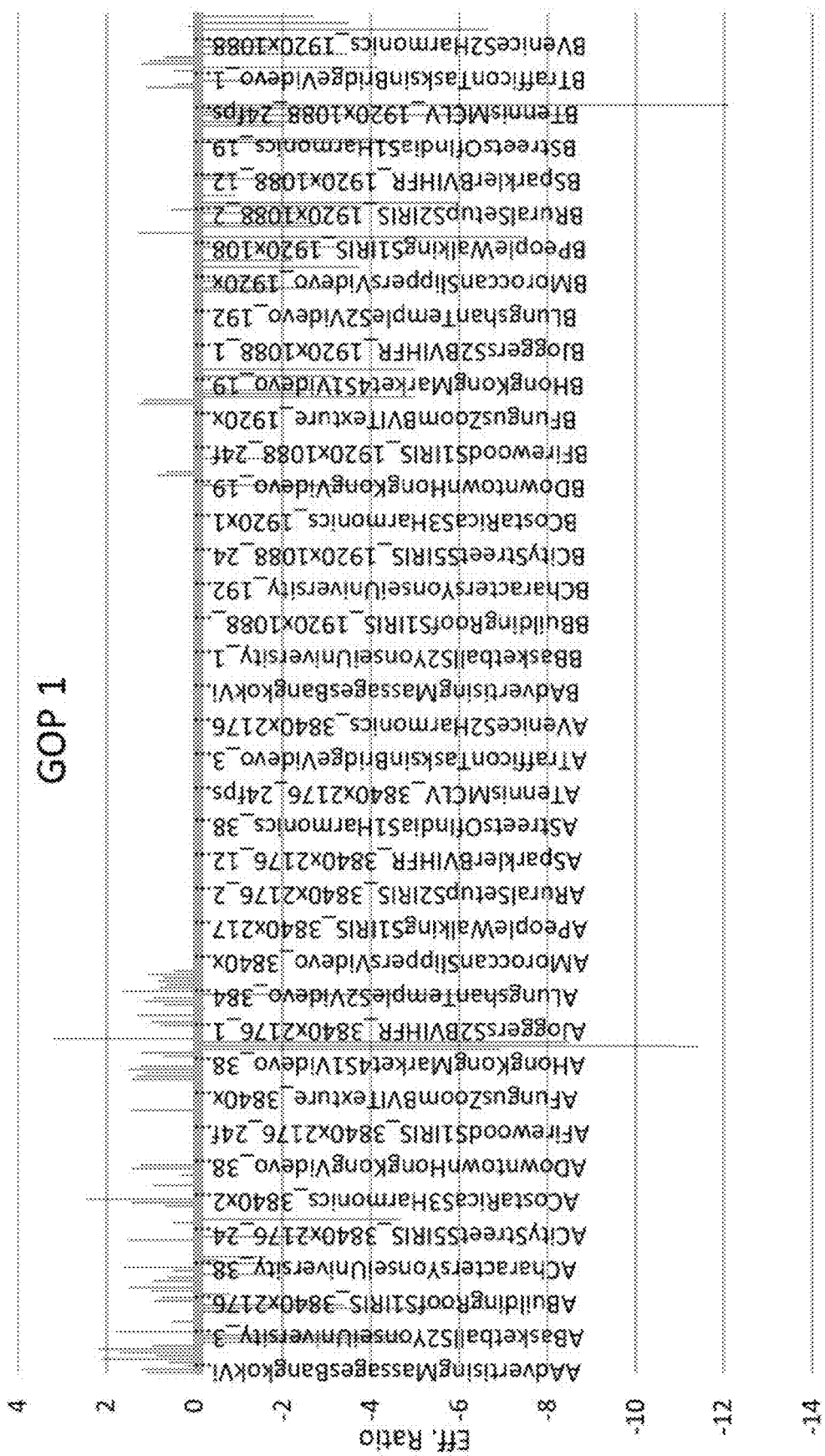
FIGS. 12a-12d illustrates the performances of an exemplary video encoding tool for encoding four GOPs across various video sequences.
Figure 12B:
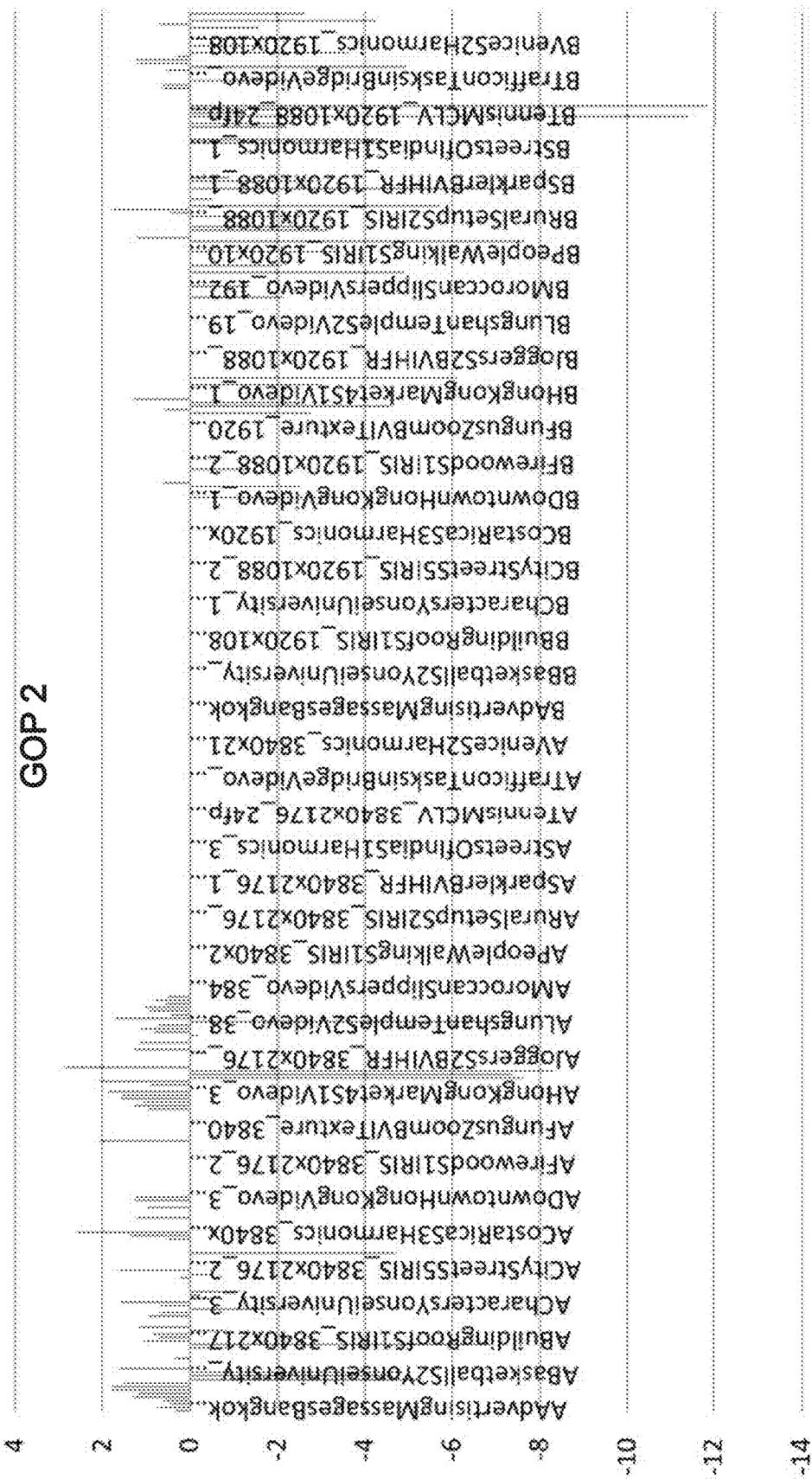
Figure 12C:
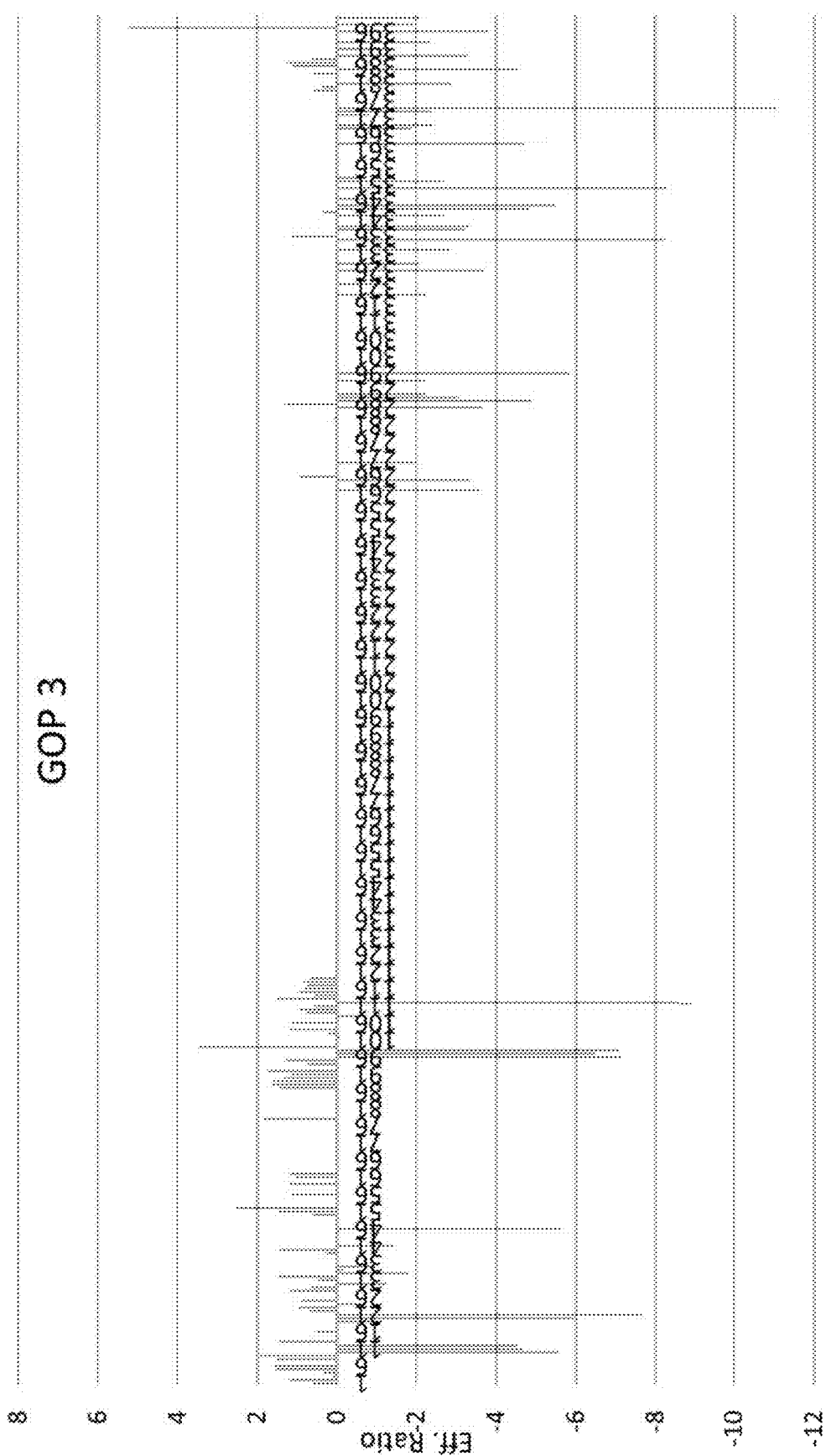
Figure 12D:
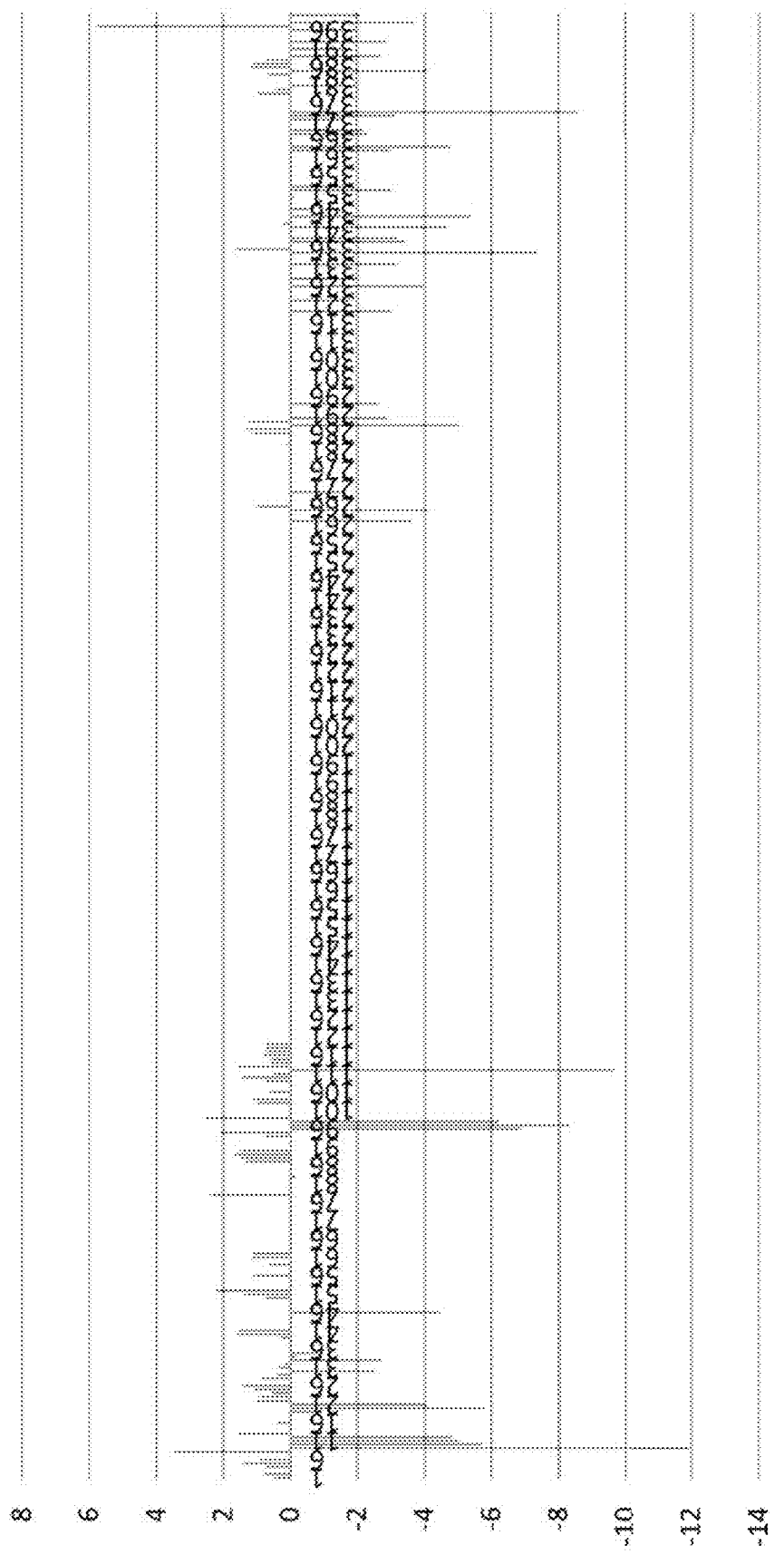

FIGS. 11a-11c illustrate graphs of global performances of a video encoder as measured according to one or more embodiments.

Specifically, FIGS. 11a-11c illustrate embodiments corresponding to different uses-cases in which an encoding performance related constraint, a computational complexity related constraint, and both an encoding performance related constraint and a computational complexity related constraint, respectively, are considered. According to embodiments of the proposed method, an ordered sequence of video encoding tools that provides the optimized operation of VVC can be determined, taken into account the imposed constraints.

Depending on the type of considered constraint, it may be determined to progressively activate or deactivate the video encoding tools of the considered video encoder. In the illustrated examples of FIGS. 11a-11c, the full VVC configuration (all tools on) is represented as the last point on the right of the curve, while the 'VVC all tools off' configuration is represented as the first point on the left of the curve.

As described in connection with FIG. 7, global performances of the video encoder with different configurations may be measured, and may in some embodiments be illustrated by an encoding performance/complexity curve, such as the curves shown on FIGS. 11a-11c, showing, for each video encoder configuration (defined by a corresponding set of video encoding tools being activated or deactivated) represented by a dot of the curve, the coding performances of the video encoder (illustrated on the figure by a BD-rate percentage as compared to HEVC performance) versus the complexity (illustrated on the figure by a complexity ratio (in %) as compared to HEVC) of the video encoder. A convex BD-rate/complexity curve, such as the one illustrated on FIGS. 11a-11c can therefore be obtained. In the exemplary curve of FIGS. 11a-11c, the x-axis represents the complexity ratio of the considered VVC encoder compared to HEVC, where a full VVC (all tools activated) is around 10 times (1000%) more complex than HEVC. The y-axis shows the provided BD-rate gains compared to HEVC.

FIG. 11a illustrates an exemplary embodiment where an encoding performance constraint (for example as shown on the figure a 30% encoding DB-rate gain as compared to HEVC) is considered.

In embodiments where the considered constraint is of a type related to encoding performances (e.g. compression efficiency), the initial encoder configuration used for determining an optimum configuration characterized by a set of video encoding tools to be activated may be the full configuration (in the example of VVC the full VTM configuration) in which all the video encoding tools are initially activated. The video encoding tools are then successively deactivated, for example one after the other, starting from the least efficient tool (which would be, for the present exemplary case, the "IBC" VVC tool listed at the bottom of Table 2), until reaching the limit of the constraint. The convex hull curve advantageously guarantees an optimized performance for all its points. Consequently, the last point on the curve before reaching the limit (circled on the figure) is the optimal performance the encoder can have on this content under this constraint.

FIG. 11b illustrates an exemplary embodiment where an encoding computational complexity constraint (for example as shown on the figure a limit of a complexity 5 times higher (500%) than that of HEVC) is considered.

In embodiments where the considered constraint is of a type related to encoding computational complexity, the initial encoder configuration used for determining an optimum configuration characterized by a set of video encoding tools to be activated may be the empty configuration (in the example of VVC the empty VTM configuration) in which all the video encoding tools are initially deactivated. The video encoding tools are then successively activated, for example one after the other, starting from the most efficient tool, until reaching the limit of the constraint. For example, as illustrated on the figure, the video encoding tools may be successively activated starting from the left by activating the tools one after the other FIG. 11c illustrates an exemplary embodiment in which both an encoding computational complexity constraint (for example as shown on the figure a limit of a complexity 5 times higher (500%) than that of HEVC) is considered.

FIGS. 12a-12d respectively show performances of the exemplary LMCS tool (expressed as values of an efficiency ratio) for encoding four GOPs of several video sequences. Each video sequence shown on FIGS. 12a-12d comprises four GOPs, and the four charts shown on FIGS. 12a-12d respectively correspond to the performances, expressed in terms of a computed efficiency ratio, obtained when encoding the first, second, third or fourth GOP of video sequences using the LMCS VVC tool.

As illustrated by FIGS. 12a-12d, LMCS provides variable performances for different video sequences as well as for different GOPs of the same sequence. This illustrates how deactivating a single tool, such as for example the LMCS tool, may avoid considerable encoding losses on various sequences. Therefore, the proposed methods of the present subject disclosure may advantageously be used for determining whether to use or not a given video encoding tool, possibly taking into account constraints as described above.

In one or more embodiments, embodiments of a proposed scheme for determining an efficiency value of a video encoding tool, or for determining whether a video encoding tool is to be used for encoding an input video sequence can be implemented for purposes of training an artificial intelligence algorithm.

For example, in one or more embodiments a method of processing a video encoding sequence according to one or more embodiments of the present subject disclosure may be applied to training input data comprising one or more training input video sequences for purposes of training a neural network to generate a prediction of an efficiency value of the video encoding tool for the encoding of the training input video sequence.

Correspondingly, in one or more embodiments, a method for encoding a video sequence by a video encoder which can be configured with a video encoding tool for encoding the video sequence, is provided, which comprises: determining, by the above-described neural network, based on input data comprising a video sequence, a prediction of an efficiency value of the video encoding tool for encoding the video sequence. Therefore a neural network may in some embodiments advantageously be used for generating, based on an input video sequence, and for a given video encoding tool, a prediction of an efficiency value (e.g. a predicted efficiency ratio) of the video encoding tool for encoding the input video sequence, which avoids computing the efficiency value of the video encoding tool which, as described above, will be specific to the input video sequence.

As another example, in one or more embodiments a method of processing a video encoding sequence according to one or more embodiments of the present subject disclosure may be applied to training input data comprising one or more training input video sequences for purposes of training a neural network to generate a prediction as to whether the video encoder is to use the video encoding tool for the encoding of the training input video sequence.

Correspondingly, in one or more embodiments, a method for encoding a video sequence by a video encoder which can be configured with a video encoding tool for encoding the video sequence, is provided, which comprises: determining, by the above-described neural network, based on input data comprising a video sequence, a prediction as to whether the video encoder is to use the video encoding tool for the encoding of the video sequence. Therefore a neural network may in some embodiments advantageously be used for generating, based on an input video sequence, and for a given video encoding tool, a prediction as to whether or not the video encoding tool is to be used for the encoding of the video sequence, which avoids the computations involved in implementing the above described embodiments for making such determination regarding the video encoding tool for a given video input sequence.

In one or more embodiments, a training phase of a supervised learning algorithm can be designed by implementing embodiments of the proposed scheme for processing an input video sequence on a large data set. For example, depending on the embodiment, data resulting from embodiments of the proposed scheme for processing a video sequence of the present subject disclosure, such as a determination for a given video encoding tool or feature of a video encoder as to whether such tool or feature is to be used through a corresponding configuration of the video encoder for encoding the video sequence, or a determination for a set of video encoding tools of features of a video encoder as to which one(s) is/are to be used through a corresponding configuration of the video encoder for encoding the video sequence, may advantageously be used for building a training data set for training a supervised learning algorithm using a neural network.

For example, the VVC tools may be tested with the VVenC software on an extensive and representative video database, such as the BVI-DVC dataset. Specifically, embodiments of the proposed scheme may be applied on various contents of the BVI-DVC. Performing tests of the proposed scheme on a large number and variety of video sequences shows that every video encoding tool can have different performances depending on characteristics of the video sequence, such as the amount of noise in the video sequence and/or the level of blurriness in the video sequence.

In addition, these tests show that, for a given video sequence of a given type, the efficiency of a video encoding tool may vary depending on the content of the sequence, for instance in the case where the content of the video sequence includes a scene change.

Tests have been conducted in order to evaluate several VVC video encoding tools on 200 sequences from the BVI-DVC dataset. In the VVenC implementation of the VVC video coding standard, the size of a Group of Picture (GoP) can be chosen in a set of two possible configurations for GOP size: 16 pictures (or frames, or images) or 32 pictures. As BVI-DVC sequences are composed of 64 frames, the tested sequences can be divided into two or four GOPs, and the tools to be tested can be tested on all the GOPs of the test sequences.

In one or more embodiments, a chosen supervised learning algorithm may therefore be trained on datasets such as the BVI-DVC dataset. The dataset chosen for training the supervised learning algorithm, for example implemented by a convolutional neural network, may preferably be tested to verify that it contains video sequences for which certain video encoding tools have varying performances, including at a fine granularity level such as the GOP level, as discussed above in connection with FIGS. 3a-3d and 4.

Once a supervised learning algorithm is trained, it can advantageously be used to decide, for one or a plurality of video encoding tools, whether it should be used (e.g. activated) or not. This framework can be generalized in some embodiments by using an artificial neural network to predict an optimized set of video coding tools for a given input video sequence, possibly taking into account an input constraint (e.g. encoding performance related and/or encoding computational complexity related) In one or more embodiments, a training phase may comprise the determining, for each training input video sequence of a training dataset, for a given video coding tool of a set of video coding tools of a video encoder, of a prediction of an efficiency value which may then be used to determine whether or not the video coding tool should be used for the encoding of the training input video sequence according to one or more embodiments of the method of processing a video sequence of the present subject disclosure. In other embodiments, a training phase may comprise the determining, for each training video sequence of a training dataset, for a given video coding tool of a set of video coding tools of a video encoder, of a prediction as to whether or not the video coding tool should be used for the encoding of the training input video sequence.

In other embodiments, a training phase may comprise the determining, for each training video sequence of a training dataset, for a set of video coding tools of a video encoder, of an optimum configuration of a video encoder corresponding to an optimum set of video encoding tools that provides optimal performances when used for the encoding of the training input video sequence.

Depending on the embodiment, different inferring modes of the supervised learning algorithm can be considered.

Figure 13:
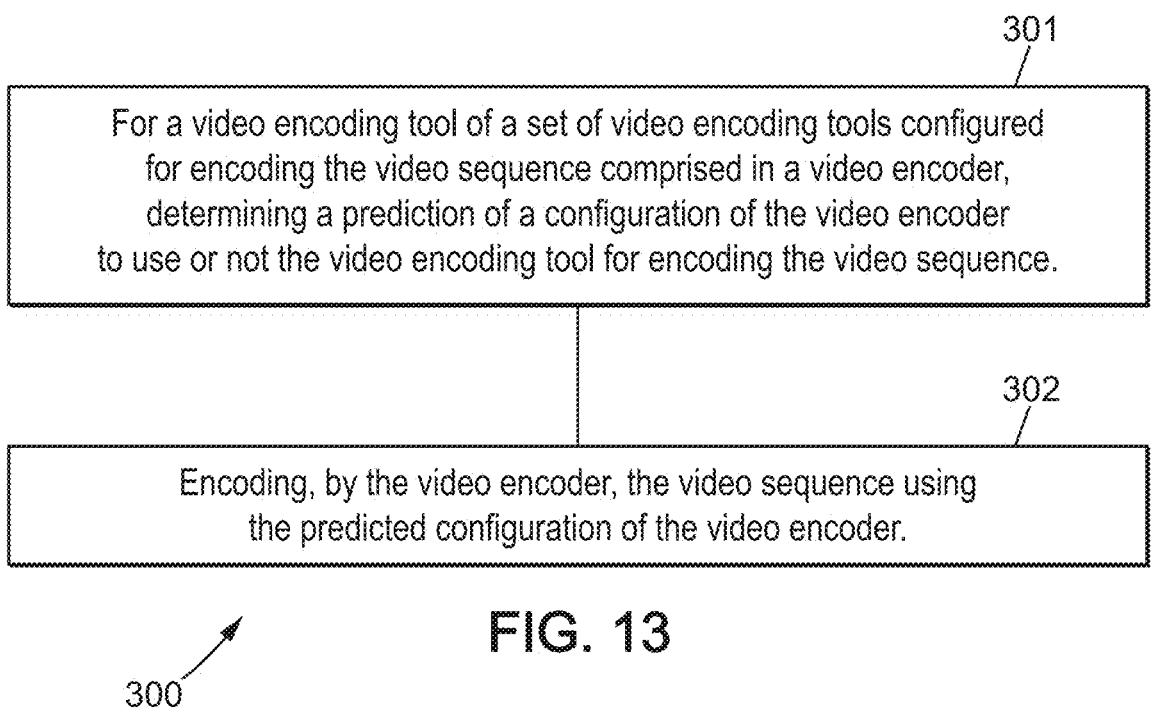
FIG. 13 illustrates an exemplary video encoding method according to one or more embodiments of the present subject disclosure.

FIG. 13 illustrates an exemplary video encoding method 300 according to one or more embodiments of the present subject disclosure.

A video sequence which is to be encoded is considered as input of the proposed method for encoding a video sequence. A video encoder comprising one or more video encoding tools (which may also be referred to as "features") is further considered for the encoding of the video sequence. Each of the one or more video encoding tool may or not be used for encoding, by the video encoder configured accordingly, the video sequence.

In some embodiments, for a video encoding tool of the set of video encoding tools comprised in a video encoder, a prediction of a configuration of the video encoder to use or not the video encoding tool for encoding the video sequence may be determined (301).

In some embodiments, the video encoder may be configured according to the prediction, and the video sequence may be encoded (302) by the video encoder, thereby using the predicted configuration to encode the video sequence.

In some embodiments, the video sequence may be encoded by the video encoder using a configuration of the video encoder based on the predicted configuration of the video encoder.

For example, in some embodiments, the prediction of the configuration of the video encoder may comprise a prediction as to whether the video encoding tool is to be activated or deactivated in the configuration of the video encoder used for encoding the video sequence. In such embodiments, the proposed method for encoding the video sequence may further comprise: in a case where it has been predicted to activate the video encoding tool, encoding, by the video encoder configured with the video encoding tool, the video sequence; and in a case where it has been predicted not to activate the video encoding tool, encoding, by the video encoder configured without the video encoding tool, the video sequence.

In one or more embodiments, the prediction of the configuration of the video encoder may be determined using a supervised learning algorithm, for example implemented by a neural network, such as a convolutional neural network.

Figure 14:
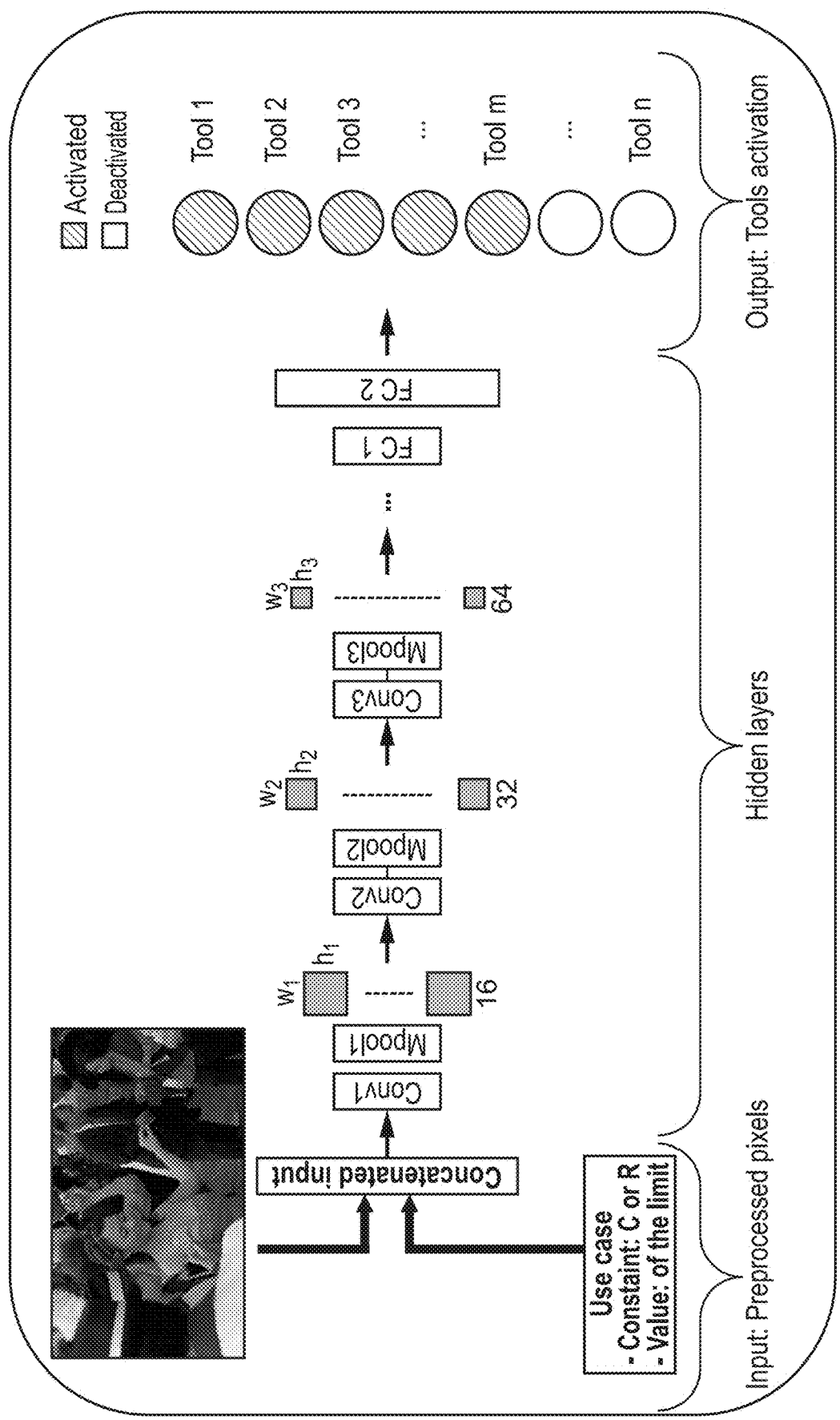
FIGS. 14-16 illustrate exemplary video encoding methods according to one or more embodiments of the present subject disclosure.

FIG. 14 illustrates an exemplary method of encoding a video sequence using a classifier according to one or more embodiments.

In one or more embodiments, a classifier (e.g. a convolutional neural network) may be built for a plurality of video encoding tools, and configured for predicting which video encoding tool(s) of the plurality video encoding tool are to be activated, based on an input video sequence, and possibly, as illustrated by FIG. 14, input data related a type of constraint (complexity-based or performances (e.g. BD-rate)-based) and a threshold of the constraint, for the encoding by the video encoder of the input video sequence. Therefore the exemplary classifier of FIG. 14, which includes a plurality of hidden layers, may be trained so as to be configured to predict a set of video encoding tools that are to be activated for the video encoding of a given input video sequence under a given input constraint.

Figure 15:
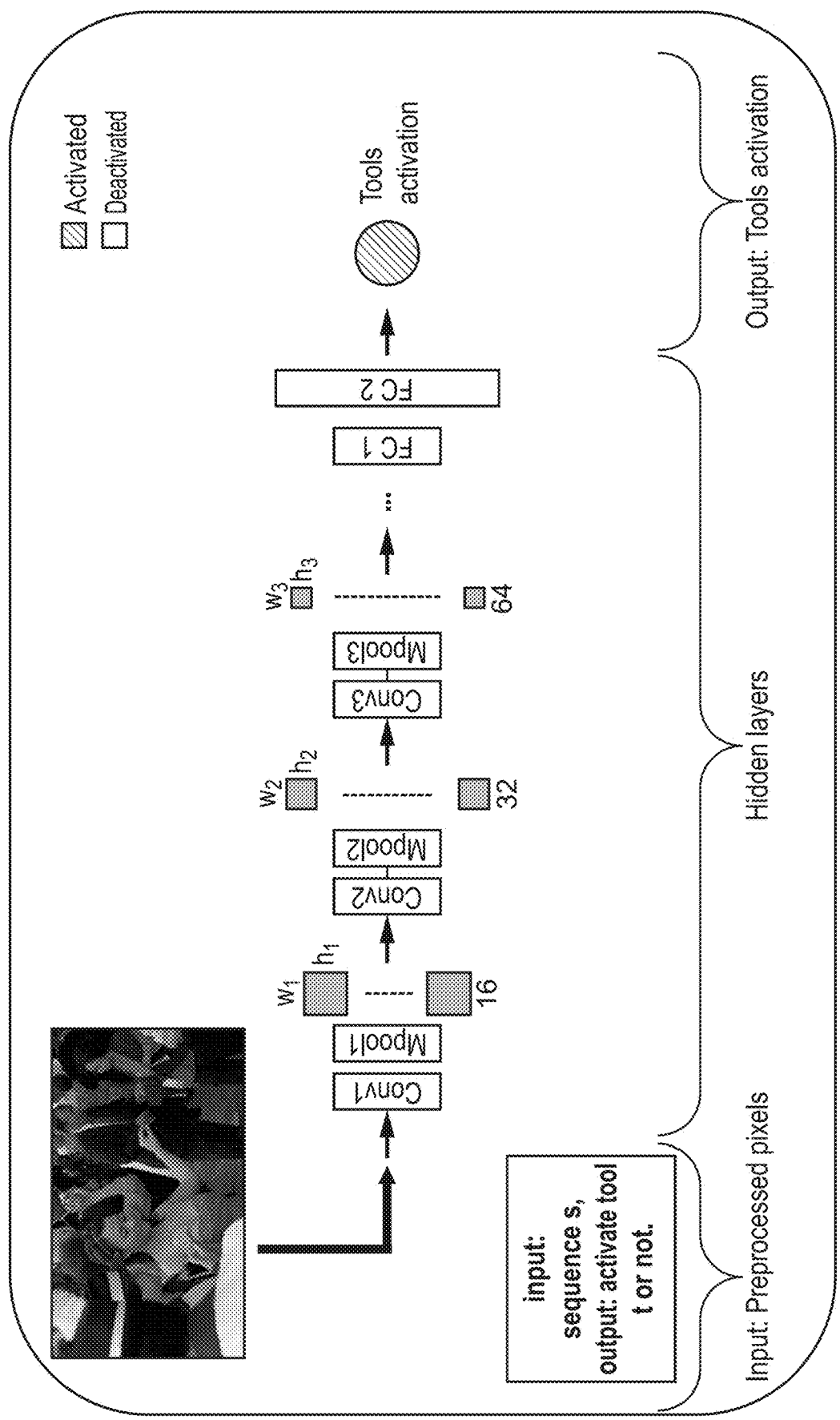

FIG. 15 illustrates another exemplary method of encoding a video sequence using a classifier according to one or more embodiments.

In one or more embodiments, a classifier (e.g. a convolutional neural network) may be built for a video encoding tool, and configured for predicting whether or not a given video encoding tool should be activated, based on an input video sequence, as illustrated by FIG. 15. Therefore the exemplary classifier of FIG. 15, which includes a plurality of hidden layers, may be trained so as to be configured to predict whether a given video encoding tool is to be activated for the video encoding of a given input video sequence.

The example of varying efficiency of a single tool as illustrated by FIGS. 12a-12d for the LMCS VVC tool shows it may be advantageous to use a supervised learning algorithm for addressing the problem of determining whether to use (e.g. activate) or not a given video encoding tool (such as LMCS) based on an input video content to be encoded.

In one or more embodiments, in order to predict the optimal activation of the considered video encoding tool, for example at the GOP level, a Convolutional Neural Network (CNN) may advantageously be configured to be used at the pre-encoding level. The convolutional neural network may be tasked with predicting the optimal tool activation to optimize the usage of the video encoder (e.g. VVC) on each input video sequence (or, in some embodiments, on each GOP of a sequence). Advantageously, the convolutional neural network does not need information available both at the video encoder and at the video decoder, since an LMCS activation flag (e.g. binary) may be customized for each slice of the GOP indicating the activation or not of LMCS. This flag, which is sent from the encoder to the decoder, ensures compliance between both sides. Therefore, in some embodiments, the CNN may be provided (first during a training phase, and then in inference operating mode) as input with the pre-processed (not encoded yet) pixels of the considered input video sequence. We respect to the CNN output, the video encoding tool activation prediction problem may in some embodiments be cast as a binary classification task, according to which the neural network predicts whether to activate the considered video encoding tool (e.g. LMCS) or not on each GOP.

In embodiments wherein the above specifications and design choices are adopted, a training dataset for performing a training phase (using embodiments of the video processing method provided in the present subject disclosure) may be generated as follows. A large number (for example 200) of Full HD and 4K sequences may be selected from a dataset (for example from the BVI-DVC dataset, which is an example of training database designed for deep video compression) encoded with a VVC encoder (such as VVenC), to train the neural network to predict the behavior of the RDO algorithm of this VVC tool.

In some embodiments, the design of the network topology may be driven by some constraints. One of these constraints may for example be the network computational complexity as well its memory footprint which shall be upper bounded, so that it can be operated in some embodiments in real-time and/or on low-power decoders. One example of such neural network is the Mobilenet neural network, which is specifically designed to be used in mobile applications. These CNNs are small, low-latency, low-power models parameterized to meet the resource constraints of a variety of use cases. They can be built upon for classification, detection, embeddings, and segmentation.

Figure 16:
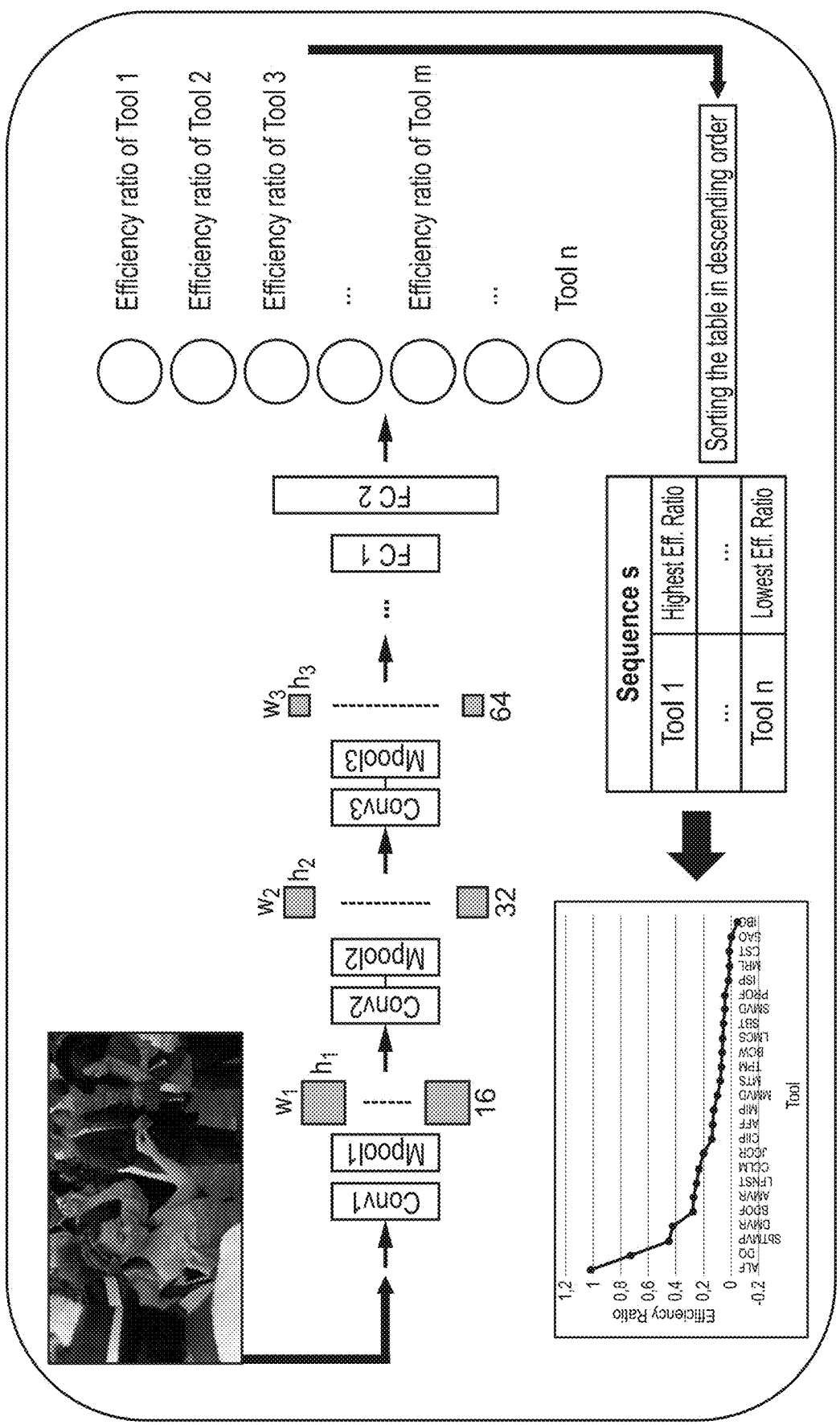

FIG. 16 illustrates another exemplary method of encoding a video sequence using a classifier according to one or more embodiments.

In one or more embodiments, a classifier (e.g. a convolutional neural network) may be built for one or more video encoding tools, and configured for predicting an efficiency value (e.g. an efficiency ratio) for each of the one or more video encoding tools, based on an input video sequence, as illustrated by FIG. 16. Therefore the exemplary classifier of FIG. 16, which includes a plurality of hidden layers, may be trained so as to be configured to predict respective efficiency values of video encoding tools for the video encoding of a given input video sequence. In some embodiments, embodiments of the method of processing a video sequence of the present subject disclosure may advantageously be implemented, using one or more of the predicted efficiency values, in order to determine whether to configure the video encoder to use one or more of the video encoding tools for the encoding of the input video sequence. For example, as shown in FIG. 16, the video encoding tools may be ordered based on their predicted efficiency values, and measurements of global performances of the video encoder configured differently based on a progressive activation or deactivation of video encoding tools according to the ordered sequence of encoding tools may be performed in order to identify an optimum configuration of the video encoder, in some embodiments given a predefined constraint.

In some embodiments, several exemplary convolutional neural networks, such as Lenet5, vgg16, Mobilenet, Resnet or I3D, may be tested to compare their performances, for example in predicting an optimized configuration given an input video sequence.

Figure 17:
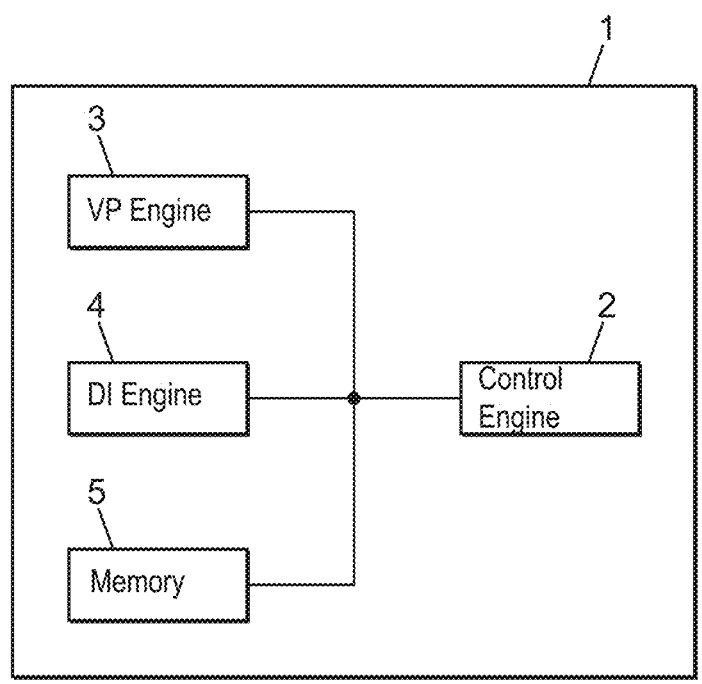
FIG. 17 illustrates an exemplary apparatus or unit configured to use one or more features in accordance with one or more embodiments of the present subject disclosure.

An exemplary architecture of an apparatus, such as a processing node or a video encoder, according to the present subject disclosure is illustrated on FIG. 17 which shows an apparatus 1 configured to perform a method for processing an image in accordance with embodiments of the present subject disclosure.

The apparatus 1, which may comprise one or more computers, includes a control engine 2, a video processing engine 3, a data interface engine 4, a memory 5, and a prediction engine (not represented on FIG. 17).

In the architecture illustrated on FIG. 17, all of the video processing engine 3, data interface engine 4, prediction engine, and memory 5 are operatively coupled with one another through the control engine 2.

In some embodiments, the video processing engine 3 is configured to perform various aspects of embodiments of one or more of the proposed methods for video processing as described herein, such as determining an efficiency value for each video encoding tool of a video coding framework for the encoding of an input video sequence (or subsequence thereof), and determining, based on the efficiency value, whether the video encoding tool should or not be activated for encoding the input video sequence (resp. the subsequence thereof).

In some embodiments, the data interface engine 4 is configured to receive an input video subsequence, possibly as part of an input video sequence, and to output an indication of activation/deactivation of a video encoding tool for the encoding of the video subsequence.

In some embodiments, the prediction engine may be configured for implementing an artificial intelligence algorithm using a neural network, such as for example a supervised learning algorithm. The prediction engine may additionally be configured for implementing the functions or embodiments provided in the present subject disclosure with respect to training the artificial intelligence algorithm or using the artificial intelligence algorithm for obtaining predictions, for example of configurations of a video encoder.

The control engine 2 includes a processor, which may be any suitable microprocessor, microcontroller, Field Programmable Gate Arrays (FPGA), Application Specific Integrated Circuits (ASIC), Digital Signal Processing chip, and/or state machine, or a combination thereof. According to various embodiments, one or more of the computers can be configured as a multi-processor computer having multiple processors for providing parallel computing. The control engine 2 may also comprise, or may be in communication with, computer storage media, such as, without limitation, the memory 5, capable of storing computer program instructions or software code that, when executed by the processor, causes the processor to perform the elements described herein. In addition, the memory 5 may be any type of data storage or computer storage medium, coupled to the control engine 2 and operable with the data interface engine 4 and the video processing engine 3 to facilitate management of data stored in association therewith, such as, for example, a cache memory, a data farm, a data warehouse, a data mart, a datacenter, a data cloud, or a combination thereof.

In embodiments of the present subject disclosure, the apparatus 1 is configured for performing one or more of the (video processing and video encoding) methods described herein. The apparatus 1 may in some embodiments be included in a video processor or, depending on the embodiments, in a video encoder or a video codec.

It will be appreciated that the apparatus 1 shown and described with reference to FIG. 17 is provided by way of example only. Numerous other architectures, operating environments, and configurations are possible. Other embodiments of the node may include fewer or greater number of components, and may incorporate some or all of the functionality described with respect to the apparatus components shown in FIG. 17. Accordingly, although the control engine 2, video processing engine 3, data interface engine 4, prediction engine and memory 5 are illustrated as part of the apparatus 1, no restrictions are placed on the location and control of these components. In particular, in other embodiments, any of these components may be part of different entities or computing systems.

The proposed method may be used for the processing, for purposes of encoding or compression of input data which may correspond, depending on the embodiment, to an image, a picture, a video frame, a video sequence, video content or video data.

While the present subject disclosure has been described with respect to preferred embodiments, those skilled in the art will readily appreciate that various changes and/or modifications can be made to the present subject disclosure without departing from the spirit or scope of the present subject disclosure as defined by the appended claims.

Although this subject disclosure has been disclosed in the context of certain preferred embodiments, it should be understood that certain advantages, features and aspects of the systems, devices, and methods may be realized in a variety of other embodiments. Additionally, it is contemplated that various aspects and features described herein can be practiced separately, combined together, or substituted for one another, and that a variety of combination and sub-combinations of the features and aspects can be made and still fall within the scope of the present subject disclosure. Furthermore, the systems and devices described above need not include all of the modules and functions described in the preferred embodiments.

Information and signals described herein can be represented using any of a variety of different technologies and techniques. For example, data, instructions, commands, information, signals, bits, symbols, and chips can be represented by voltages, currents, electromagnetic waves, magnetic fields or particles, optical fields or particles, or any combination thereof.

Depending on the embodiment, certain acts, events, or functions of any of the methods described herein can be performed in a different sequence, may be added, merged, or left out altogether (e.g., not all described acts or events are necessary for the practice of the method). Moreover, in certain embodiments, acts or events may be performed concurrently rather than sequentially.

The invention claimed is:

1. A method of processing a video sequence, comprising:
for a video encoding tool of a set of video encoding tools configured for encoding the video sequence comprised in a video encoder:
determining an encoding performance value of the video encoding tool for encoding the video sequence, wherein the encoding performance value measures an encoding performance of the video encoding tool for encoding the video sequence;
determining an encoding computational complexity value of the video encoding tool for encoding the video sequence, wherein the encoding computational complexity value measures the computational complexity incurred by using the video encoding tool for performing the encoding of the video sequence;
determining an efficiency value based on a ratio of the encoding performance value over the encoding computational complexity value of the video encoding tool for encoding the video sequence; and
determining, based on the efficiency value of the video encoding tool, whether to configure the video encoder to use the video encoding tool for the encoding of the video sequence,
wherein the method further comprises:
determining a plurality of global performance efficiency values of the video encoder respectively corresponding to configurations of the video encoder in which a respective set of video encoding tools is used for the encoding of the video sequence;
determining an optimum video encoding tool in the set of video encoding tools corresponding to an optimum global performance efficiency value in the plurality of global performance efficiency values of the video encoder;
wherein the determining whether to configure the video encoder to use the video encoding tool for the encoding of the video sequence is based on a comparison of the efficiency value with an efficiency value determined for the optimum video encoding tool.

2. The method of claim 1, further comprising:
determining, based on the efficiency value of the video encoding tool, whether to activate the video encoding tool in a configuration of the video encoder for the encoding of the video sequence;
in a case where it has been determined to activate the video encoding tool, encoding, by the video encoder configured with the video encoding tool, the video sequence; and
in a case where it has been determined not to activate the video encoding tool, encoding, by the video encoder configured without the video encoding tool, the video sequence.

3. The method of claim 1, further comprising:
determining a plurality of efficiency values respectively corresponding to a plurality of video encoding tools of the set of video encoding tools;
determining an ordered sequence of efficiency values based on the plurality of efficiency values;
wherein the determining whether to configure the video encoder to use the video encoding tool for the encoding of the video sequence is based on a position in the ordered sequence of the efficiency value determined for the video encoding tool.

4. The method of claim 1, further comprising:
determining a plurality of efficiency values respectively corresponding to a plurality of video encoding tools of the set of video encoding tools;
determining an ordered sequence of efficiency values based on the plurality of efficiency values;
determining, based on the ordered sequence of efficiency values, a configuration of the video encoder to use a subset of the set of video encoding tools for encoding the video sequence.

5. The method of claim 1, further comprising:
determining a plurality of global performance efficiency values of the video encoder respectively corresponding to configurations of the video encoder in which a respective set of video encoding tools is used for the encoding of the video sequence;
wherein the determining whether to configure the video encoder to use the video encoding tool for the encoding of the video sequence is based on a position, in an ordered sequence of the video encoding tools corresponding to the ordered sequence of efficiency values, of the video encoding tool with respect to a video encoding tool corresponding to a maximum value of the plurality of global performance efficiency values.

6. The method of claim 1, wherein each of the respective efficiency values of a corresponding video encoding tool is based on a respective encoding performance value of the corresponding video encoding tool, and a respective encoding computational complexity value of the corresponding video encoding tool, and wherein the subset of video encoding tools to be used in the video encoder configuration is determined based on respective encoding performance values and respective encoding computational complexity values for corresponding video encoding tools.

7. The method of claim 1, wherein the video sequence is divided into a plurality of subsequences, wherein the set of video encoding tools comprises one or more video encoding tools that can be determined to be used for encoding each subsequence of the video sequence, the method further comprising, for each of the subsequences and for each of the video encoding tool: determining whether to use the video encoding tool for the encoding the subsequence based on an efficiency value for encoding the subsequence determined for the video encoding tool.

8. A method for encoding a video sequence, comprising: training, using the method of claim 1 applied to training input data comprising a training input video sequence, a neural network to generate a prediction as to whether the video encoder is to use the video encoding tool for the encoding of the training input video sequence.

9. A method for encoding a video sequence by a video encoder which can be configured to use a video encoding tool for encoding the video sequence, the method comprising: determining, by the neural network of claim 8, based on input data comprising the video sequence, a prediction as to whether the video encoder is to be configured to use the video encoding tool for encoding the video sequence.

10. A method for encoding a video sequence by a video encoder which can be configured with a video encoding tool for encoding the video sequence, the method comprising: determining, by the neural network of claim 8, based on input data comprising a video sequence, a prediction of an efficiency value of the video encoding tool for encoding the video sequence.

11. An apparatus comprising a processor and a memory operatively coupled to the processor, wherein the processor is configured to perform a method of processing a video sequence, comprising:
for a video encoding tool of a set of video encoding tools configured for encoding the video sequence comprised in a video encoder;
determining an encoding performance value of the video encoding tool for encoding the video sequence, wherein the encoding performance value measures an encoding performance of the video encoding tool for encoding the video sequence;
determining an encoding computational complexity value of the video encoding tool for encoding the video sequence, wherein the encoding computational complexity value measures the computational complexity incurred by using the video encoding tool for performing the encoding of the video sequence;
determining an efficiency value based on a ratio of the encoding performance value over the encoding computational complexity value of the video encoding tool for encoding the video sequence; and
determining, based on the efficiency value of the video encoding tool, whether to configure the video encoder to use the video encoding tool for the encoding of the video sequence,
wherein the method further comprises:
determining a plurality of global performance efficiency values of the video encoder respectively corresponding to configurations of the video encoder in which a respective set of video encoding tools is used for the encoding of the video sequence;
determining an optimum video encoding tool in the set of video encoding tools corresponding to an optimum global performance efficiency value in the plurality of global performance efficiency values of the video encoder;
wherein the determining whether to configure the video encoder to use the video encoding tool for the encoding of the video sequence is based on a comparison of the efficiency value with an efficiency value determined for the optimum video encoding tool.

12. The apparatus of claim 11, wherein the method further comprises:
determining, based on the efficiency value of the video encoding tool, whether to activate the video encoding tool in a configuration of the video encoder for the encoding of the video sequence;
in a case where it has been determined to activate the video encoding tool, encoding, by the video encoder configured with the video encoding tool, the video sequence; and
in a case where it has been determined not to activate the video encoding tool, encoding, by the video encoder configured without the video encoding tool, the video sequence.

13. The apparatus of claim 11, wherein the method further comprises:
determining a plurality of efficiency values respectively corresponding to a plurality of video encoding tools of the set of video encoding tools;
determining an ordered sequence of efficiency values based on the plurality of efficiency values;
wherein the determining whether to configure the video encoder to use the video encoding tool for the encoding of the video sequence is based on a position in the ordered sequence of the efficiency value determined for the video encoding tool.

14. The apparatus of claim 11, wherein the method further comprises:
determining a plurality of efficiency values respectively corresponding to a plurality of video encoding tools of the set of video encoding tools;
determining an ordered sequence of efficiency values based on the plurality of efficiency values;
determining, based on the ordered sequence of efficiency values, a configuration of the video encoder to use a subset of the set of video encoding tools for encoding the video sequence.

15. The apparatus of claim 11, wherein the method further comprises:
determining a plurality of global performance efficiency values of the video encoder respectively corresponding to configurations of the video encoder in which a respective set of video encoding tools is used for the encoding of the video sequence;
wherein the determining whether to configure the video encoder to use the video encoding tool for the encoding of the video sequence is based on a position, in an ordered sequence of the video encoding tools corresponding to the ordered sequence of efficiency values, of the video encoding tool with respect to a video encoding tool corresponding to a maximum value of the plurality of global performance efficiency values.

16. A non-transitory computer-readable medium encoded with executable instructions which, when executed, causes an apparatus comprising a processor operatively coupled with a memory, to perform a method of processing a video sequence, comprising:
for a video encoding tool of a set of video encoding tools configured for encoding the video sequence comprised in a video encoder:
determining an encoding performance value of the video encoding tool for encoding the video sequence, wherein the encoding performance value measures an encoding performance of the video encoding tool for encoding the video sequence;
determining an encoding computational complexity value of the video encoding tool for encoding the video sequence, wherein the encoding computational complexity value measures the computational complexity incurred by using the video encoding tool for performing the encoding of the video sequence;
determining an efficiency value based on a ratio of the encoding performance value over the encoding computational complexity value of the video encoding tool for encoding the video sequence; and
determining, based on the efficiency value of the video encoding tool, whether to configure the video encoder to use the video encoding tool for the encoding of the video sequence,
wherein the method further comprises:
determining a plurality of global performance efficiency values of the video encoder respectively corresponding to configurations of the video encoder in which a respective set of video encoding tools is used for the encoding of the video sequence;

determining an optimum video encoding tool in the set of video encoding tools corresponding to an optimum global performance efficiency value in the plurality of global performance efficiency values of the video encoder;

wherein the determining whether to configure the video encoder to use the video encoding tool for the encoding of the video sequence is based on a comparison of the efficiency value with an efficiency value determined for the optimum video encoding tool.

17. The non-transitory computer-readable medium of claim 16, wherein the method further comprises:

determining, based on the efficiency value of the video encoding tool, whether to activate the video encoding tool in a configuration of the video encoder for the encoding of the video sequence;

in a case where it has been determined to activate the video encoding tool, encoding, by the video encoder configured with the video encoding tool, the video sequence; and in a case where it has been determined not to activate the video encoding tool, encoding, by the video encoder configured without the video encoding tool, the video sequence.

18. The non-transitory computer-readable medium of claim 16, wherein the method further comprises:

determining a plurality of efficiency values respectively corresponding to a plurality of video encoding tools of the set of video encoding tools;

determining an ordered sequence of efficiency values based on the plurality of efficiency values;

wherein the determining whether to configure the video encoder to use the video encoding tool for the encoding of the video sequence is based on a position in the ordered sequence of the efficiency value determined for the video encoding tool.

19. The non-transitory computer-readable medium of claim 16, wherein the method further comprises:

determining a plurality of efficiency values respectively corresponding to a plurality of video encoding tools of the set of video encoding tools;

determining an ordered sequence of efficiency values based on the plurality of efficiency values;

determining, based on the ordered sequence of efficiency values, a configuration of the video encoder to use a subset of the set of video encoding tools for encoding the video sequence.

20. The non-transitory computer-readable medium of claim 16, wherein the method further comprises:

determining a plurality of global performance efficiency values of the video encoder respectively corresponding to configurations of the video encoder in which a respective set of video encoding tools is used for the encoding of the video sequence;

wherein the determining whether to configure the video encoder to use the video encoding tool for the encoding of the video sequence is based on a position, in an ordered sequence of the video encoding tools corresponding to the ordered sequence of efficiency values, of the video encoding tool with respect to a video encoding tool corresponding to a maximum value of the plurality of global performance efficiency values.

* * * * *